US009909020B2

(12) United States Patent
Bateman et al.

(10) Patent No.: US 9,909,020 B2
(45) Date of Patent: Mar. 6, 2018

(54) ACTIVATION METHOD USING MODIFYING AGENT

(75) Inventors: Stuart Arthur Bateman, Mount Waverley (AU); Ranya Simons, Richmond (AU); Dong Yang Wu, Wheelers Hill (AU); Patrick James McMahon, Highett (AU); Alexander Bilyk, Chelsea Heights (AU); Douglas H. Berry, Seattle, WA (US); Seana B. Kobak, Sammamish, WA (US); James F. Kirchner, Renton, WA (US); Lori Clarice Straus, Bothell, WA (US); Mark Paul Johnson, Snohomish, WA (US)

(73) Assignees: The Boeing Company, Seattle, WA (US); Commonwealth Scientific And Industrial Research Organisation, Campbell (AU)

( * ) Notice: Subject to any disclaimer, the term of this patent is extended or adjusted under 35 U.S.C. 154(b) by 1349 days.

(21) Appl. No.: 11/784,534

(22) Filed: Apr. 5, 2007

(65) Prior Publication Data

US 2008/0050598 A1 Feb. 28, 2008

Related U.S. Application Data

(63) Continuation-in-part of application No. PCT/AU2006/000070, filed on Jan. 20, 2006.
(Continued)

(51) Int. Cl.
*B05D 3/10* (2006.01)
*C09D 7/12* (2006.01)
(Continued)

(52) U.S. Cl.
CPC ............ *C09D 7/1233* (2013.01); *B05D 3/107* (2013.01); *C08J 7/04* (2013.01); *C08J 7/12* (2013.01);
(Continued)

(58) Field of Classification Search
CPC ..................................................... C09D 7/1233
(Continued)

(56) References Cited

U.S. PATENT DOCUMENTS

| 2,621,193 A | 12/1952 | Langkammerer |
| 2,708,205 A | 5/1955 | Haslam |

(Continued)

FOREIGN PATENT DOCUMENTS

| CN | 1184717 A | 6/1998 |
| EP | 153973 A | 11/1985 |

(Continued)

OTHER PUBLICATIONS

FluoroEtch—Material Safety Data Sheet Prepared Jan. 25, 2001, published 2002.
(Continued)

*Primary Examiner* — Tabatha Penny
(74) *Attorney, Agent, or Firm* — Ladas & Parry, LLP

(57) ABSTRACT

The present invention relates to a method of activating an organic coating to enhance adhesion of the coating to a further coating and/or to other entities comprising applying a solvent and a surface chemistry and/or surface topography modifying agent to the organic coating.

The invention also relates to a coated substrate having an activated coating, wherein the adhesion of the coating to a further coating and/or other entities has been enhanced by application of a solvent and a surface chemistry and/or surface topography modifying agent to the coating.

The invention further relates to an activation treatment for an organic coating to enhance adhesion of the coating to a
(Continued)

Note: relative concentration for a given solvent system further coating and/or to other entities comprising a solvent and a surface chemistry and/or surface topography modifying agent and a method for the preparation of the activation treatment.

50 Claims, 65 Drawing Sheets

Related U.S. Application Data

(60) Provisional application No. 60/646,204, filed on Jan. 21, 2005.

(51) Int. Cl.
C08J 7/04 (2006.01)
C08J 7/12 (2006.01)
C08J 7/14 (2006.01)
C09D 7/14 (2006.01)
B05D 7/00 (2006.01)
C08K 5/00 (2006.01)

(52) U.S. Cl.
CPC .............. C08J 7/14 (2013.01); C09D 7/14 (2013.01); B05D 7/52 (2013.01); C08J 2475/14 (2013.01); C08K 5/0008 (2013.01); Y10T 428/31504 (2015.04); Y10T 428/31678 (2015.04); Y10T 428/31989 (2015.04)

(58) Field of Classification Search
USPC ........................................................ 427/337
See application file for complete search history.

(56) References Cited

U.S. PATENT DOCUMENTS

| | | | |
|---|---|---|---|
| 3,286,009 A * | 11/1966 | Hashimoto et al. | 264/129 |
| 3,458,552 A | 7/1969 | Hauk | |
| 3,499,853 A | 3/1970 | Drawert | |
| 3,570,748 A | 3/1971 | Coyle et al. | |
| 3,607,473 A | 9/1971 | Homrok et al. | |
| 3,751,280 A | 8/1973 | Neruker et al. | |
| 3,751,287 A | 8/1973 | Baier et al. | |
| 3,839,078 A | 10/1974 | Birchall | |
| 3,949,114 A * | 4/1976 | Viola et al. | 428/337 |
| 3,994,751 A | 11/1976 | Ingram | |
| 4,223,115 A | 9/1980 | Zalucha et al. | |
| 4,233,354 A | 11/1980 | Hasegawa | |
| 4,234,628 A | 11/1980 | DuRose | |
| 4,281,037 A | 7/1981 | Choung | |
| 4,293,665 A | 10/1981 | Zalucha et al. | |
| 4,304,851 A | 12/1981 | McGrail | |
| 4,525,511 A | 6/1985 | Kirby et al. | |
| 4,609,746 A | 9/1986 | Barfurth et al. | |
| 4,643,789 A * | 2/1987 | Parker et al. | 156/219 |
| 4,647,680 A | 3/1987 | Barfurth et al. | |
| 4,654,236 A * | 3/1987 | Finzel | B05D 7/16 148/274 |
| 4,741,931 A | 5/1988 | Lin et al. | |
| 4,743,503 A | 5/1988 | Lin et al. | |
| 4,818,325 A | 4/1989 | Hiraiwa et al. | |
| 4,835,298 A | 5/1989 | Terbot | |
| 4,839,454 A | 6/1989 | Lin et al. | |
| 4,855,001 A | 8/1989 | Damico et al. | |
| 4,874,462 A | 10/1989 | Makita et al. | |
| 4,885,218 A | 12/1989 | Andou et al. | |
| 4,902,578 A | 2/1990 | Kerr et al. | |
| 4,909,846 A | 3/1990 | Barfurth | |
| 4,965,135 A * | 10/1990 | Im et al. | 428/412 |
| 5,116,637 A | 5/1992 | Baney et al. | |
| 5,124,180 A | 6/1992 | Proscia | |
| 5,212,017 A | 5/1993 | Meder | |
| 5,240,989 A | 8/1993 | Bernard | |
| 5,248,334 A | 9/1993 | Fey | |
| 5,292,364 A | 3/1994 | Hiraiwa et al. | |
| 5,393,907 A * | 2/1995 | Hashimoto | C23C 18/1216 534/16 |
| 5,512,527 A | 4/1996 | Ritter | |
| 5,623,010 A | 4/1997 | Groves | |
| 5,743,951 A | 4/1998 | Ozai et al. | |
| 5,858,462 A | 1/1999 | Yamazaki | |
| 5,878,153 A | 3/1999 | Mikulec | |
| 5,879,757 A * | 3/1999 | Gutowski et al. | 427/491 |
| 5,889,115 A | 3/1999 | Yabuta et al. | 525/208 |
| 5,922,161 A | 7/1999 | Wu et al. | |
| 5,958,509 A | 9/1999 | Neumann | |
| 6,042,877 A | 3/2000 | Lyon et al. | |
| 6,066,406 A | 5/2000 | McComas | |
| 6,099,939 A | 8/2000 | Mittal et al. | |
| RE37,036 E | 1/2001 | Groves | |
| 6,175,009 B1 | 1/2001 | Confalone | |
| 6,217,945 B1 | 4/2001 | Fowler | |
| 6,436,530 B1 | 8/2002 | Szonn et al. | |
| 6,436,615 B1 | 8/2002 | Brandow et al. | |
| 6,495,309 B1 | 12/2002 | Brabbs et al. | |
| 6,511,752 B1 | 1/2003 | Yao et al. | 428/429 |
| 6,524,658 B2 | 2/2003 | Murofushi et al. | |
| 6,562,428 B1 | 5/2003 | Ohrui | |
| 6,592,973 B1 | 7/2003 | Nakata et al. | |
| 6,737,145 B1 | 5/2004 | Watanabe et al. | |
| 6,743,267 B2 | 6/2004 | Jernakoff et al. | |
| 6,759,178 B2 | 7/2004 | Brabbs et al. | |
| 6,783,692 B2 | 8/2004 | Bhagwagar | |
| 6,897,151 B2 | 5/2005 | Winter et al. | |
| 6,990,904 B2 | 1/2006 | Ibarra et al. | |
| 7,014,669 B2 | 3/2006 | Small et al. | |
| 7,029,508 B2 | 4/2006 | Brandon | |
| 7,077,880 B2 | 7/2006 | Siddiqui | |
| 7,097,882 B2 | 8/2006 | Seo et al. | |
| 7,156,945 B2 | 1/2007 | Chaug et al. | |
| 7,211,320 B1 | 5/2007 | Cooper et al. | |
| 7,261,920 B2 | 8/2007 | Haubrich et al. | |
| 7,273,821 B2 | 9/2007 | Sezi | |
| 7,311,978 B2 | 12/2007 | Fukasawa et al. | |
| 7,399,376 B2 | 7/2008 | Wang et al. | |
| 7,419,601 B2 | 9/2008 | Cooper et al. | |
| 7,419,615 B2 | 9/2008 | Strauss | |
| 7,427,305 B2 | 9/2008 | Scott et al. | |
| 7,429,338 B2 | 9/2008 | Siddiqui | |
| 7,442,412 B2 | 10/2008 | Miller | |
| 7,445,815 B2 | 11/2008 | Kagan et al. | |
| 7,513,920 B2 | 4/2009 | Siddiqui | |
| 7,588,801 B2 | 9/2009 | Endo et al. | |
| 7,625,840 B2 | 12/2009 | Pellin et al. | |
| 7,632,535 B2 | 12/2009 | Carlson et al. | |
| 7,670,797 B2 | 3/2010 | Vacanti et al. | |
| 7,740,940 B2 | 6/2010 | Hanson | |
| 8,557,343 B2 | 10/2013 | Bateman | |
| 2002/0064602 A1 | 5/2002 | Murofushi et al. | |
| 2002/0098347 A1 | 8/2002 | Szonn et al. | |
| 2002/0132061 A1 | 9/2002 | Sezi | |
| 2003/0013042 A1 | 1/2003 | Brabbs et al. | |
| 2003/0072951 A1 | 4/2003 | Seo et al. | |
| 2003/0114083 A1 | 6/2003 | Jernakoff et al. | |
| 2003/0162398 A1 | 8/2003 | Small et al. | |
| 2003/0194504 A1 | 10/2003 | Bilyk et al. | |
| 2003/0194506 A1* | 10/2003 | Drzal | B05D 3/062 427/553 |
| 2004/0006924 A1 | 1/2004 | Scott et al. | |
| 2004/0023052 A1 | 2/2004 | Ambroise | |
| 2004/0025444 A1 | 2/2004 | Small et al. | |
| 2004/0029495 A1 | 2/2004 | Small et al. | |
| 2004/0077766 A1 | 4/2004 | De Cooman et al. | |
| 2004/0224095 A1 | 4/2004 | Miller | |
| 2004/0091625 A1 | 5/2004 | Winter et al. | |
| 2004/0112237 A1 | 6/2004 | Chaug et al. | |
| 2004/0131779 A1 | 7/2004 | Haubrich et al. | |
| 2004/0075076 A1 | 8/2004 | Bhagwagar | |
| 2005/0065028 A1 | 3/2005 | Pellin et al. | |
| 2005/0065060 A1* | 3/2005 | Kin et al. | 510/506 |
| 2005/0079201 A1 | 4/2005 | Rathenow et al. | |
| 2005/0155296 A1 | 7/2005 | Siddiqui | |
| 2005/0249932 A1 | 11/2005 | Wang et al. | |

(56) References Cited

U.S. PATENT DOCUMENTS

| | | |
|---|---|---|
| 2005/0263456 A1 | 12/2005 | Cooper et al. |
| 2006/0019326 A1 | 1/2006 | Vacanti et al. |
| 2006/0089292 A1 | 4/2006 | Wirz et al. |
| 2006/0117667 A1 | 6/2006 | Siddiqui et al. |
| 2006/0127681 A1 | 6/2006 | Domes et al. |
| 2006/0166013 A1 | 7/2006 | Endo et al. |
| 2006/0180788 A1 | 8/2006 | Scott et al. |
| 2006/0188657 A1 | 8/2006 | Kimura et al. |
| 2006/0251908 A1 | 11/2006 | Fukasawa et al. |
| 2006/0255015 A1 | 11/2006 | Siddiqui |
| 2007/0003705 A1 | 1/2007 | Strauss |
| 2007/0037904 A1 | 2/2007 | Jeong et al. |
| 2007/0093600 A1 | 4/2007 | De Cooman et al. |
| 2007/0084797 A1 | 5/2007 | Cooper et al. |
| 2007/0104956 A1 | 5/2007 | Grandhee |
| 2007/0134428 A1 | 6/2007 | Carlson et al. |
| 2007/0148441 A1 | 6/2007 | Kagan et al. |
| 2007/0166226 A1 | 7/2007 | Holmes et al. |
| 2007/0184576 A1 | 8/2007 | Chang et al. |
| 2007/0231496 A1 | 10/2007 | Eriksson et al. |
| 2007/0256600 A1 | 11/2007 | Hedouin et al. |
| 2008/0041791 A1 | 2/2008 | Cooper et al. |
| 2008/0050598 A1 | 2/2008 | Bateman et al. |
| 2008/0102212 A1 | 5/2008 | Endo et al. |
| 2008/0111027 A1 | 5/2008 | Blohowiak et al. |
| 2008/0152930 A1 | 6/2008 | Hanson |
| 2008/0160328 A1 | 7/2008 | Jaworowski et al. |
| 2008/0193746 A1 | 8/2008 | Beaurain et al. |
| 2008/0245271 A1 | 10/2008 | Trabesinger et al. |
| 2008/0254315 A1 | 10/2008 | Sato et al. |
| 2008/0260950 A1 | 10/2008 | Schottner |
| 2008/0283425 A1 | 11/2008 | Trabesinger et al. |
| 2009/0017082 A1 | 1/2009 | Morimitsu et al. |
| 2009/0017312 A1 | 1/2009 | Allam et al. |
| 2009/0029553 A1 | 1/2009 | Scott et al. |
| 2009/0061239 A1 | 3/2009 | Burckhardt et al. |
| 2009/0104474 A1 | 4/2009 | Schwartz et al. |
| 2009/0123741 A1 | 5/2009 | Bhatt et al. |
| 2009/0148603 A1 | 6/2009 | Goscha |
| 2009/0148711 A1 | 6/2009 | Le Blanc et al. |
| 2009/0155607 A1 | 6/2009 | Huck et al. |
| 2009/0165913 A1 | 7/2009 | Hergenrother et al. |
| 2009/0181248 A1 | 7/2009 | van Ooij et al. |
| 2009/0186232 A1 | 7/2009 | Okubo et al. |
| 2009/0246539 A1 | 10/2009 | Huck .............................. 7/384 |
| 2009/0250656 A1 | 10/2009 | Siddiqui et al. |
| 2009/0297829 A1 | 12/2009 | Pyles et al. |
| 2009/0297830 A1 | 12/2009 | Pyles et al. |
| 2009/0305051 A1 | 12/2009 | Corsaro |
| 2009/0324836 A1 | 12/2009 | Tsurugi et al. |
| 2009/0326146 A1 | 12/2009 | Sepeur et al. |
| 2010/0009173 A1 | 1/2010 | Lee et al. |
| 2010/0027192 A1 | 2/2010 | Perry et al. |
| 2010/0028692 A1 | 2/2010 | Hedouin et al. |
| 2010/0044219 A1 | 2/2010 | Carlson et al. |
| 2010/0055795 A1 | 3/2010 | Lee |
| 2010/0068392 A1 | 3/2010 | Bauerochse et al. |
| 2010/0068542 A1 | 3/2010 | Bright et al. |
| 2010/0078123 A1 | 4/2010 | Huang et al. |
| 2010/0098877 A1 | 4/2010 | Cooper et al. |
| 2010/0143731 A1 | 6/2010 | DeZurik et al. |
| 2010/0196718 A1 | 8/2010 | Oltean et al. |
| 2011/0008765 A1 | 1/2011 | Vacanti et al. |

FOREIGN PATENT DOCUMENTS

| | | | |
|---|---|---|---|
| EP | 0241851 | 10/1987 | |
| EP | 0247539 | 12/1987 | |
| EP | 347049 A | 12/1988 | |
| EP | 0314966 | 5/1989 | |
| EP | 0268330 A2 | 5/1992 | |
| EP | 0 761 738 A1 | 3/1997 | |
| EP | 1 042 419 B1 | 8/2004 | |
| EP | 1 042 419 B2 | 8/2007 | |
| EP | 1894979 | 3/2008 | |
| FR | 2692276 | 12/1993 | |
| GB | 1401296 | 7/1975 | |
| GB | 2 110 705 A | 6/1983 | |
| JP | 59-152961 A | 8/1984 | |
| JP | 59152961 A | 8/1984 | |
| JP | 62-250975 | 10/1987 | |
| JP | 2169681 A | 6/1990 | |
| JP | 3006275 A | 1/1991 | |
| JP | 3031370 A | 2/1991 | |
| JP | 04351643 A2 | 12/1992 | |
| JP | 5247412 A | 9/1993 | |
| JP | 6091783 A | 4/1994 | |
| JP | 9087588 | 3/1997 | |
| JP | 09087588 A | 3/1997 | |
| JP | 10-183051 | 7/1998 | |
| JP | 10183051 A | 7/1998 | |
| JP | 2002235179 | 8/2002 | |
| JP | 2003-512490 | 4/2003 | |
| JP | 2004155983 | 6/2004 | |
| JP | 2009034589 A | 2/2009 | |
| WO | WO 91/08238 | 6/1991 | |
| WO | WO 93/22070 | 11/1993 | |
| WO | 1995/020006 A1 | 7/1995 | |
| WO | WO 97/00913 | 1/1997 | |
| WO | WO 97/02310 | 1/1997 | |
| WO | WO 97/06896 | 2/1997 | |
| WO | WO 99/32303 | 7/1999 | |
| WO | WO 99/58741 | 11/1999 | |
| WO | WO 00/06210 | 2/2000 | |
| WO | WO 00/23523 | 4/2000 | |
| WO | WO 01/01199 | 1/2001 | |
| WO | 2001/029118 A1 | 4/2001 | |
| WO | WO 01/029118 | 4/2001 | |
| WO | WO 02/070620 | 9/2002 | |
| WO | WO 03002500 | * 1/2003 | ............... C11D 1/00 |
| WO | WO 03/068882 | 8/2003 | |
| WO | 03/097756 A1 | 11/2003 | |
| WO | 2003/093386 A1 | 11/2003 | |
| WO | WO 04/011253 | 2/2004 | |
| WO | WO 04/038732 | 5/2004 | |
| WO | WO 04/065616 | 8/2004 | |
| WO | WO 04/076568 | 9/2004 | |
| WO | WO 04/076717 | 9/2004 | |
| WO | WO 04/076718 | 9/2004 | |
| WO | WO 04/080578 | 9/2004 | |
| WO | WO 04/091810 | 10/2004 | |
| WO | WO 04/101852 | 11/2004 | |
| WO | WO 04/105826 | 12/2004 | |
| WO | WO 05/023949 | 3/2005 | |
| WO | WO 05/028176 | 3/2005 | |
| WO | WO 05/054391 | 6/2005 | |
| WO | 2005/089480 A | 9/2005 | |
| WO | WO 05/093002 | 10/2005 | |
| WO | WO 05/100452 | 10/2005 | |
| WO | WO 05/111665 A2 | 11/2005 | |
| WO | WO 06/086828 | 8/2006 | |
| WO | WO 06/092536 | 9/2006 | |
| WO | WO 06/124670 | 11/2006 | |
| WO | WO 2007/003828 | 1/2007 | |
| WO | WO 2007/056002 | 5/2007 | |
| WO | WO 2007/058724 | 5/2007 | |
| WO | WO 2007/077136 | 7/2007 | |
| WO | WO 2007/094253 | 8/2007 | |
| WO | WO 2007/099157 | 9/2007 | |
| WO | WO 2007/113141 | 10/2007 | |
| WO | WO 2007/122056 | 11/2007 | |
| WO | WO 2007/123071 | 11/2007 | |
| WO | WO 2007/142279 | 12/2007 | |
| WO | WO 2008/010230 | 1/2008 | |
| WO | WO 2008/034409 | 3/2008 | |
| WO | WO 2008/048201 | 4/2008 | |
| WO | WO 2008/060582 | 5/2008 | |
| WO | WO 2008/025845 | 6/2008 | |
| WO | WO 2008/082493 | 7/2008 | |
| WO | WO 2008/083304 | 7/2008 | |
| WO | WO 2009/009159 | 1/2009 | |
| WO | WO 2009/052352 | 4/2009 | |

(56) References Cited

FOREIGN PATENT DOCUMENTS

| WO | WO 2010/007882 | 1/2010 |
|---|---|---|
| WO | WO 2010/039636 | 4/2010 |
| WO | WO 2010/078251 | 7/2010 |

OTHER PUBLICATIONS

Rompp Lexikon Chemie "Rompp Lexikon Chemie—10." Georg Thieme Verlag, 1998.
Sathyanarayana, M.N. et al "Role of promoters in improving adhesion of organic coatings to a substrate" Progress in Organic Coatings.
EPA et al "Organic Coating Replacements" Guide to Cleaner Technologies Sep. 1994.
Gu, Xiaohong et al "Advanced Techniques for Nanocharacterization of Polymeric Coating Surfaces" JCT Research, vol. 1, No. 3, Jul. 1, 2004.
Ge J. et al "Effects of surface treatment on the adhesion of copper to a hybrid polymer material" Journal of Materials Research vol. 18 No. 11, Nov. 2003.
Gu, X. et al "Advanced Techniques for Nanocharacterization of Polymeric Coating Surfaces", National Institute of Standards and Technology, Nov. 2003.
Rahimi Azam, "Inorganic and Organometallic Polymers: A Review" Iranian Polymer Journal, vol. 13., No. 2., Nov. 2004.
English translation of Office Action for Chinese Patent Application No. 200680001495.3 corresponding to U.S. Appl. No. 11/784,53, dated Jan. 30, 2011.
EPO Notice of Opposition for EPO Application No. 06741074.6 corresponding to U.S. Appl. No. 11/784,534, dated Mar. 10, 2010 including English language translation (Google Translate).
Examination Report for related Japanese Application No. 2007-551517 dated Oct. 4, 2011 with English-language translation.
PCT International Search Report dated Feb. 27, 2006 for PCT Application No. PCT/AU2006/000070 (3 pages).
PCT Written Opinion of the International Searching Authority dated Feb. 27, 2006 for PCT Application No. PCT/AU2006/000070 (5 pages).
PCT International Preliminary Report on Patentability dated Dec. 6, 2006 for PCT Application No. PCT/AU2006/000070 (13 pages).
Derwent Abstract Accession No. 97-255794/23, for JP 09087588 A (Kanebuchi Kagaku Kogyo KK) Mar. 31, 1997. (2 pages).
STN File Caplus, Abstract 1993:235997 for JP 04351643 A2 (Nippon Petrochemicals Co Ltd) Dec. 7, 1992 (1 page).
Office action dated Jan. 8, 2013 from corresponding Japanese Patent Application No. 2007-551517 with English translation (5 pages).
U.S. Appl. No. 14/710,550, filed May 12, 2015, Simmons.
From U.S. Appl. No. 10/593,364 (Now U.S. Pat. No. 8,557,343), Notice of Allowance dated May 23, 2013.
From U.S. Appl. No. 10/593,364 (Now U.S. Pat. No. 8,557,343), Office Action dated Jun. 12, 2012.
From U.S. Appl. No. 10/593,364 (Now U.S. Pat. No. 8,557,343), Office Action dated Nov. 22, 2011.
From U.S. Appl. No. 10/593,364 (Now U.S. Pat. No. 8,557,343), Office Action dated May 25, 2011.
From U.S. Appl. No. 10/593,364 (Now U.S. Pat. No. 8,557,343), Office Action dated Oct. 27, 2010.
From U.S. Appl. No. 10/593,364 (Now U.S. Pat. No. 8,557,343), Office Action dated May 26, 2010.
PCT Search Report from PCT/US2005/009091dated Oct. 25, 2005.
PCT Written Opinion from PCT/US2005/009091dated Oct. 25, 2005.
PCT International Preliminary Report on Patentability Chapter II from PCT/US2005/009091 dated May 10, 2006.
Extended European Search Report for European Patent Application No. EP 06 74 1074 dated Feb. 13, 2008.

Berry, D.H., et al, Chemical Activator for Intercoat Bonding of Exterior Aerospace Livery Paint. Proceedings of American Coatings Conference, 10 pages (2012).
Berry, D.H., et al, "Intercoat Bonding of Exterior Decorative Aerospace Topcoats," Proceedings of 18th International Conference, on Surface Treatments in the Aeronautical and Space Industries (SURFAIR 2010), 11 pages (2010).
Eaton et al, "Biocompatibility of sulphonated polyurethane surface," Biomaterials, (1996), 17, p. 1987 (with pp. 1988 to 1994).
Haack, et al., "Chemistry of surface modification with UV/ozone for improved intercoat adhesion in multilayered coating systems," Surface and Interface Analysis, 2000, 29, p. 829 (with pp. 830-836).
Kanaya, Kouji., et al., "Decomposition of Polyurethane Foams by Alkanolamines," Journal of Applied Polymer Science (1994), vol. 51, p. 675 (with pp. 676-682).
Levy et al., "Bisphosphonate derivatized polyurethanes resist calcification," Biomaterials 22, 2001, p. 2683 (with pp. 2684-2693).
Matuda et al.., "Visible-light-induced surface graft polymerization via camphorquinone impregnation technique," J. Biomed. Res., (2002), 59, p. 386 (with pages 387-389).
Mehrotra, R. C., "Alkoxides and Alkyalkoxides of Metals and Metalloids," Inorganic Chemical Actia, Reviews, (1967) p. 99 (with pp. 100-112).
Park et al., "Bacterial adhesion on PEG modified polyurethane surfaces," Biomaterials 19, 1998, p. 851 (with pp. 852-859).
Troev, K., "Chemical degradation of polyurethanes. Degradation of microporous polyurethane elastomer by dimethyl phosphonate," Polymer Degradation and Stability, (2000), 67, p. 159 (with pp. 160-165).
Ulrich, Henri et al., "Recycling of Polyurethane and Polyisocyanurate Foam," Polymer Engineering & Science (1978), Vo. 18, No. 11, p. 844 (with pp. 845-848).
http://ww2010.atmos.uiuc.edu/%28Gh%29/guides/mtr/cld/dvlp/rh.rxml, printed on Aug. 18, 2014.
Ahrens, Donald, "Meteorology Today—An Introduction to Weather, Climate, and the Environment", Fifth Edition, 1994, West Publishing Company.
Hegemann D. et al: Plasma Treatment of Polymers for Surface and Adhesion Improvement', Nuclear Instruments & Methods in Physics Research, Section—B:Beam Interactions with Materials and Atoms vol. 208, Aug. 1, 2003, pp. 281-286, XP004438737.
"DuPont Tyzor Organic Titanates General Brochure" (11 pages), copyright 2001, DuPont, publication date not available to Applicant.
Sigma Aldrich Webpage for Titanium diisopropoxide bis(acetyl-acetonate) (1 page), German Version, submitted to EPO Opposition for EP 06741074.6 on Apr. 7, 2016.
Sigma Aldrich Webpage for Titanium diisopropoxide bis(acetyl-acetonate) (3 pages), English Version. Available at http://www.sigmaaldrich.com/catalog/product/aldrich/325252?lang=en&region=US, accessed on Aug. 2, 2016.
Wikipedia entry on titanium isopropoxide (4 pages), Available at: (https://en.wikipedia.org/w/index.php?title=Titanium_isopropoxide&oldid=706459631, (Modified on Feb. 23, 2016).
Berry, D.H., Bolles, J.A., Seebergh, J.E., Bateman, S., "Chemical Reactivation of Exterior Decorative Aerospace Topcoats," SAMPE Journal, vol. 49, Mar./Apr. 2013, pp. 7-13 (8 pages).
EPO Opposition for EP 06741074.6; Summons to Oral Proceedings with Annex, dated Aug. 6, 2015 (21 pages).
DuPont™ Tyzor® Organic Titanates ,Technical Note—Paints and Coatings, 2001 (4 pages).
Tyzor® IAM Product Bulletin, Organic Titanate, "A New Additive for Solvent-Based Printing Inks" (6 pages).
Ivan Kolev, "Coatings on Plastics—Technology Designed for Wide Range Solutions," (SVC Bulletin Summer 2013) (2 pages).
DuPont™ Tyzor® Organic Titanates, Technical Note—Surface Primers, 2001 (2 pages).

* cited by examiner

| Conc. / Form | TPT | NBT | NPZ | TEAZ |
|---|---|---|---|---|
| 0.5 wt% |  |  |  |  |
| 3.0 wt% |  |  |  |  |
| 5.0 wt% |  |  |  |  |
| Untreated Ref |  | Sanded Ref |  | |

Note: relative concentration for a given solvent system

Figure 3

| Untreated | TPT in IPA | | | Untreated | NPZ in NPA | | |
|---|---|---|---|---|---|---|---|
| | 0.5wt% | 3wt% | 5wt% | | 0.5wt% | 3wt% | 5wt% |
| PART | PART | PART | PART | ONLY | ONLY | ONLY | ONLY |

Figure 5

| Stencil Pull Time (min) | Scribe Test Time (h) | Untreated | Sanded | 3wt% TPT in IPA – 30min dwell | 3wt% TPT in IPA – 90min dwell |
|---|---|---|---|---|---|
| 5 | 1 | | | | |
| 30 | 2 | | | | |
| 60 | 3 | | | | |
| 90 | 4 | | | | |

| BAC70846 Base coat: 16h, 120F, 8%RH, C, Adhesion promoter 1h dwell, Overcoat BAC50103, 96h 120F, C2 | | | | | |
|---|---|---|---|---|---|
| | Untreated | 5wt% NPZ in IPA | 5wt% NPZ in NPA | 5wt% NPZ in Progylde | |
| | Sanded | 5wt% NPZ 20:80 progylde:IPA | 5wt% NPZ 20:80 progylde:NPA | 5wt% NPZ 40:60 progylde:IPA | 5wt% NPZ 40:60 progylde:NPA |

Figure 14

Water Reference

3% Titanium Isopropoxide in IPA

3% Zirconium Propoxide in IPA

3% Zirconium Propoxide in PA (NPA)

Water Reference

3% Titanium Isopropoxide in IPA

3% Zirconium Propoxide in IPA

3% Zirconium Propoxide in PA

| 1stCoat | cure | Modification Agent | Overcoat | Before Hydraulic Fluid Soak rating | After 30 day hydraulic fluid soak |
|---|---|---|---|---|---|
| DHS 70846 | 75F 12%RH 72hr | untreated | DHS 707 | 5H | 3B |
| DHS 70846 | 75F 12%RH 72hr | 5%Zr 60%IPA/40%Prog | DHS 707 | 5H | F |
| DHS 70846 | 75F 12%RH 72hr | 5%Zr 60%nPA/40%Prog | DHS 707 | 5H | F |
| DHS 70846 | 75F 12%RH 72hr | 5%Zr 80%IPA/20%Prog | DHS 707 | 5H | F |
| | | | | | |
| DHS 70846 | 75F 70%RH 72hr | untreated | DHS 707 | 5H | B |
| DHS 70846 | 75F 70%RH 72hr | 5%Zr 60%IPA/40%Prog | DHS 707 | 5H | H |
| DHS 70846 | 75F 70%RH 72hr | 5%Zr 60%nPA/40%Prog | DHS 707 | 5H | H |
| DHS 70846 | 75F 70%RH 72hr | 5%Zr 80%IPA/20%Prog | DHS 707 | 5H | F |
| | | | | | |
| Ecl 70846 | 75F 70%RH 72hr | untreated | Ecl 707 | 5H | 3H |
| Ecl 70846 | 75F 70%RH 72hr | 5%Zr 60%IPA/40%Prog | Ecl 707 | 5H | 4H |
| Ecl 70846 | 75F 70%RH 72hr | 5%Zr 60%nPA/40%Prog | Ecl 707 | 5H | 4H |
| | | | | | |
| DHS8800 70846 | 75F 70%RH 72hr | untreated | CA 8800 70281 | 5H | HB |
| DHS8800 70846 | 75F 70%RH 72hr | 5%Zr 60%IPA/40%Prog | CA 8800 70281 | 5H | H |
| DHS8800 70846 | 75F 70%RH 72hr | 5%Zr 60%nPA/40%Prog | CA 8800 70281 | 5H | B |

DHS – Desothane
Ecl – Eclipse
Overcoat cure protocol: 3 days 120F, 14% RH

Figure 40

| Basecoat Application | Modification Agent | Overcoat Application | Paint Thickness (mils) | Gardner Impact Passed (lbs) |
|---|---|---|---|---|
| 2 Coats | Untreated | 2 Coats 51265 Blue | 3.45 | 60 |
| 2 Coats | Untreated | 2 Coats 51265 Blue | 3.17 | 60 |
| 2 Coats | Alkoxide | 2 Coats 51265 Blue | 2.85 | 80 |
| 2 Coats | Alkoxide | 2 Coats 51265 Blue | 3.47 | 80 |
| 2 Coats | Untreated | 2 Coats 2574 Orange | 3.09 | 80 |
| 2 Coats | Untreated | 2 Coats 2574 Orange | 3.16 | 80 |
| 2 Coats | Alkoxide | 2 Coats 2574 Orange | 3.44 | 80 |
| 2 Coats | Alkoxide | 2 Coats 2574 Orange | 3.21 | 70 |
| 3 Coats | Untreated | 3 Coats 51625 Blue | 3.90 | 80 |
| 3 Coats | Untreated | 3 Coats 51625 Blue | 3.79 | 80 |
| 3 Coats | Alkoxide | 3 Coats 51625 Blue | 4.18 | 80 |
| 3 Coats | Alkoxide | 3 Coats 51625 Blue | 4.19 | 80 |
| 3 Coats | Untreated | 3 Coats 2574 Orange | 4.57 | 80 |
| 3 Coats | Untreated | 3 Coats 2574 Orange | 3.97 | 80 |
| 3 Coats | Alkoxide | 3 Coats 2574 Orange | 3.70 | 80 |
| 3 Coats | Alkoxide | 3 Coats 2574 Orange | 3.89 | 80 |
| 4 Coats | Untreated | 4 Coats 51625 Blue | 5.20 | 80 |
| 4 Coats | Untreated | 4 Coats 51625 Blue | 5.09 | 80 |
| 4 Coats | Alkoxide | 4 Coats 51625 Blue | 4.83 | 80 |
| 4 Coats | Alkoxide | 4 Coats 51625 Blue | 3.99 | 80 |
| 4 Coats | Untreated | 4 Coats 2574 Orange | 5.07 | 80 |
| 4 Coats | Untreated | 4 Coats 2574 Orange | 5.96 | 80 |
| 4 Coats | Alkoxide | 4 Coats 2574 Orange | 4.41 | 80 |
| 4 Coats | Alkoxide | 4 Coats 2574 Orange | 5.40 | 80 |

Figure 41

ACTIVATION METHOD USING MODIFYING AGENT

CROSS-REFERENCE TO RELATED APPLICATIONS

This application is a Continuation-in-Part of international application PCT/AU2006/000070, filed on Jan. 20, 2006, which claims the benefit and priority of U.S. Provisional Application 60/646,204, filed on Jan. 21, 2005, the disclosures of which are incorporated herein by reference in their entireties.

FIELD

The present invention relates to a method of activating an organic coating, a coated substrate having an activated coating and an activation treatment for an organic coating. In particular, the activation method improves the adhesion of the organic coating to further coating layers and/or to other entities.

BACKGROUND

Organic coatings are generally used to protect the surface of materials from incidental damage, abrasion, chemical attack and from environmental or in-service degradation. Organic coatings are also used to enhance the aesthetics and/or optical properties of an object or component.

The surface properties of many coatings dramatically change on drying, curing and/or aging to become more inert than might be predicted based on the chemistry of their individual components alone. Whilst this phenomenon in part provides the coating with chemical resistance, impact strength, abrasion resistance and durability, it also complicates the process of applying additional coating layers, particularly when they are not applied within a predetermined reapplication window. The same problem arises with applying other entities such as sealants, pin hole fillers and surfacers such as those used on composite substrates, decals and logos applied with pressure sensitive adhesives and the like, to such coatings. In cases which require the application of additional coating layers and/or other entities, a mechanical abrasion or stripping process of the coating is generally necessary before the reapplication procedure can take place.

In the specific example of aircraft coatings, it is well known that adhesion will not meet in-service performance requirements when fresh layers of coating are applied over layers which have aged beyond the acceptable reapplication window. The acceptable window may be of the order of days under ambient conditions or potentially hours under certain conditions of high temperature or extreme humidity. Once the reapplication window has been exceeded, the standard practice for applying additional coating layers on aircraft involves mechanical abrasion of the aged coating.

Both chemical stripping and mechanical abrasion have limitations. Mechanical abrasion is labor intensive, the reproducibility is variable, and it is ergonomically costly due to the highly repetitive and vibratory nature of the work. As such there is a pressing need for the development of a surface treatment to improve the adhesion of aged or inert industrial organic coatings towards additional coating layers or other entities, for example, adhesives, sealants, fillers, stickers and the like.

Coating manufacturers have developed a method of improving the procedure of coating stripping through the development of barrier layers and intermediate coats which, for example, protect the primer and conversion coating of metal structures from the chemical stripping agents (U.S. Pat. No. 6,217,945). Although this procedure would reduce the amount of infrastructure down time, it still relies on paint removal to provide a surface which will accept a fresh coating layer with acceptable adhesion.

Haack (*Surface and Interface Anal*, (2000), 29, p 829) investigated the interaction of automotive polyurethane coatings using UV light to generate ozone. Promising results in terms of improved adhesion and reduced water contact angles were produced when paint formulations incorporating $TiO_2$ were subjected to $H_2O_2$ and UV light. However, there are obvious practical difficulties associated with this strategy, particularly in terms of its commercial viability for application in areas susceptible to corrosion and for treating larger surfaces. Also the occupational health and safety issues make it less suited to commercial application.

In the biological field, Park et al. (*Biomaterials*, (1998), 19, p 851) employed the surface urethane NH group to graft chemical species onto polyurethane rubber, whilst Levy et al. (*Biomaterials* (2001) 22, p 2683) employed a strong base to remove the surface urethane NH proton to accelerate such nucleophilic grafting reactions. Both strategies are unsuitable for activating organic coatings. The chemical reaction kinetics of the first strategy would be too slow to be practical, particularly since, considering the low surface energy and inertness to bonding of such coatings, the urethane NH groups may not be oriented towards the air-coating interface. The use of very strong bases, as per the second strategy, may degrade existing paint layers, resulting in a mechanically weak foundation for fresh coatings to adhere to. Furthermore, the latter strategy is also unacceptable for activating large areas due to corrosion and health and safety considerations.

Other strategies in the biological field have employed free radical techniques to graft molecules onto the surface of biomedical polyurethane surfaces (Matuda et al, *J. Biomed. Res.*, (2002), 59, p 386; Eaton et al, *Biomaterials*, (1996), 17, p 1977). Although commercially viable, the main difficulty with this strategy lies in promoting actual grafting of the substrate.

Controlled glycolysis or aminolysis as described in *Polymer Engineering & Science* (1978), 18, p 844, and *J. Applied Polymer Science* (1994), 51, p 675) has very slow kinetics at room temperature and as such is not a practical solution. The use of reagents such as dimethyl phosphonate (Polymer Degradation and Stability, (2000), 67, p 159) is also not appropriate since they are highly toxic and act too slowly at room temperature.

The strategies disclosed above do not adequately address the need for the development of a surface treatment to improve the adhesion of aged or inert organic coatings to additional coating layers and/or other entities. The problems of commercial viability, health and safety considerations, viable kinetics, applicability to small and large surface areas still remain and need to be resolved.

It is to be understood that, if any prior art publication in the biological field is referred to herein, such reference does not constitute an admission of a known application to the field of industrial and architectural coatings.

SUMMARY

We have now found a method which allows the activation of organic coatings to improve their adhesive properties towards further coating layers of the same or different type, and/or other entities without compromising coating integrity, via the use of mild reagents and conditions. The process of activation on aged coatings when they have exceeded the application window where adhesion will not meet in-service performance requirements when fresh layers of coating are applied over layers is also termed reactivation. Both activation and reactivation will be used interchangeably.

The term "mild" in this context refers to chemicals which are not known to be excessively corrosive, acidic, basic or toxic and are applicable for use in highly regulated industrial environments. One example of such an environment is a commercial aircraft paint hangar. Additionally the mild reagents used in the preferred application methods do not adversely affect the bulk aircraft coatings, or underlying coatings, such as primers or selectively strippable coatings, or underlying substrates, such as aluminium and composite.

Advantageously, this method no longer requires the traditional methods of mechanical abrasion or chemical stripping of an organic coating to improve its adhesive properties towards additional coatings and/or other entities.

In a first aspect, the present invention provides a method of activating an aged or inert organic coating to enhance adhesion of the coating to a further coating and/or to other entities selected from adhesives, sealants, pin hole fillers and pressure sensitive decals or logos comprising applying a solvent and a surface chemistry and/or surface topography modifying agent which facilitates surface reduction, surface hydrolysis, surface oxidation, surface exchange, light induced surface modification and/or adds chemical functionality to the surface of the organic coating.

In another aspect, the present invention provides a coated substrate having an activated coating, wherein the adhesion of the coating to a further coating and/or other entities selected from adhesives, sealants, pin hole fillers and pressure sensitive decals or logos has been enhanced by application of a solvent and a surface chemistry and/or surface topography modifying agent which facilitates surface reduction, surface hydrolysis, surface oxidation, surface exchange, light induced surface modification and/or adds chemical functionality to the surface of the organic coating.

The solvent and the agent may be applied either simultaneously, sequentially or separately. Advantageously, the solvent and the agent are applied to the organic coating simultaneously in the form of an activation treatment.

The agent may act independently from the solvent or alternatively the combination of the solvent and the agent may be necessary to affect a change in coating surface chemistry and/or topography.

In a further aspect, the present invention provides an activation treatment for an organic coating to enhance adhesion of the coating to a further coating and/or to other entities selected from adhesives, sealants, pin hole fillers and pressure sensitive decals or logos comprising a solvent and a surface chemistry and/or surface topography modifying agent which facilitates surface reduction, surface hydrolysis, surface oxidation, surface exchange, light induced surface modification and/or adds chemical functionality to the surface of the organic coating.

The invention also provides a method for the preparation of the activation treatment defined above comprising the step of mixing the solvent with the surface chemistry and/or surface topography modifying agent which facilitates surface reduction, surface hydrolysis, surface oxidation, surface exchange, light induced surface modification and/or adds chemical functionality to the surface of the organic coating.

DETAILED DESCRIPTION

In this specification, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

As used in the specification the singular forms "a" "an" and "the" include plural references unless the context clearly dictates otherwise. Thus, for example, reference to "a solvent" includes mixtures of solvents, reference to "an agent" includes mixtures of two or more such agents, and the like.

The method of the present invention involves activating an organic coating so as to enhance the adhesive properties of at least the surface of the coating towards additional coating layers and/or other entities, for example, adhesives, sealants, pin hole fillers, pressure sensitive decal or logo adhesives and the like. The term 'activating' is used in this context to mean the improvement of the adhesive properties of the organic coating relative to the adhesive properties of that coating, prior to application of the solvent and the agent.

The word "coating" is used herein its broadest sense and describes decorative topcoats; undercoats; intermediate coatings; primers; sealers; lacquers; coatings which are pigmented or clear; coatings designed for specific purposes, such as, corrosion prevention, temperature resistance, or camouflage; coatings which are high gloss, matte, textured, or smooth in finish; or coatings containing specialty additives, such as metal flakes.

In general, organic coatings which are cured, dried or aged beyond a certain time period develop resistance to forming strong adhesive linkages towards other entities. Their surface properties become more inert than might be predicted, based on the chemistry of their individual components alone. Without wishing to be limited by theory, it is believed that this phenomena may result from a reduction in coating surface energy and amount of reactive surface functional groups in conjunction with a higher cross-link density as a function of cure time/aging which makes chemical interaction and/or the formation of strong adhesive linkages with other entities difficult.

The organic coatings which may be activated include, but are not limited to, fully or partially cross-linked organic coatings. Examples of organic coatings include, polyurethane, epoxy, polyester, polycarbonate and/or acrylic coatings, more preferably polyurethane and epoxy coatings. Due to their superior mechanical properties and resistance to abrasion, chemical attack, and environmental degradation, such organic coatings are widely used to protect infrastructure in the aerospace, marine, military, automotive, and construction industries. Many of these coatings show a marked reduction in adhesion to other entities, such as additional coating layers, adhesives, sealants, pressure sensitive decals or logos and the like, with increased time of curing and/or aging.

The activation method involves applying the solvent and the agent to a surface of the organic coating. The surface treatment is not a conventional coating such as a primer coating or tie-coat, but rather a chemical method of modifying the surface of the existing coating so that it is more receptive to forming adhesive interactions with further coatings and/or other entities.

Without wishing to be limited by theory it is believed that the interaction of the agent and/or solvent combination with the coating modifies the coating surface chemistry and/or surface topography to enable it to be more receptive towards other entities including but not limited to additional coating layers. Such agents and/or solvents are chosen such that the bulk integrity of the coating and underlying coating and substrate structures are maintained.

Suitable agents include those which facilitate chemical and/or topographical modification of the coating surface such as but not limited to agents which facilitate surface reduction, surface hydrolysis, surface oxidation, surface exchange, light induced surface modification and/or add chemical functionality to the surface of the coating.

(a) Examples of agents capable of affecting surface reduction include:

(i) Reductants such as sodium borohydride, potassium borohydride, lithium borohydride, zinc borohydride, calcium borohydride and alkoxy, acetoxy and/or amino derivatives thereof such as sodium methoxy borohydride or lithium dimethylaminoborohydride; sodium cyanborohydride, borane and borane complexes; aluminium hydrides such as lithium aluminium hydride and diisobutyl aluminium hydride; calcium hydride; sodium hydride; Red Al (sodium bis(2-methoxyethoxy)aluminiumhydride); selectrides such as K-selectride (potassium tri-sec-butylborohydride); sodium dihydro-bis-(2-methoxy) aluminate; sodium borohydride mixed with aluminium trichloride; lithium triethylborohydride; and lithium tri-tert-butoxy aluminium hydride.

(b) Examples of agents capable of catalysing surface hydrolysis include:

(i) Acids such as organic acids, for example, formic acid, acetic acid, benzoic acid, propanoic acid, malonic acid, oxalic acid and kemp's triacid; and inorganic acids, for example, phosphoric acid.

(c) Examples of agents capable of affecting surface oxidation include:

(i) Oxidants such as trichloroisocyanuric acid, sodium hypochlorite, hydrogen peroxide, potassium permanganate, potassium chromate, periodic acid and lead tetra acetate.

(d) Examples of agents capable of affecting surface exchange or transesterification include:

(i) metal alkoxides or chelates thereof, such as those outlined in "Alkoxides and alkylalkoxides of metals and metalloids" Mehrotra, R. C., Inorganic Chemical Actia, Reviews, (1967) p 99, including titanium or zirconium alkoxides or chelates thereof, for example those marketed by companies such as DuPont or Gelest, i.e. tetra-isopropyltitanate, tetra-n-propyl titanate, tetra-n-butyltitanate, tetra-2-ethylhexyltitanate, tetraethyltitanate, triethanolamine titanate chelate, tetra-n-propylzirconate, tetra-n-butylzirconate and triethanolamine zirconate chelate.

(e) Examples of agents capable of affecting light induced surface modification include:

(i) Free radical initiators such as initiators which are activated by the presence of light, preferably visible light induced free radical initiators or combinations of free radical initiators with tertiary amines and/or mono or multi-functional unsaturated species.

Suitable light activated initiators include but are not limited to camphorquinone and derivatives thereof; benzophenone and derivatives thereof, such as, diethylaminobenzophenone; and phenylphosphineoxide derivatives, such as, Irgacure (CIBA).

Tertiary amine agents include species such as N,N-dimethyl toluidine, N,N-dimethylamino ethylmethacrylate, methyl imidazole, NNN'N'tetramethyl-1,4-butane diamine and NNN'N'tetramethylphenylenediamine.

The multi-functional unsaturated species may be selected from acrylates, for example, hydroxyl ethyl acrylate; methacrylates, for example, polyethyleneglycol monomethacrylate, hydroxyl ethyl methacrylate, glycidyl methacrylate, N,N-dimethylamino ethylmethacrylate, ethyleneglycol dimethacrylate and butane diol dimethacrylate; and acrylamides, for example, hydroxyethyl acrylamide and bis acrylamide.

It will be appreciated that the agents may also be prepared in-situ from their constituent components. For example, $LiBH_4$ may be prepared in-situ from $NaBH_4$ and LiCl and sodium methoxyborohydride from methanol and $NaBH_4$.

The agent(s) are generally present in an amount more than about 0.001%, preferably more than about 0.01%, and most preferably about 0.01% to about 20% based on the total weight of the activation treatment, or the combination of solvent(s), agent (s) and any further optional additive(s).

Preferably the solvent and/or agent only interact with the surface of the organic coating so that the integrity of the coating is not compromised.

The solvent may be a single solvent or a combination of two or more solvents. Preferably the solvent is an organic solvent. Suitable organic solvents or solvent combinations depend on the surface modifying agent employed (e.g. (a) to (e) above) and include but are not limited to:

(a) ester based solvents such as ethyl acetate, propyl acetate, isopropyl acetate, butyl acetate, isobutyl acetate, tertiary butyl acetate and glycol ether acetates;

(b) ketones such as methyl ethyl ketone, methyl propyl ketone, methyl amyl ketone, methyl isoamyl ketone, methyl isobutyl ketone and acetone;

(c) alcohols such as aromatic alcohols, for example, benzyl alcohol; aliphatic alcohols, for example, tertiary butanol, n-butanol, secondary butanol, isopropanol, n-propanol, ethanol, methanol and cyclohexanol; and glycol ethers, for example, those marketed by Dow under the trade name Dowanol such as, ethylene glycol, polyethylene glycol, diethylene glycol, triethylene glycol, tetraethylene glycol, propylene glycol, dipropylene glycol, tripropylene glycol and polypropylene glycol and their monoethers such as mono-$C_{1-6}$ alkyl ethers including but not limited to those marketed by Dow under the trade name Downanol E-series and P-series glycol ethers.

(d) ethers such as glycol diethers, for example, the di-$C_{1-6}$ alkyl ethers of glycols such as diethers of ethylene glycol, diethylene glycol, triethylene glycol, tetraethylene glycol polyethylene glycol, propylene glycol, dipropylene glycol, tripropylene glycol and polypropylene glycol including but not limited to diethylene glycol dimethylether, dipropylene glycol dimethyl ether or diethylene glycol methyl butyl ether such as those marketed by Dow under the trade name Downanol E-series and P-series glycolethers; and cyclic ethers such as tetrahydrofuran;

(e) amides such as N-methyl pyrrolidinone;

(f) aromatics such as toluene and xylene;

(g) halogenated solvents such as dichloromethane and tetrachloroethylene; and (h) water In view of the toxicity and negative environmental impact of halogenated solvents (g), it will be understood that they should be used within the constraints of environmental, health and safety regulations.

Preferred solvents are ester based solvents such as ethyl acetate, ethoxyethyl acetate, isopropyl acetate and/or tertiary butyl acetate; ketone solvents such as methyl propyl ketone, methyl amyl ketone, methyl isoamyl ketone and/or methyl ethyl ketone; alcohols such as ethanol, methanol, ethoxyethanol, n-propanol, isopropanol, butanol, tertiary butanol and secondary butanol; ether solvents such as $C_{1-6}$ alkyl ethers or combinations thereof (i.e. mixed ethers) of ethylene glycols and propylene glycols including but not limited to glyme, diglyme, triglyme, tetraglyme and dipropylene glycol dimethyl ether and cyclic ethers, for example, tetrahydrofuran; amide solvents such as N-methyl pyrrolidinone; and water.

Preferred solvent combinations include glycol ether:acetate combinations such as dipropylene glycol dimethyl ether:tertiary butyl acetate; ether:alcohol combinations such as diproplyene glycol dimethyl ether:isopropanol, n-propanol, methanol, isobutanol, secondary butanol, tertiary butanol, ethoxy ethanol and/or ethylhexanol; ethylene glycol monomethyl ether:ethanol, methanol, ethoxyethanol and/or isopropanol; glycols and monoether combinations such as dipropylenegylcol-monomethylether, dipropylenegylcol-monobutylether, and/or dipropylenegylcol; ether combinations such as tetrahydrofuran:triglyme and tetrahydrofuran: dipropylene glycol dimethylether; ketones and acetate combinations such as methylethyl ketone:ethoxyethyl acetate and methyl amyl ketone:ethoxyethyl acetate; N-methyl pyrrolidinone:ethyl acetate; ethyl acetate:benzyl alcohol; dipropylene glycol dimethyl ether:polyethylene; and methyl propyl ketone:methyl ethyl ketone. Typical solvent combinations include high and low boiling point solvent combinations.

The solvent(s) are generally present in an amount of less than about 99.999%, preferably greater than about 70%, most preferably in an amount of about 80% to about 99.99% based on the total weight of the activation treatment or the combination of solvent(s), agent(s) and any further optional additive(s).

One or more additives and/or inerts known in the art of coatings may also be used in the method or activation treatment of the present invention. Examples include:

(a) rheology modifiers such as hydroxypropyl methyl cellulose (e.g. Methocell 311, Dow), modified urea (e.g. Byk 411, 410) and polyhydroxycarboxylic acid amides (e.g. Byk 405);

(b) film formers such as esters of dicarboxylic acid (e.g. Lusolvan FBH, BASF) and glycol ethers (e.g. Dowanol, Dow);

(c) wetting agents such as fluorochemical surfactants (e.g. 3M Fluorad) and polyether modified poly-dimethyl-siloxane (e.g. Byk 307, 333);

(d) surfactants such as fatty acid derivatives (e.g. Bermadol SPS 2543, Akzo) and quaternary ammonium salts;

(e) dispersants such as non-ionic surfactants based on primary alcohols (e.g. Merpol 4481, Dupont) and alkylphenol-formaldehyde-bisulfide condensates (e.g. Clariants 1494);

(f) anti foaming agents;

(g) anti corrosion reagents such as phosphate esters (e.g. ADD APT, Anticor C6), alkylammonium salt of (2-benzothiazolythio) succinic acid (e.g. Irgacor 153 CIBA) and triazine dithiols;

(h) stabilizers such as benzimidazole derivatives (e.g. Bayer, Preventol BCM, biocidal film protection);

(i) leveling agents such as fluorocarbon-modified polymers (e.g. EFKA 3777);

(j) pigments or dyes such as fluorescents (Royale Pigment and chemicals);

(k) organic and inorganic dyes such as fluoroscein; and (l) Lewis acids such as lithium chloride, zinc chloride, strontium chloride, calcium chloride and aluminium chloride.

The additive(s) are usually present in an amount of less than about 10% based on the total weight of the activation treatment or the combination of solvent(s), agent(s) and additive(s).

Specific activation methods forming embodiments of the present invention (which may optionally be used in combination) are as follows:

1. Surface Reduction

This method involves using a solvent and an agent such as a reductant, for example, lithium borohydride to cause surface reduction or break down of the organic coating surface. While not wishing to be bound by any theory, it is believed that this method provides reactive entities or a suitable morphology to improve inter-coat adhesion with further coating layers and/or other entities. Suitable solvent or solvent combinations for use in this method are, for example, ether or alcohol based solvents and their combinations such as dipropylene glycol dimethylether and isopropanol.

2. Surface Hydrolysis

This method involves using a solvent and an agent such as a carboxylic acid, for example, acetic acid to cause surface hydrolysis or break down of the organic coating. While not wishing to be bound by any theory, it is believed that this method provides reactive entities or a suitable morphology to improve inter-coat adhesion with further coating layers and/or other entities. Suitable solvent or solvent combinations for use in this method are, for example, ester or amide based solvents such as ethyl acetate or N-methyl pyrrolidinone.

3. Surface Oxidation

This method involves using a solvent and an agent such as an oxidant, for example, trichloroisocyanuric acid to cause surface oxidation or break down of the organic coating. While not wishing to be bound by any theory, it is believed that this method provides reactive entities or a suitable morphology to improve inter-coat adhesion with further coating layers and/or other entities. Suitable solvent or solvent combinations for use in this method are, for example, ester or amide based solvents such as ethyl acetate or N-methyl pyrrolidinone.

4. Surface Exchange

This method involves exposure of the coating surface with a reagent capable of interacting (via transesterification or otherwise) with suitable chemical functionality such as ester and/or urethane moieties or otherwise to modify its chemistry or topography such that it improves the intercoat adhesion with subsequent coating layers. Suitable solvent or solvent combinations for use in this method are, for example, ether or alcohol based solvents and their combinations such as dipropylene gylcol dimethylether and isopropanol or dipropylene glycol dimethylether and n-propanol.

5. Light Induced Photo-Grafting

This method involves applying an agent such as a visible light activated free radical initiator, for example, camphorquinone and an unsaturated species, for example, acrylate or methacrylate to the surface of the organic coating in a solvent. The influence of visible light causes free radical reactions to occur which modify the surface of the coating to improve the inter-coat adhesion of the further coating and/or other entities. Suitable solvents for use in this method include ketone or amide based solvents such as methyl amyl ketone and N-methyl pyrrolidinone.

The substrate for the above methods having an activated coating may be of any type including metals such as aluminum; composites such as carbon fibre reinforced epoxy or glass reinforced epoxy; plastics such as polyimide; elastomers such as polysulfide elastomers; or materials containing glass, wood or fabric. There may also be various "sub" coating layers beneath the coating requiring reactivation such as other decorative coating layers, primers, intermediate layers, conversion or anticorrosion coating layers and the like.

Although polyurethane and epoxy based coatings, particularly polyurethane based coatings are typical, it will be understood that other organic coatings may be activated by the method of the invention.

When the solvent and agent are combined and applied in the form of an activation treatment this may take different physical forms such as solution, suspension, mixture, aerosol, emulsion, paste or combination thereof. Treatments which take the form of a solution or emulsion are preferred.

The activation treatment may be prepared by mixing the components together with any mixing equipment known to those skilled in the art such as but not limited to stirrers, shakers, high speed mixers, internal mixers, inline mixers such as static mixers, extruders, mills, ultra-sound and gas dispersers. When the activation treatment is in the form of a solution, the solution may be prepared as a concentrate and diluted before use or prepared ready for use.

The activation treatment or the application of the individual components thereof may be applied via any method known to those skilled in the art such as but not limited to spray, brush, dip, knife, blade, hose, roller, wipe, curtain, flood, flow, mist, pipette or combinations thereof. Application by spray is typical.

The method of activation may be conducted at ambient temperatures or alternatively at higher temperatures if desirable. The activation treatment or individual components thereof may be applied to small or large areas, to sections of larger parts, components or full infrastructure such as infrastructure associated with the aerospace (e.g. aircraft), automotive (e.g. vehicles), marine (e.g. ships), transportation (e.g. trains), military (e.g. helicopter, missile) or construction industries (e.g. buildings, factories, floors). The surface may have simple or complex geometry or may be at any orientation. Treatment may be conducted once or multiple times prior to interaction with the separate entity. The exposure time of the activation treatment on the coating is more limited by the throughput and applications requirements. As such the exposure time may be short for example one minute or extended for example 24 hours with no detriment to the integrity of the organic coating or materials that may be found on the organic coating such as sealants, and underlying coating structures and substrates.

The organic coating may remain activated in a non-contaminated environment for extended periods of time. In some circumstances, the activation treatment can remove contaminants from the surface in addition to activating the coating.

It may also be preferable to remove excess agent and/or treatment solution from the surface. This process may be conveniently carried out by techniques such as solvent or water rinsing; dry, water or solvent wiping; air or gas knife; vacuum application; removal by squeegee; and/or natural or forced convection evaporation.

Optionally the water or solvent used to remove excess agent and/or treatment solution from the surface of the coating undergoing reactivation can contain additives for example to enhance the removal process, modify the drying time, or reduce corrosion. Such additives include but not limited to ionic and non-ionic surfactants, detergents, anticorrosion additives and wetting agents such as but not limited to those described above. The additives may also include cleaning agents commonly used to clean aircraft such as but not limited to those marketed under the trade names Isoprep, Turco, CeeBee, Ridoline, Formula and Dara-clean by companies such as Brulin, Elf Atochem North America, MacDermid, W. R. Grace, McGean-Rohco and Henkel.

After the coating surface is activated, separate entities such as additional coating layers or coating details, adhesives sealants, pressure sensitive decals or logos, and the like may be applied either immediately or at a later time, providing the surface remains predominantly uncontaminated during storage or that the contamination can be conveniently removed. The activation solution may need to be reapplied in some cases.

Any suitable method known to those skilled in the art may be used to assess whether the adhesive linkage between the organic coating and further coatings and/or other entities is fit for purpose. Such tests include but are not limited to ASTM, ISO, and FAA standards, in-house test methods to simulate in-service performance, in-service performance itself, and durability testing either actual or accelerated. For the case of aerospace coatings, test methods based on water impact, such as whirling arm and the Single Impact Jet Apparatus (SIJA) (MIJA Limited, Cambridge, UK), have been found to be particularly useful for assessing inter-coat adhesion. In these cases, the amount of overcoat removal is related to the level of inter-coat adhesion.

For aerospace applications the activation method of the present invention offers the advantages of improved flow time for the process of reactivation, greater reproducibility and consistency over larger areas and between operators, and improved ergonomics of the process leading to reduced vibration or repetitive motion based injuries for completing the process of reactivation which added together provide a net cost saving.

DETAILED DESCRIPTION OF THE ABBREVIATIONS

In the Examples, reference will be made to the following abbreviations in which:
AFM Atomic Force Microscopy
APP Applications
BAC Boeing Approved Color
BMS Boeing Material Specification
C Celsius
Cl Class
[ ] Concentration
DHS Desothane HS
F Fahrenheit
F Fail
FTIR Fourier Transform Infrared
h Hour
HH high humidity
HSS High strength Steel
IC Intermediate Coating
LH Low humidity
IPA Isopropanol
$LiBH_4$ Lithium borohydride
MAK Methyl amyl ketone
MEK Methyl ethyl ketone
MPK Methyl propyl ketone
Mn Number average molecular weight
Mw Weight average molecular weight
MW Molecular weight
NBA n-butanol
NPA n-propanol
NPZ tetra-n-propylzirconate
NBT tetra-n-butyl titanate
NPT tetra-n-propyltitanate OH&S Occupational Health and Safety
P Pass
PACCS Pre-Applied Composite Coating System
Proglyde DMM (abbreviated, proglyde) dipropylene glycol dimethyl ether
RH Relative Humidity
SEM Scanning Electron Microscopy
SIJA Single Impact Jet Apparatus
SOLO Spray On—Leave On
SOWO Spray On—Wipe Off
SOHO Spray On—Hose off
SS Stainless Steel
tBAC t-butyl acetate
TEAZ triethanolamine zirconate
THF Tetra hydrofuran
TPT tetra-isopropyltitanate
WARE Whirling Arm Rain Erosion
Wt % weight percentage
XPS X-Ray Photoelectron Spectroscopy

DETAILED DESCRIPTION OF THE DRAWINGS

In the Examples, reference will be made to the accompanying drawings in which:

FIG. 1 is photographs showing the impact on different metal alkoxide modifying agents and concentration on inter-coat adhesion. (Base coat: DHS BAC70846, C2. Base cure condition: 16 h, 120 F, ~8% RH. Over-coat: BAC50103, C. Over-coat cure: 4 days, 120 F, 10% RH.);

FIG. 2 is photographs showing SIJA inter-coat adhesion. (Base coat: DHS BAC70846, C2. Base cure condition: 16 h, 120 F, ~8% RH. Over-coat: BAC50103, C. Over-coat cure: 4 days 120 F, 10% RH.);

FIG. 3 is photographs showing the impact of modifying agent dwell time on over-coat adhesion performance. (Base coat: DHS BAC70846, C2. Base cure condition: 16 h 120 F, ~8% RH. Over-coat: BAC50103, C. Over-coat cure: 4 days 120 F, 10% RH.);

FIG. 4 is photographs showing the preliminary stencil interaction results and corresponding SIJA adhesion. (Base coat: DHS BAC70846, C2. Base cure condition: 16 h, 120 F, ~8% RH. Modifying agent dwell time before overcoat ?h. Over-coat: BAC50103, C. Over-coat cure: 4 days, 120 F, 10% RH.);

FIG. 5 is photographs showing the preliminary stencil interaction results and corresponding SIJA adhesion. (Base coat: DHS BAC70846, C2. Base cure condition: 16 h. 120 F, ~8% RH. Modifying agent dwell time before overcoat ?h. Over-coat: BAC50103, C. Over-coat cure: 4 days, 120 F, 10% RH);

FIG. 6 is photographs showing the preliminary water soak data: 3× applications each of modifying agent system in IPA. (Base coat: DHS BAC70846, C2. Base cure condition: 16 h. 120 F, ~8% RH. Over-coat: BAC50103, C. Over-coat cure: 4 days, 120 F, 10% RH.);

FIG. 7 is photographs showing:
a) SOLO treatment solution application on stencil letter and premask diamond quality (Base coat: DHS BAC70846, C2. Base cure condition: 16 h 120 F, ~8% RH. Over-coat: 2 mil DHS BAC50103, C2. Over-coat cure before removal: 16 hr, 120 F.);
b) Effect of solvent combination on stencil letter clarity employing, base coat (DHS BAC70846, C2 with cure condition: 16 h, 120 F, ~8% RH), modifying agent (5 wt % NPZ SOLO with dwell time 1 h), and over-coat (1 mil DHS BAC50103, C with cure condition before removal: 16 hr, ambient);
c) Image quality employing no modification agent or 5 WT % NPZ employing a 20:80 NPA:Proglyde combination. (Base coat: DHS BAC70846, C. Base cure condition: 3 Cycles of 4 hr, 120 F, 9% RH & 8 hr, 75 F 36% RH. Stencil coat: DHS BAC701 Black, C2.);

FIG. 8 is photographs showing scribe adhesion. (Base coat: DHS BAC70846, C2. Cure condition: 16 h, 120 F, 8% RH.);

FIG. 9 is photographs showing stencil pull & scribe adhesion base coat. (DHS BAC70846, C2. Cure conditions: 16 h, 120 F, 8% RH. Over-coat: DHS BAC50103, C2, 1 mil. Over-coat cure: ambient.);

| Stencil Pull Time (min) | Scribe Test Time (h) |
| --- | --- |
| 5 | 1 |
| 30 | 2 |
| 60 | 3 |
| 90 | 4 |

FIG. 12 is photographs showing SIJA inter-coat adhesion (DHS CA8800 paint); cure conditions as indicated.

FIG. 14 is photographs showing SIJA inter-coat adhesion (DHS CA8000 paint); cure conditions as indicated.

Figure 15:
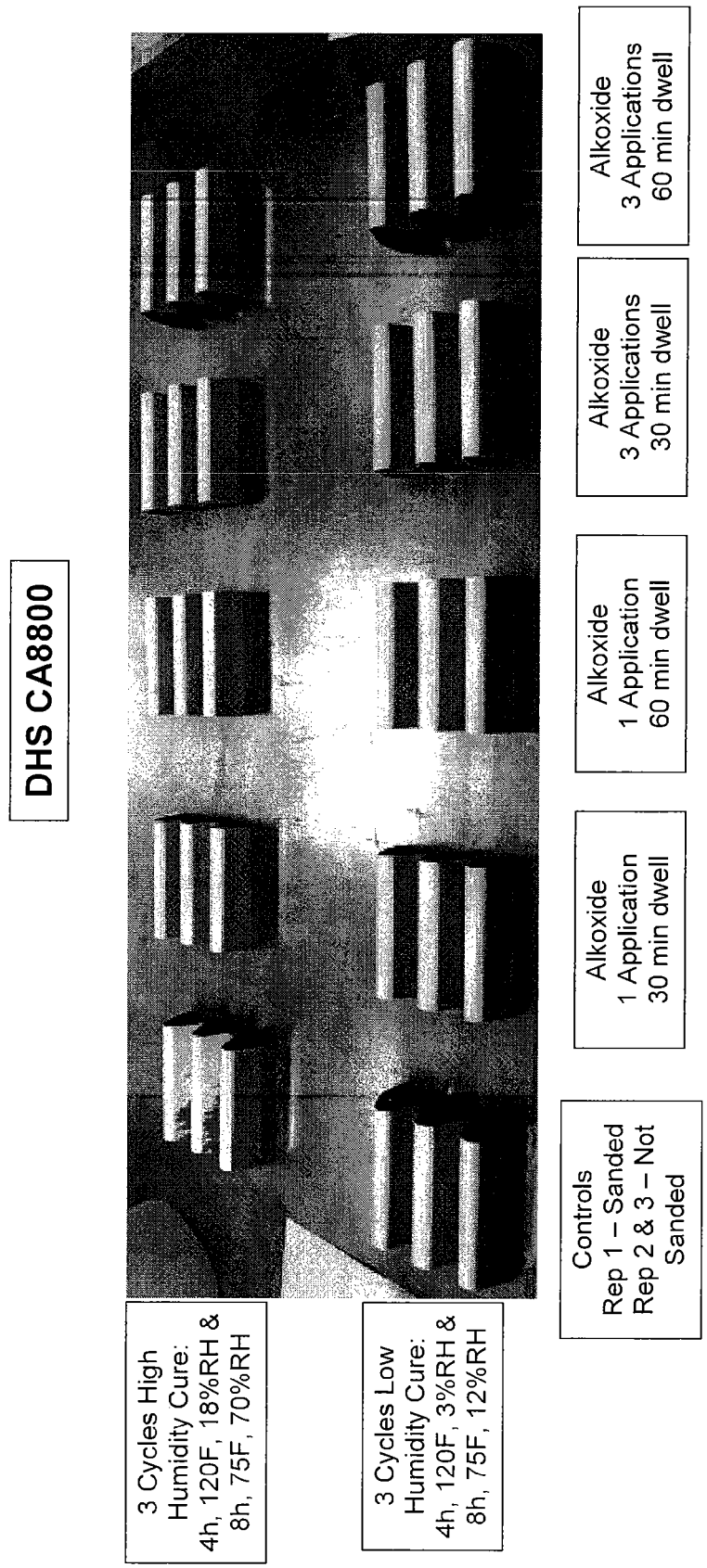
Figure 15:
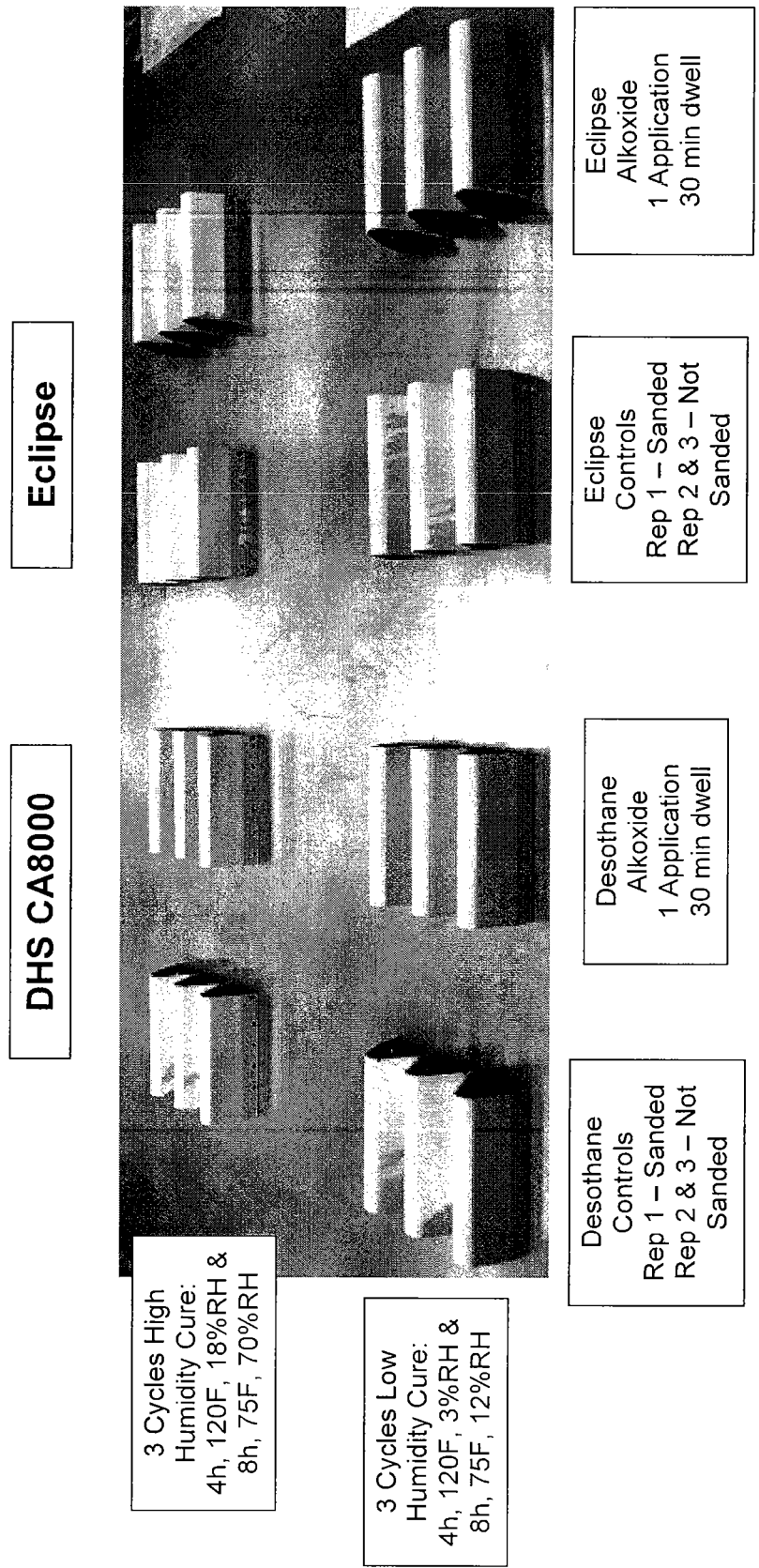
Figure 17A:
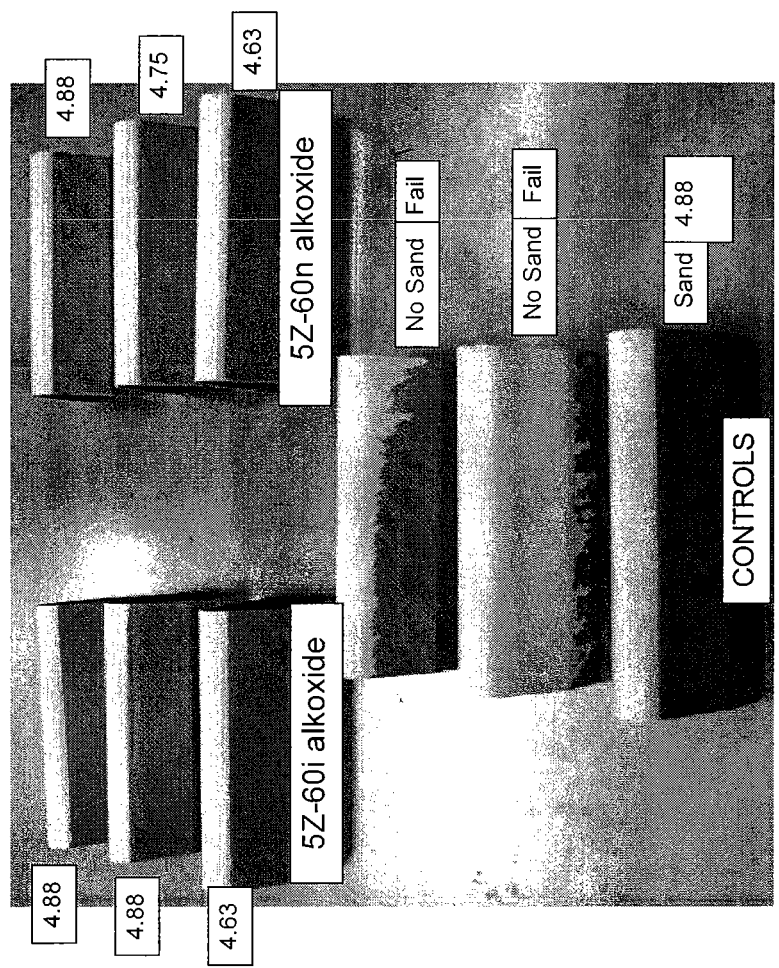
Figure 17B:
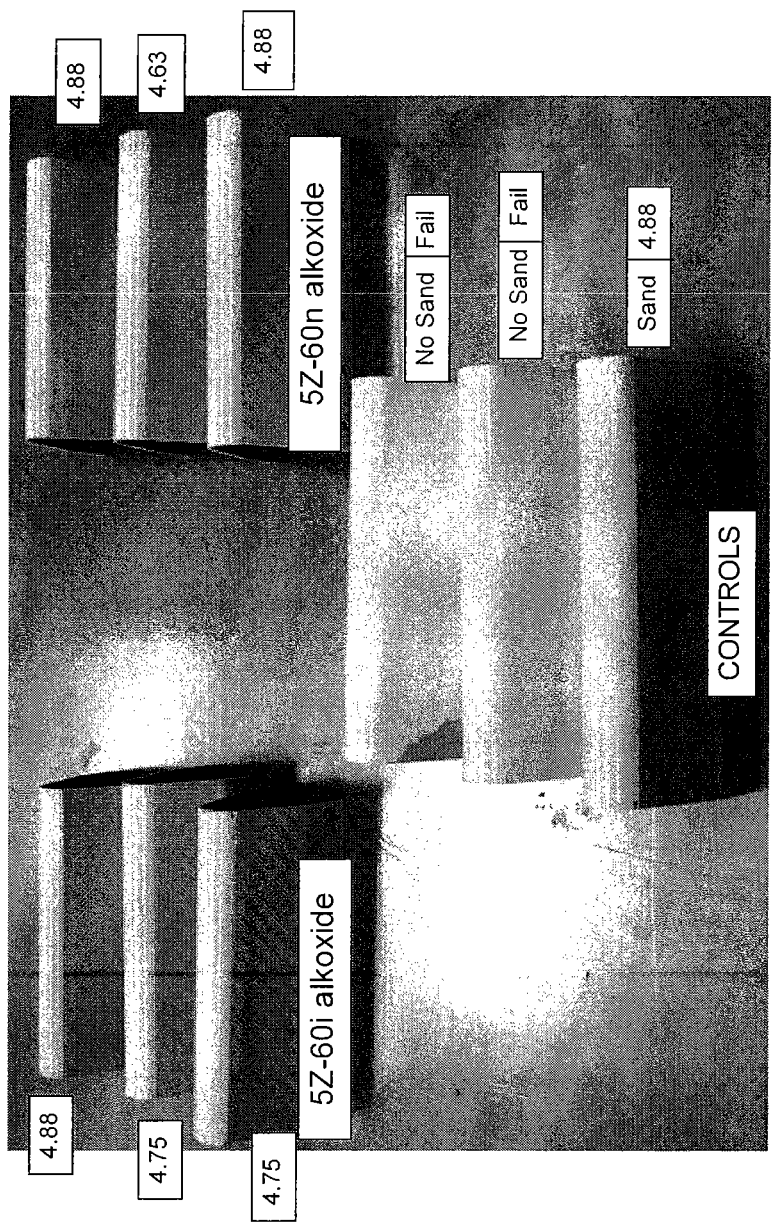
Figure 19:
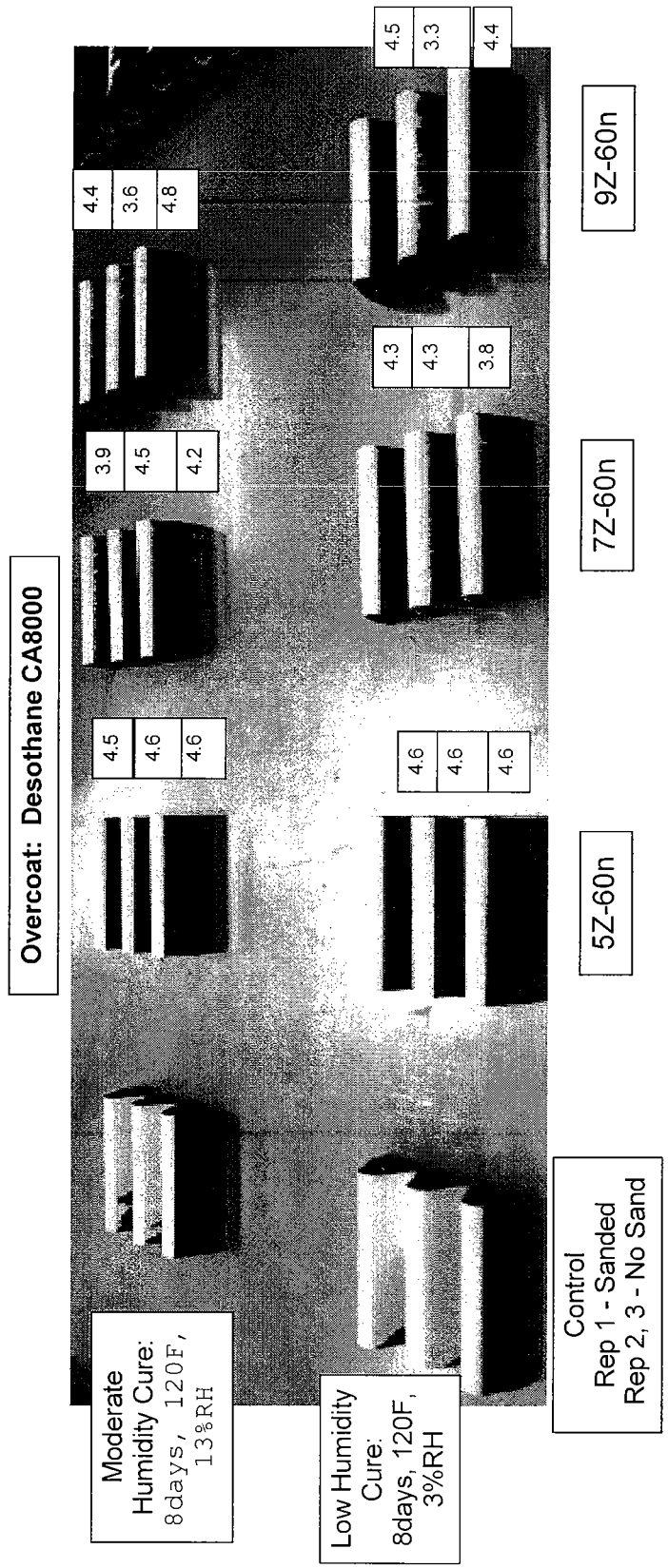
Figure 19:
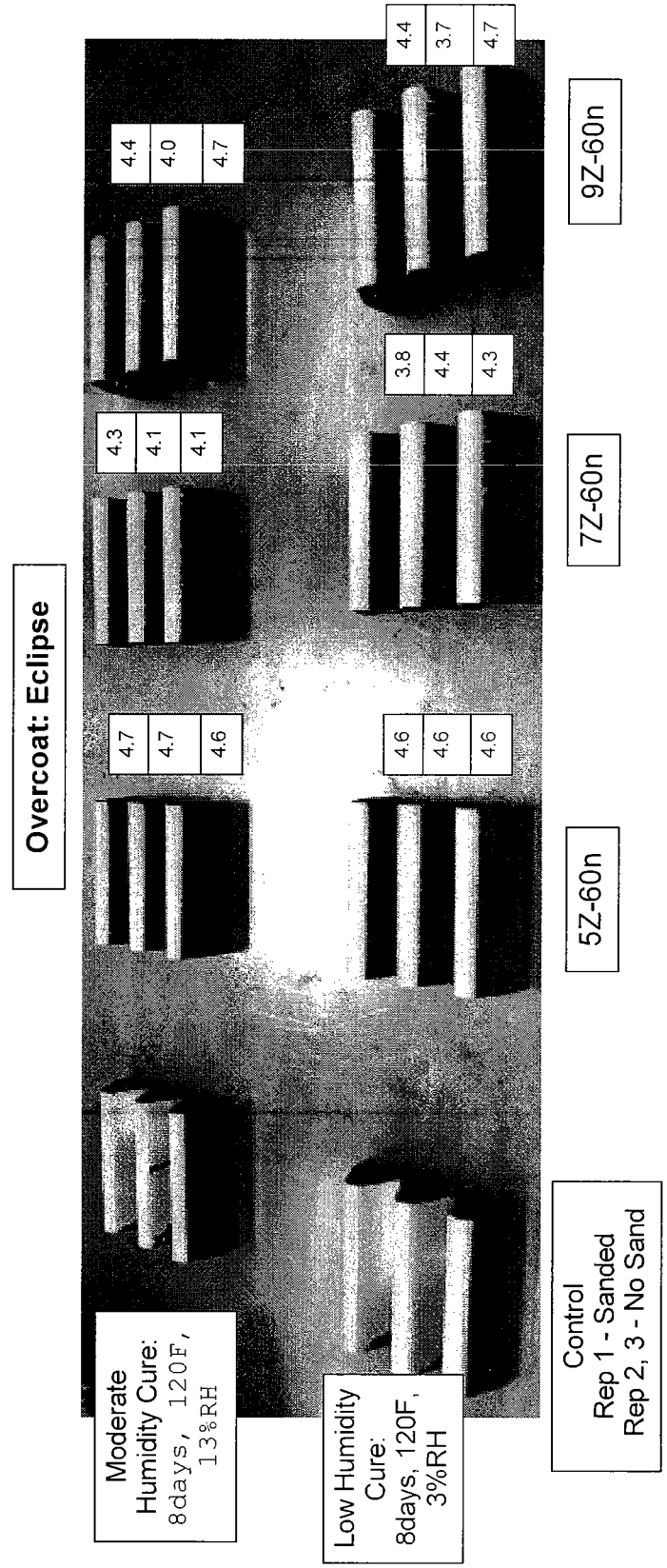
Figure 19:
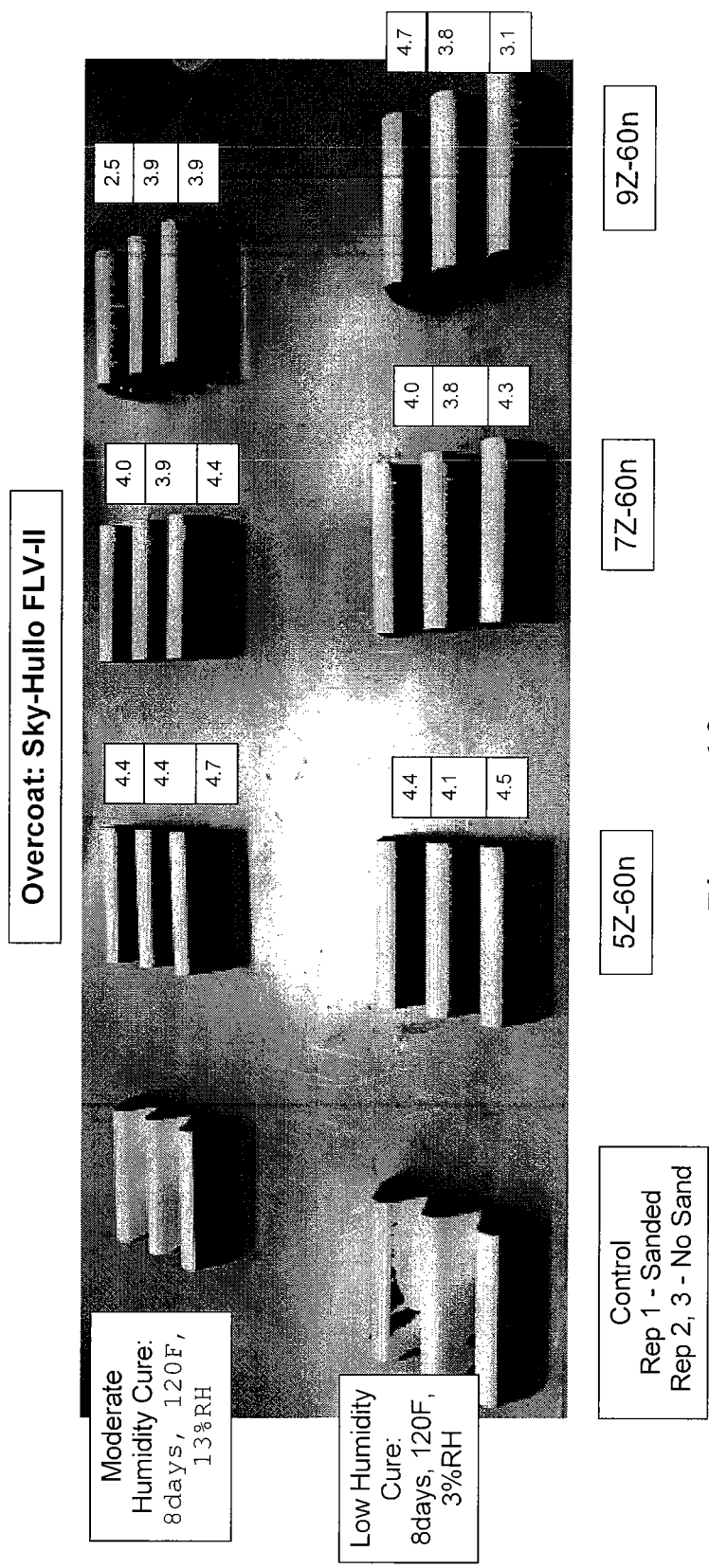
Figure 20:
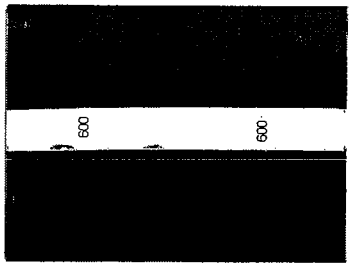

FIG. 15 is photographs showing Whirling Arm Rain Erosion data: Modification agent (alkoxide): 5 wt % NPZ in 80% IPA: 20% proglyde;
DHS CA8800:
Basecoat—BAC70846, CTR Thinner,
Overcoat—BAC70281, CTR Thinner.
DHS CA8000:
Basecoat—BAC70846, C Thinner,
Overcoat—BAC707, C Thinner.
Eclipse:
Basecoat—BAC70846, TR109 Thinner,
Overcoat—BAC707, TR109 Thinner.
Base coat cure conditions as indicated. Overcoat cure conditions: 4 days at 120 F;

FIG. 16 is photographs showing WARE data using DHS CA8800 paint.
a) Basecoat—BAC707 Gray w/ varied thinners, Cure conditions: 3 Cycle Cure—4 h, 120 F, 18% RH+8 h, 75 F 70% RH.
Overcoat—BAC70846 White w/ CTR thinner, Cure conditions: 4 days, 120 F.
b) Basecoat—BAC707 Gray w/ varied thinners, Cure conditions: 3 Cycle Cure—4 h, 120 F, 18% RH+8 h, 75 F, 70% RH.
Overcoat—BAC51265 Blue w/ CTR thinner, Cure conditions: 4 days, 120 F;

FIG. 17 is photographs showing WARE data.
a) Basecoat—DHS CA8800 BAC70846 White w/ CTR thinner, Cure Conditions: 3 Cycles of 4 h, 120 F, 18% RH+8 h, 75 F, 70% RH.
Modification agents (alkoxides)—
5Z-60i: 5 wt % NPZ in 60 wt % IPA and 40 wt % proglyde,
5Z-60n: 5 wt % NPZ in 60 wt % NPA and 40 wt % proglyde.
Overcoat—DHS CA8800 BAC70281 Gray w/ CTR thinner, Cure conditions: 4 days, 120 F.

b) Basecoat—DHS CA8000 BAC70846 White w/ C thinner, Cure conditions: 3 Cycles of 4 h, 120 F, 3% RH+8 h, 75 F, 12% RH.
Modification agents (alkoxides)—
5Z-60i: 5 wt % NPZ in 60 wt % IPA and 40 wt % proglyde,
5Z-60n: 5 wt % NPZ in 60 wt % NPA and 40 wt % proglyde.
Overcoat—DHS CA8000 BAC707 Gray w/ C thinner, Cure conditions: 4 days, 120 F;

FIG. 18 is photographs showing WARE data.
a) Basecoat—Eclipse BAC70846 White w/ TR-109 thinner, Cure conditions: 3 Cycles of 4 h, 120 F, 18% RH+8 h, 75 F, 70% RH.
Modification agents (alkoxides)—
5Z-60i: 5 wt % NPZ in 60 wt % IPA and 40 wt % proglyde,
5Z-60n: 5 wt % NPZ in 60 wt % NPA and 40 wt % proglyde.
Overcoat—Eclipse BAC707 Gray w/ TR-109 thinner, Cure conditions: 4 days, 120 F;
b) Basecoat—Eclipse BAC70846 White w/ TR-109 Thinner, Cure Conditions: LH or HH (See below).
Modification agents (alkoxides)—
5Z-60i: 5 wt % NPZ in 60 wt % IPA and 40 wt % proglyde,
5Z-60n: 5 wt % NPZ in 60 wt % NPA and 40 wt % proglyde.
Overcoat—Eclipse BAC707 Gray w/ TR-109 thinner, Cure conditions: 4 days, 120 F.
Basecoat Cure LH: 4 h, 120 F, 3% RH+8 h, 75 F, 12% RH for 3 cycles,
Basecoat Cure HH: 4 h, 120 F, 18% RH+8 h, 75 F 70% RH for 2 or 3 cycles;
c) Basecoat—Eclipse BAC70846 White w/ TR-109 Thinner, Basecoat Cure—LH or HH (See below).
Modification agents (alkoxides)—
5Z-60i: 5 wt % NPZ in 60 wt % IPA and 40 wt % proglyde,
5Z-60n: 5 wt % NPZ in 60 wt % NPA and 40 wt % proglyde.
Overcoat—Eclipse BAC707 Gray w/ TR-109 thinner, Cure conditions: 4 days, 120 F.
First TC Cure LH: 4 h, 120 F, 3% RH+8 h, 75 F, 12% RH for 3 cycles,
First TC Cure HH: 4 h, 120 F, 18% RH+8 h, 75 F, 70% RH for 2 or 3 cycles;

FIG. 19
Basecoat—DHS CA8000 BAC70846 White w/ C thinner, Cure conditions as indicated.
Modification agents (alkoxides) with 30 minute dwell:
5Z-60n: 5 wt % NPZ in 60 wt % NPA and 40 wt % proglyde,
7Z-60n: 7 wt % NPZ in 60 wt % NPA and 40 wt % proglyde,
9Z-60n: 9 wt % NPZ in 60 wt % NPA and 40 wt % proglyde.
Overcoat cure conditions: 4 days, 120 F.
Overcoats:
DHS CA8000—BAC5004 Blue w/ C thinner,
Eclipse—BAC5004 Blue w/ TR-109 thinner,
Sky-Hullo FLV-II—900BL004 Blue w/ IS-900, Type III thinner;

FIG. 20 is photographs showing the shelf life of metal alkoxide reactivation treatment solutions on adhesion.

Figure 21A:
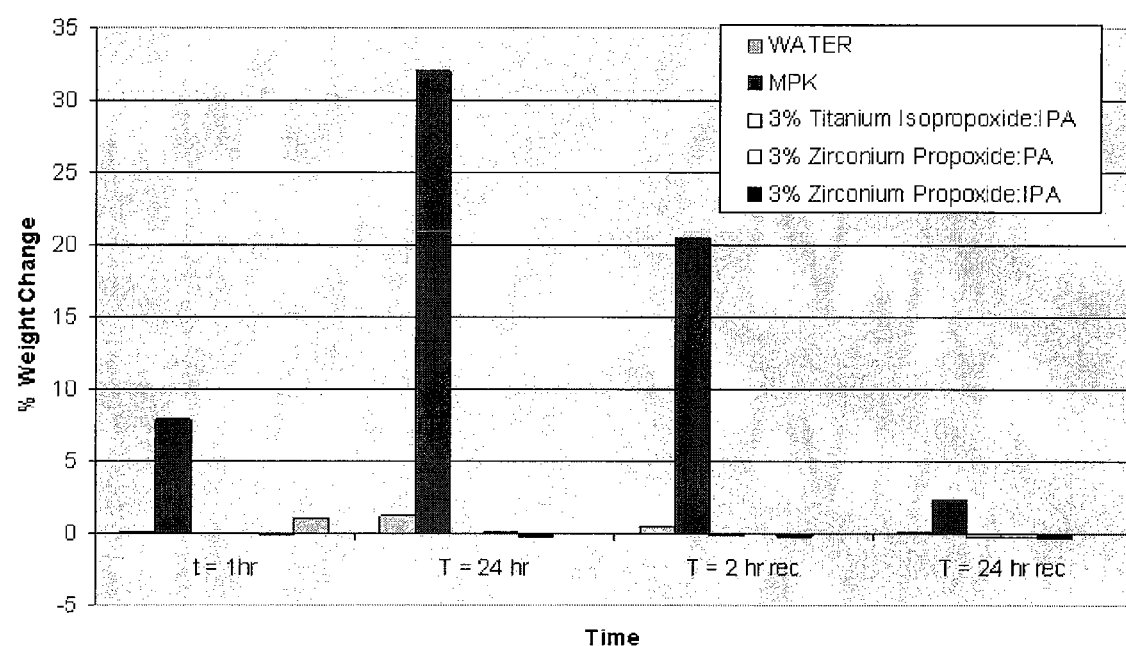
Figure 21B:
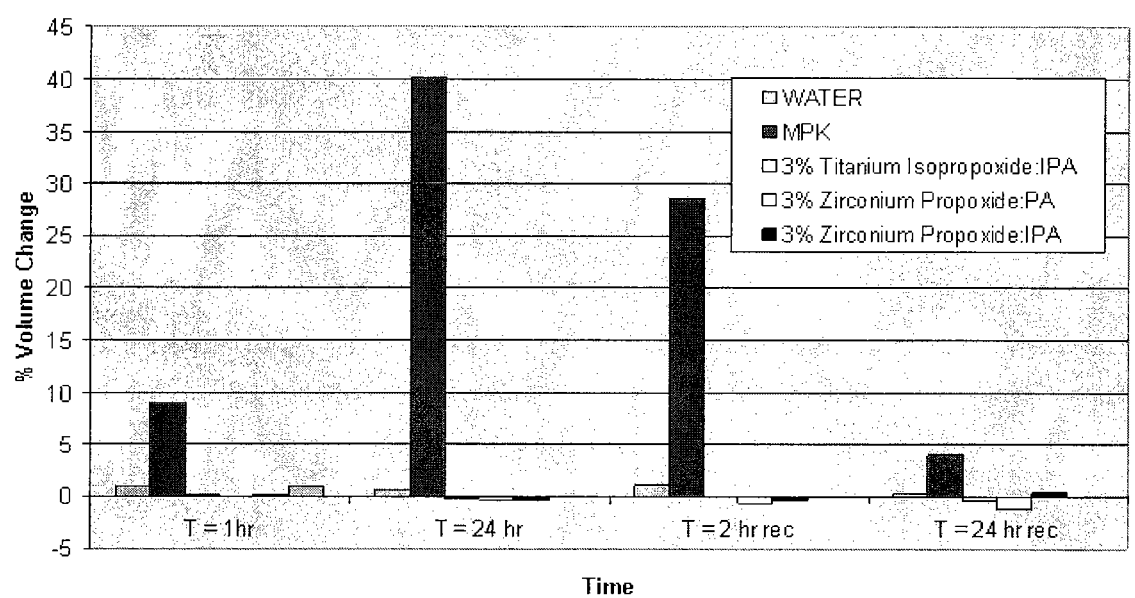
Figure 21C:
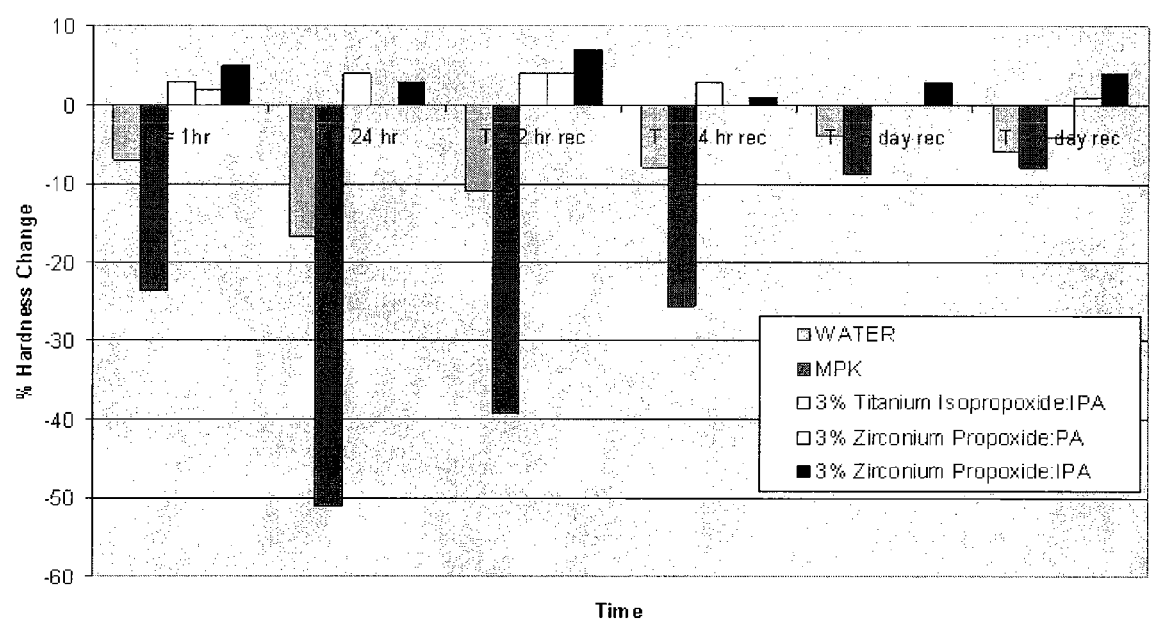
Figure 22A:
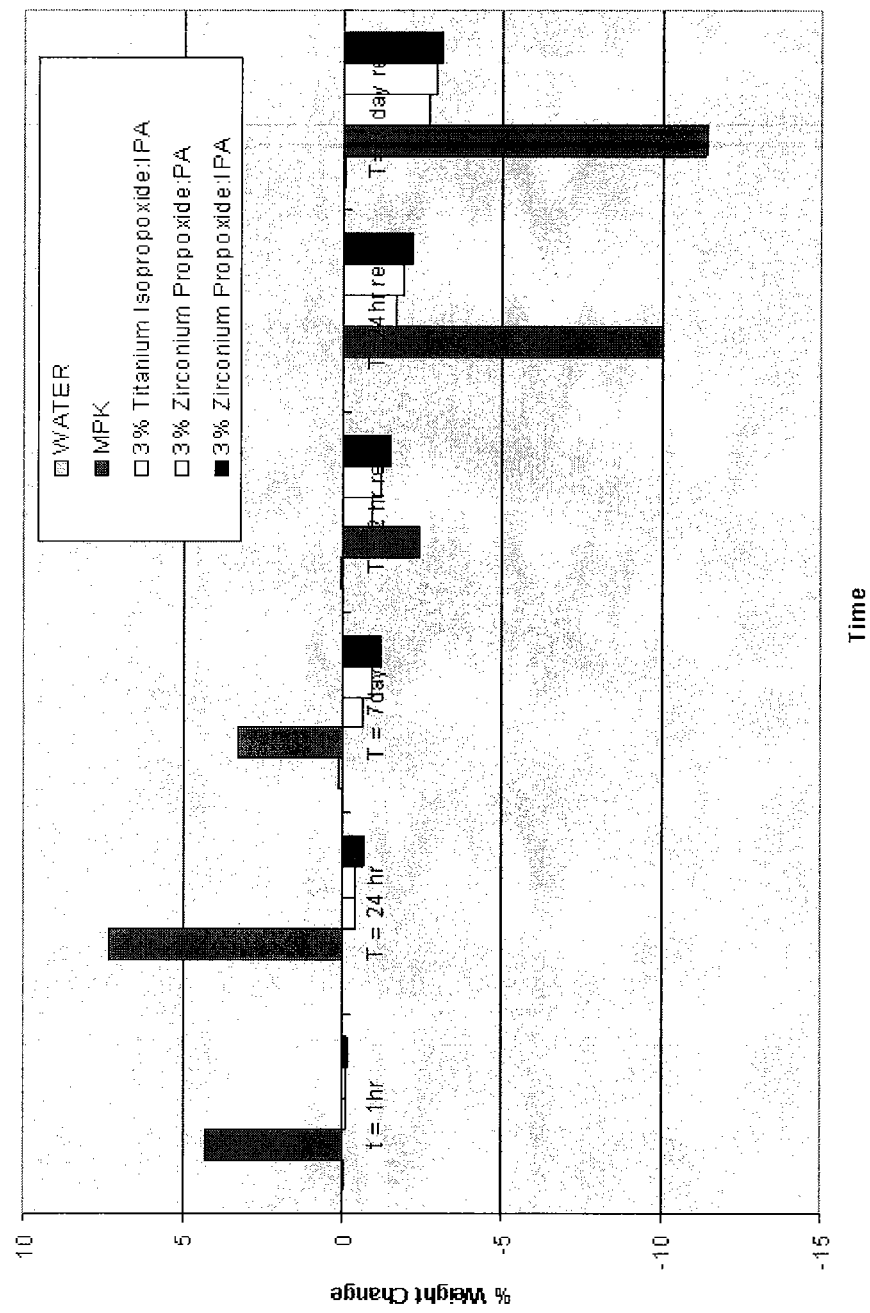
Figure 22B:
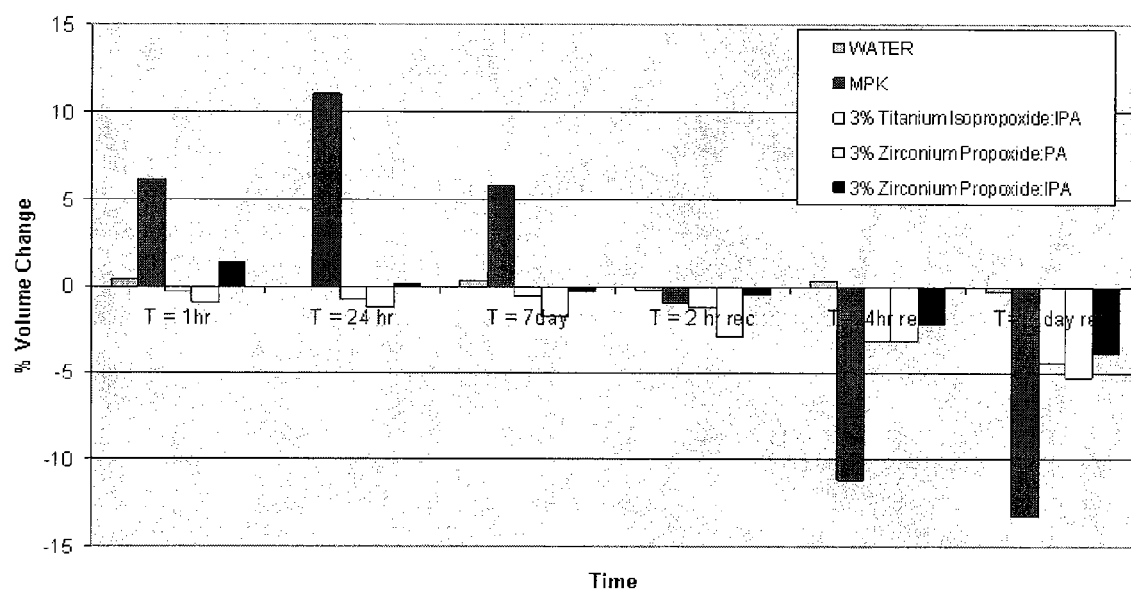
Figure 22C:
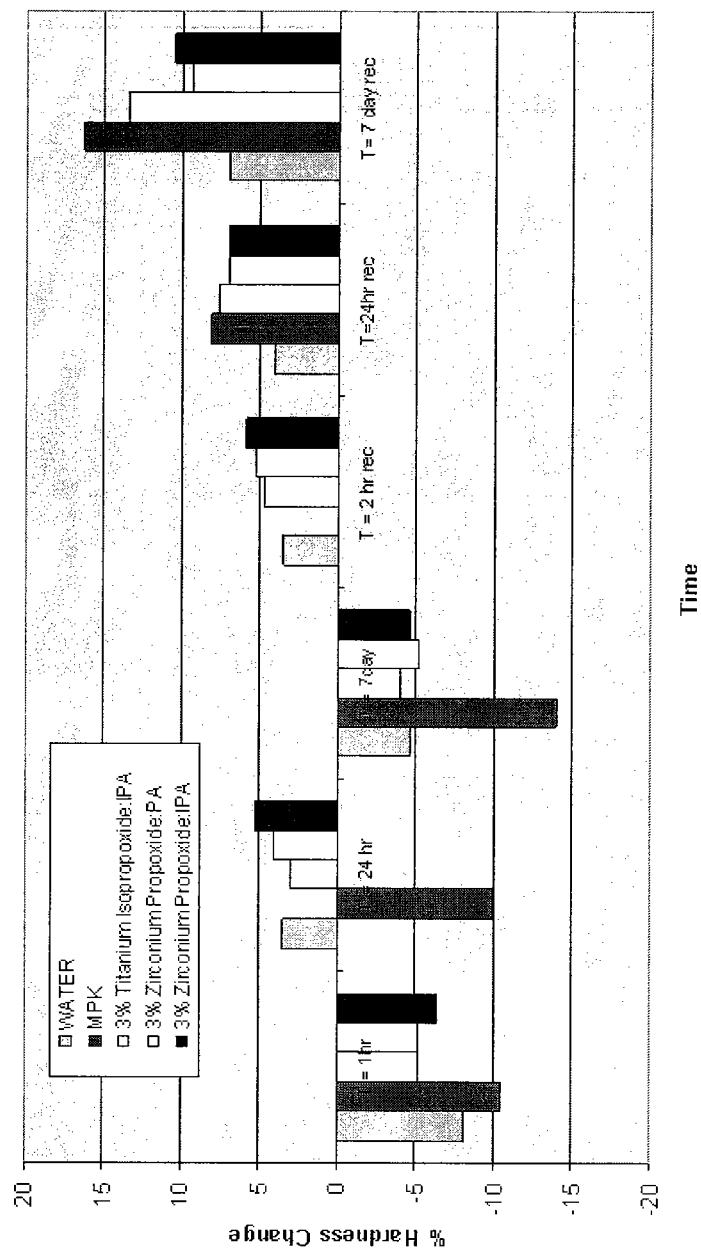
Figure 23A:
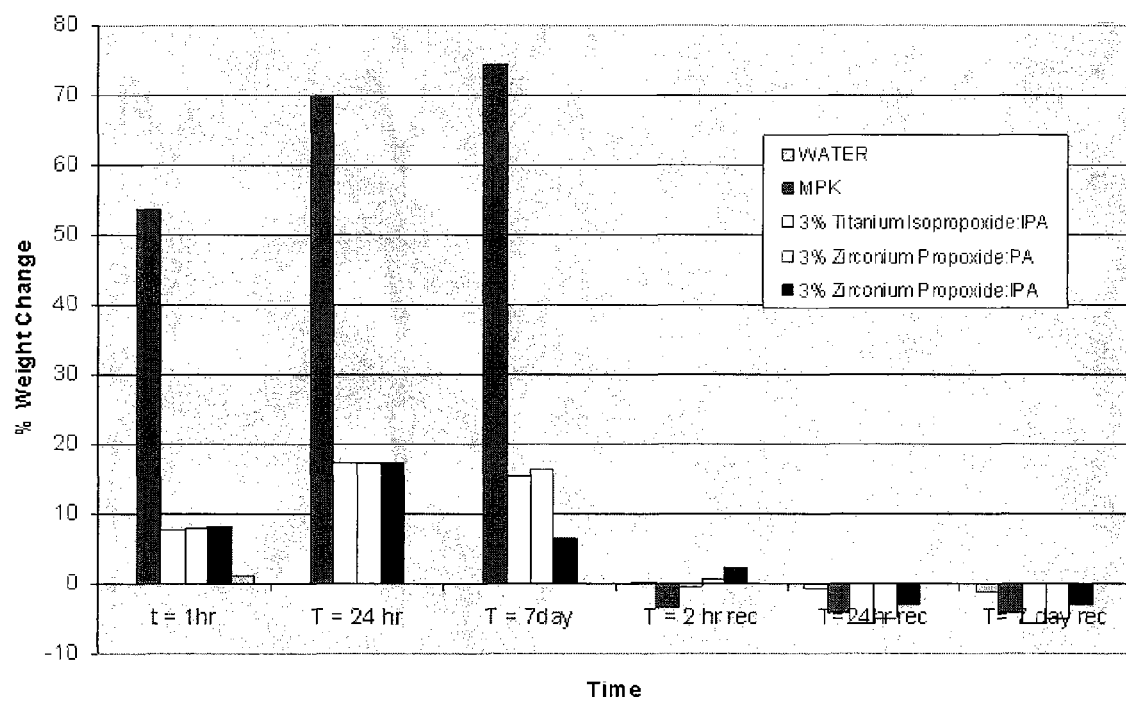
Figure 23B:
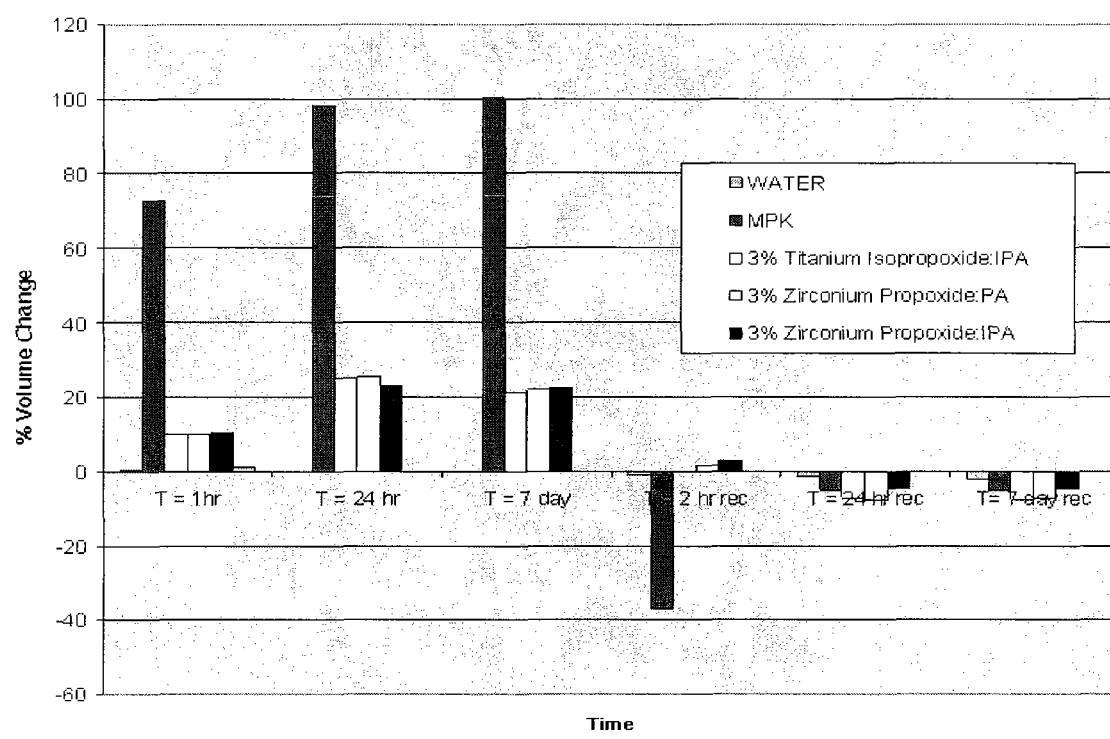
Figure 23C:
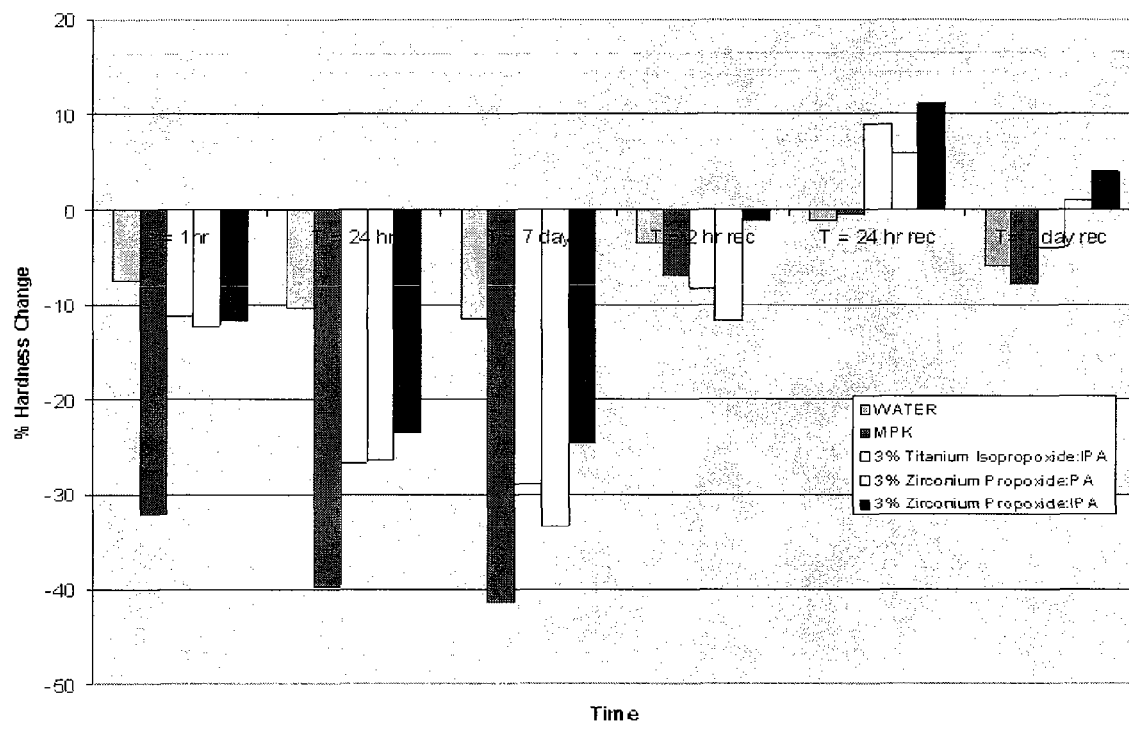
Figure 24A:
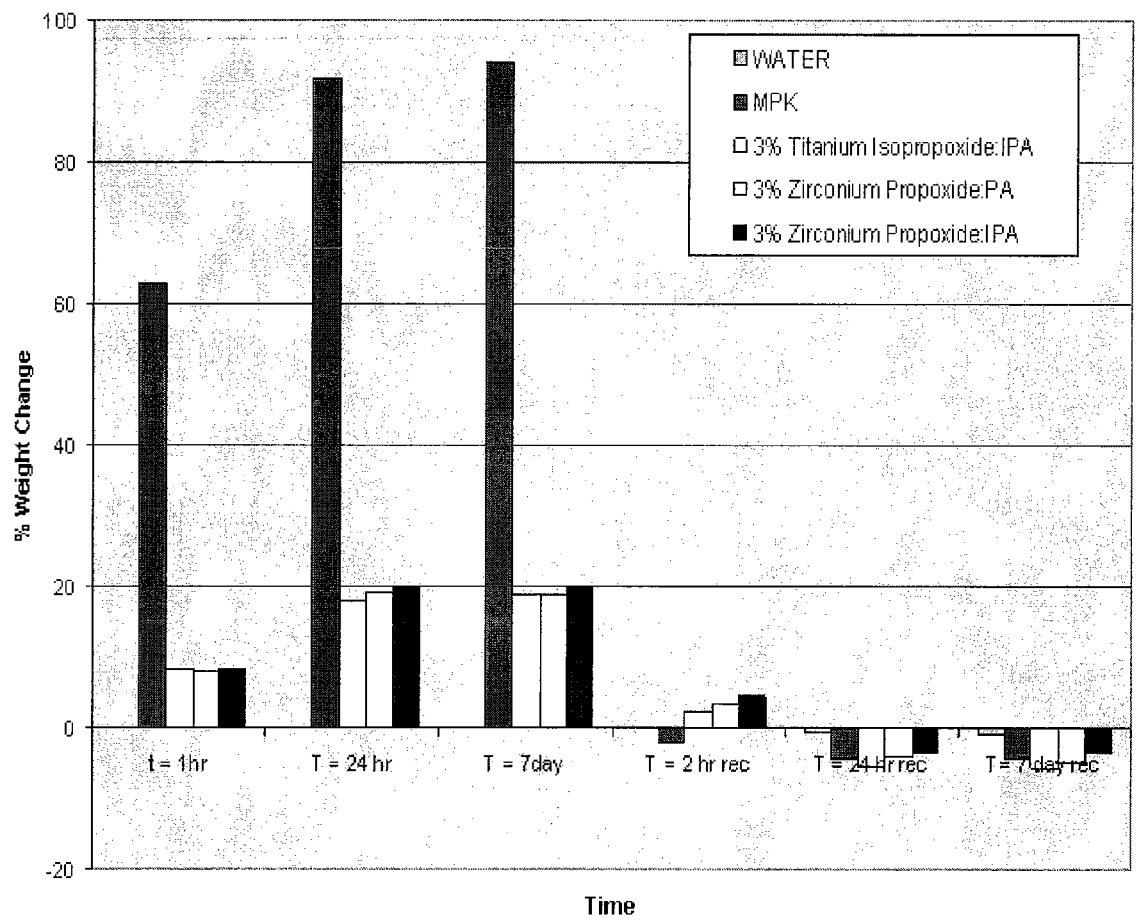
Figure 24B:
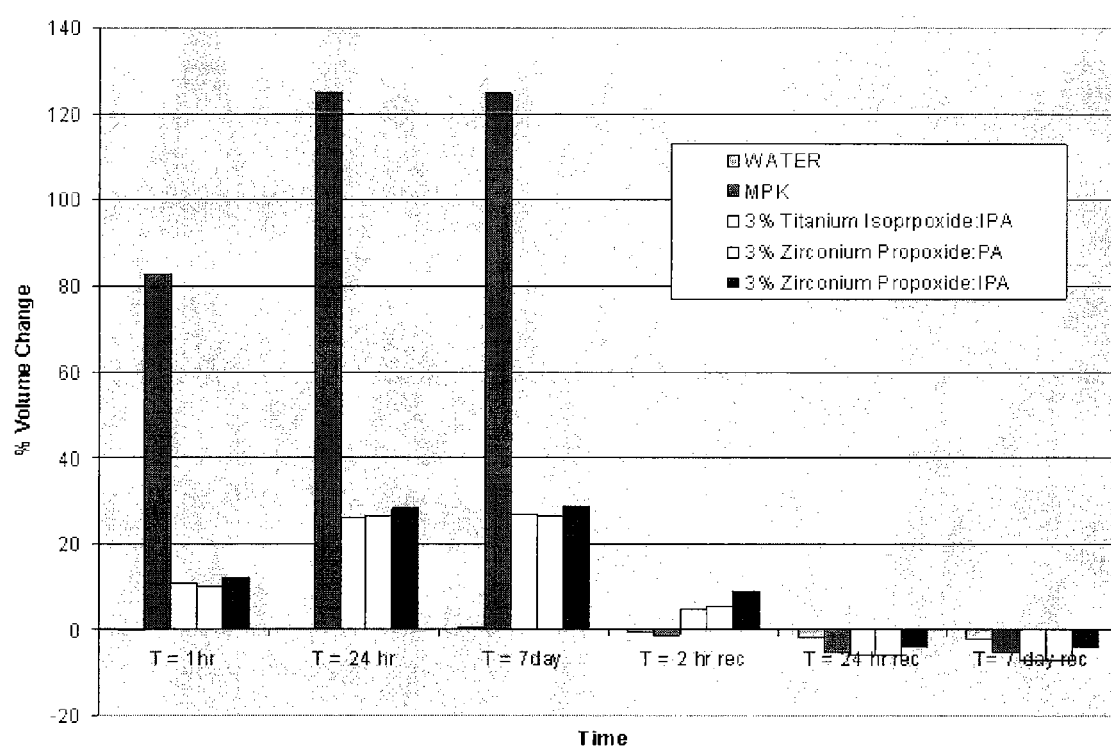
Figure 24C:
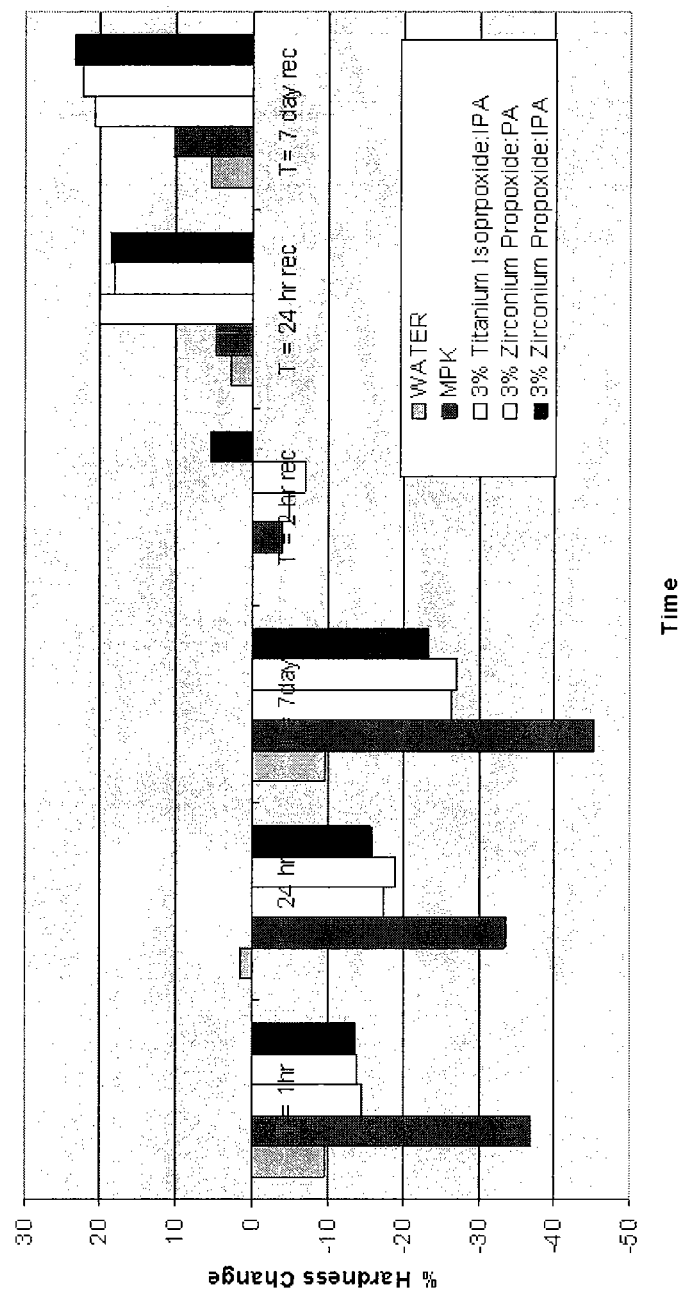
Figure 25:
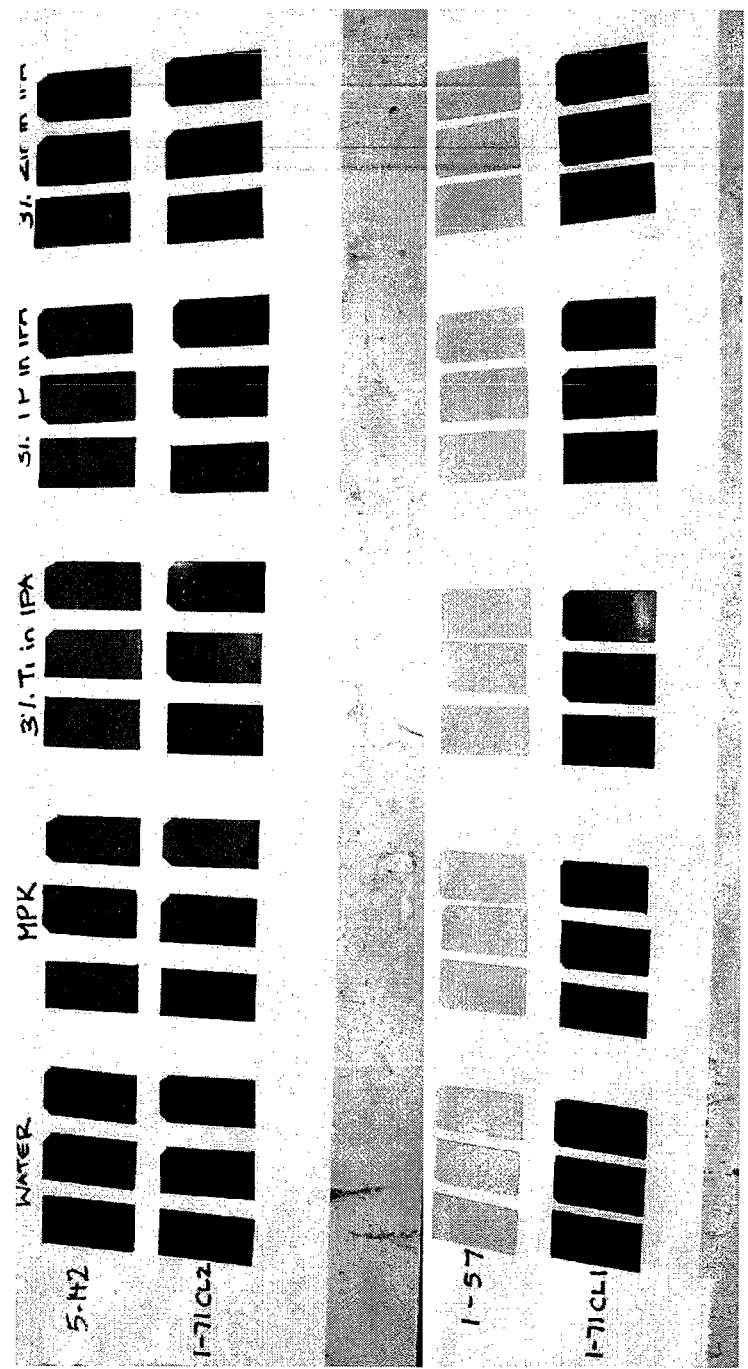
Figure 26:
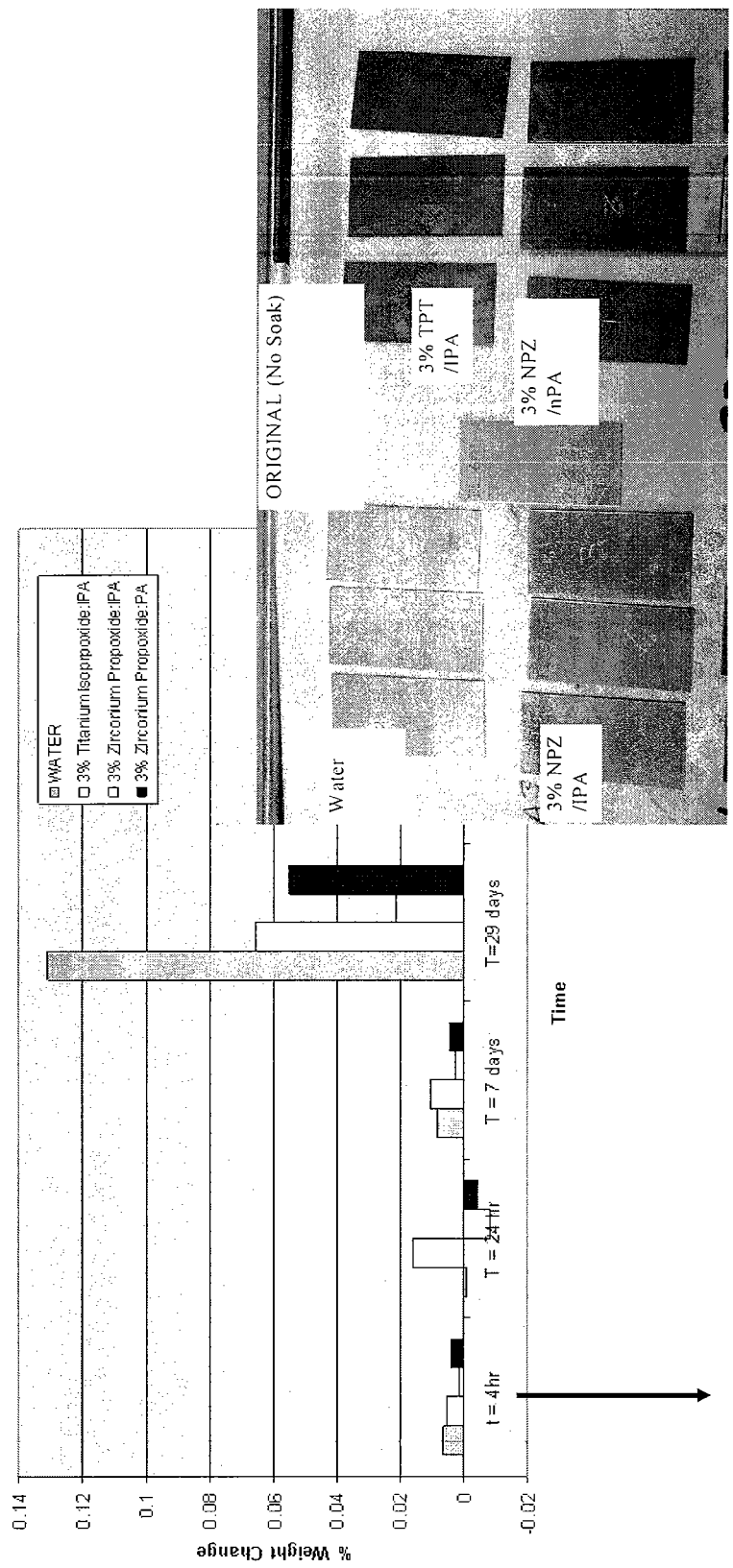
Figure 27:
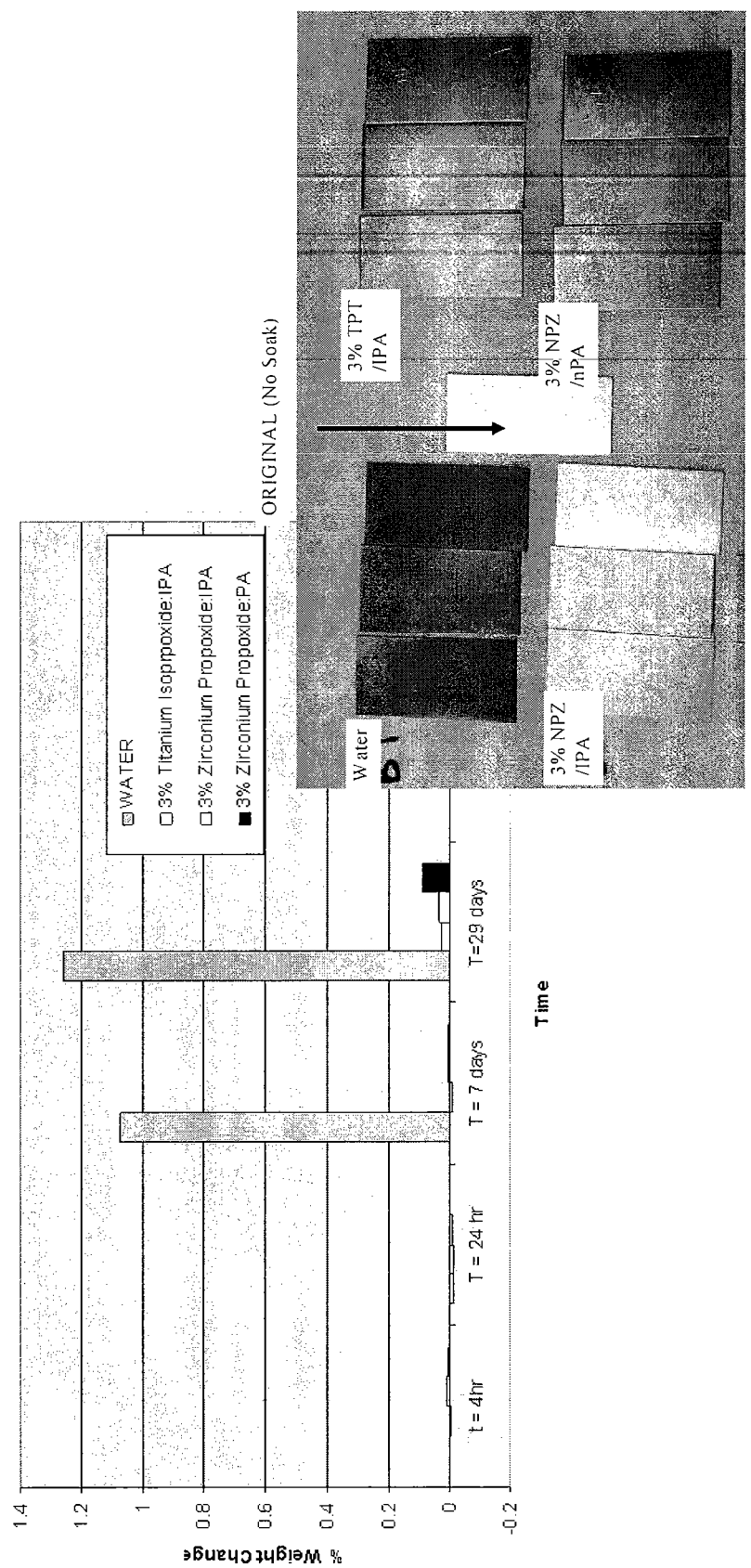
Figure 28:
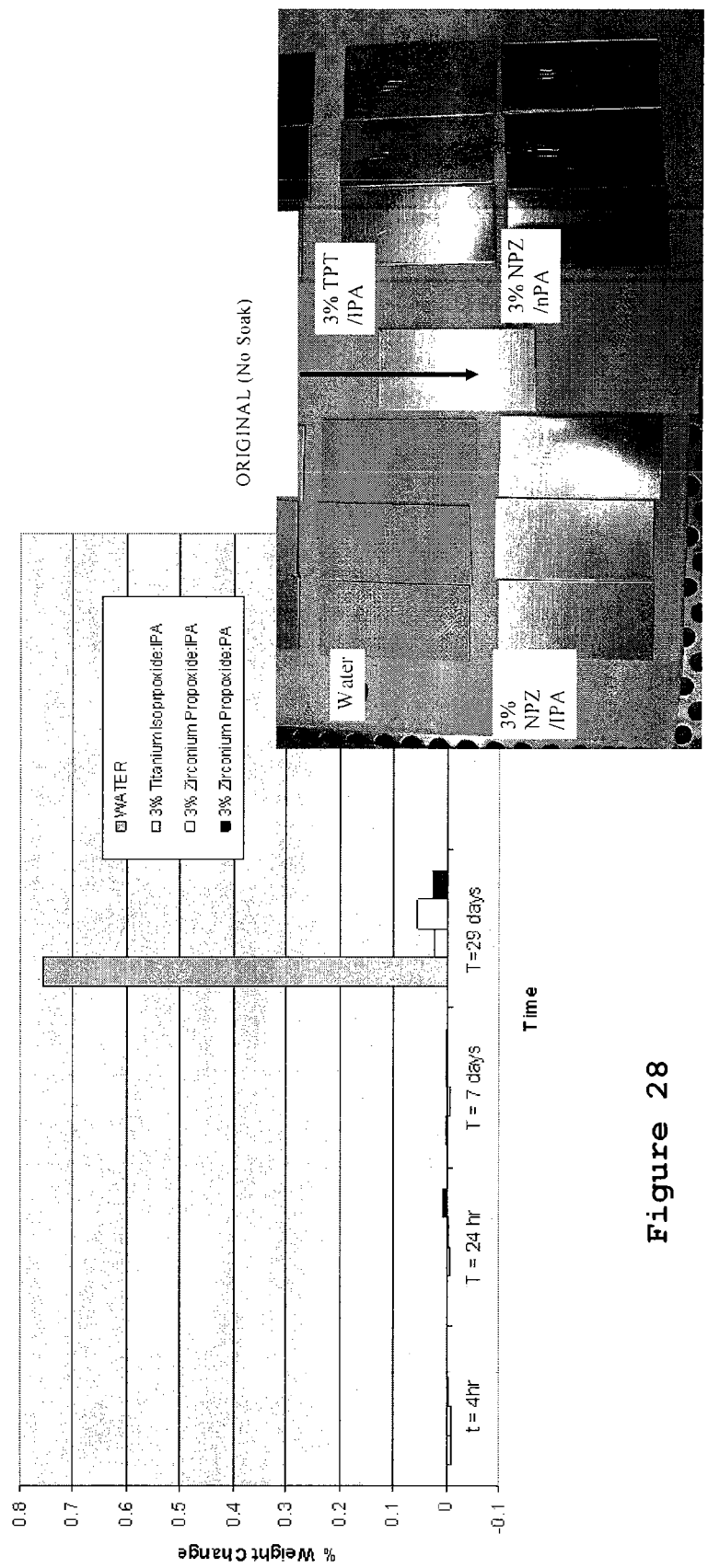
Figure 29:
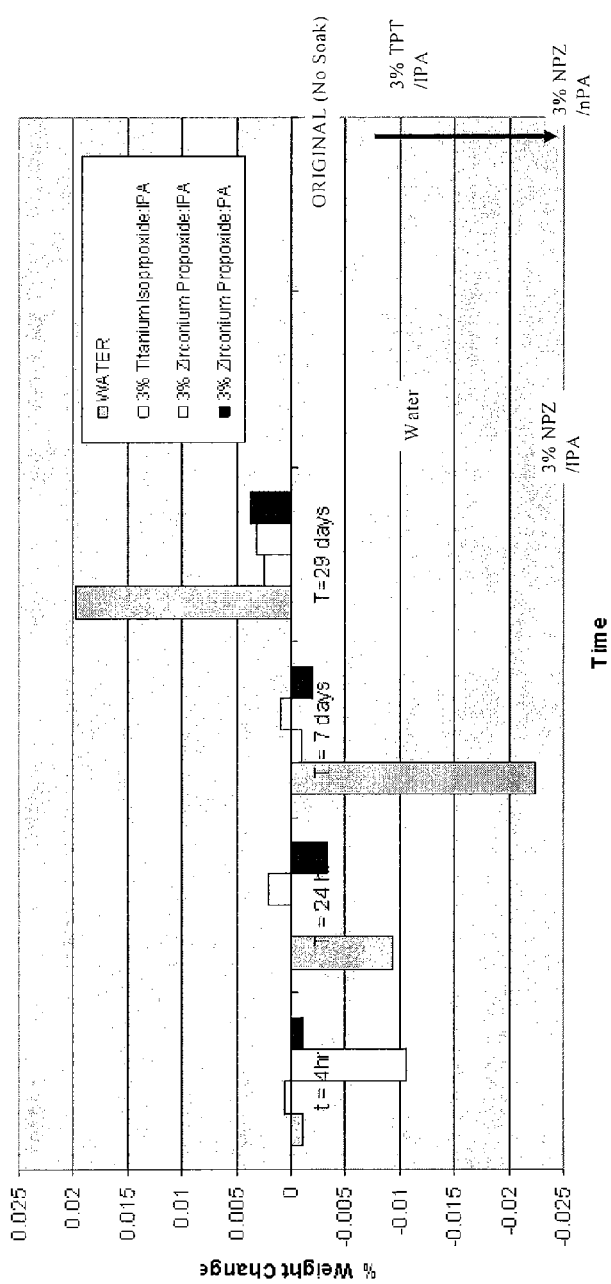
Figure 29:
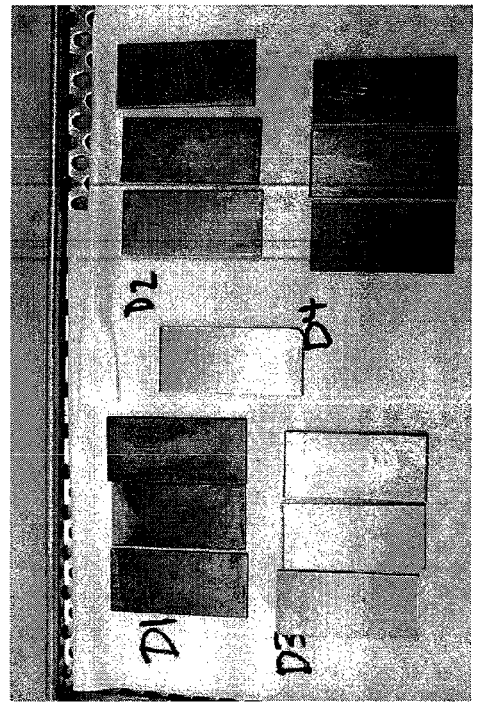
Figure 30:
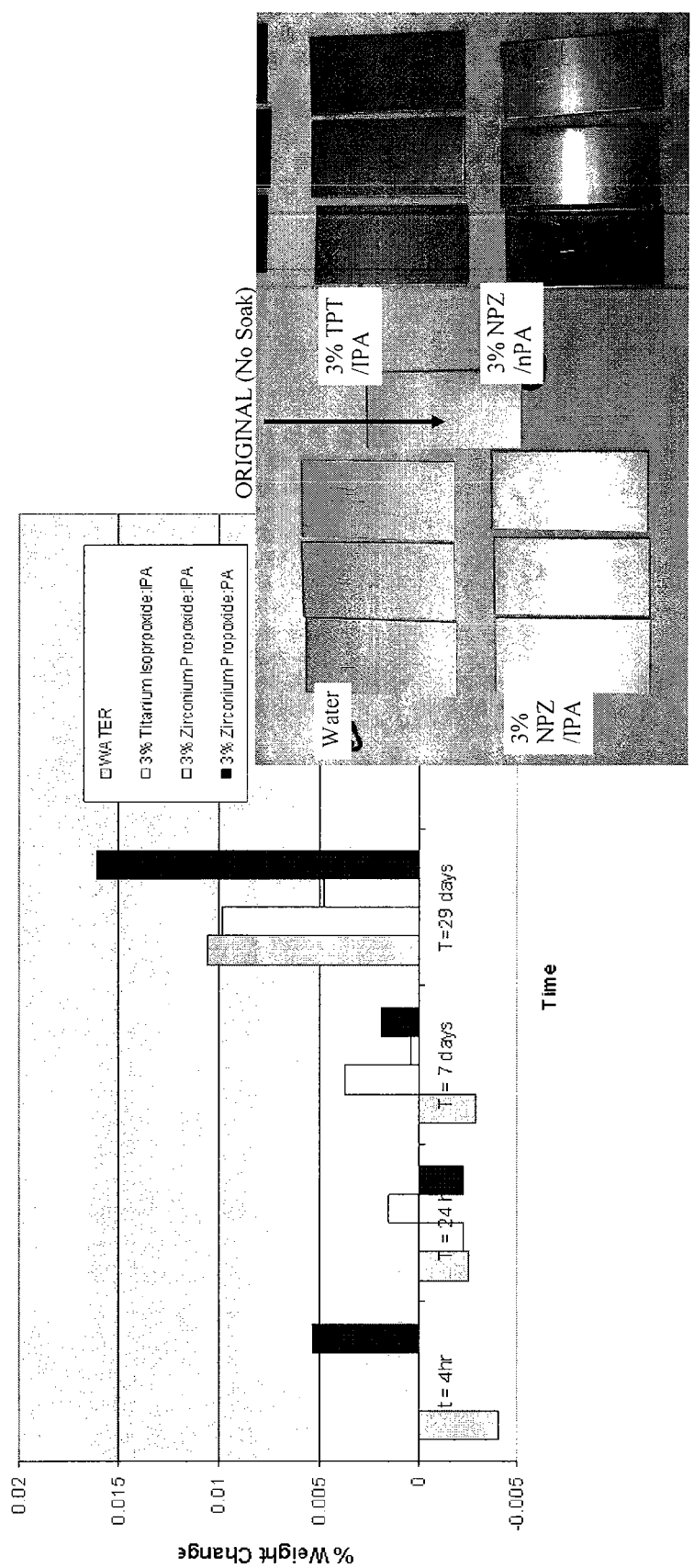
Figure 31A:
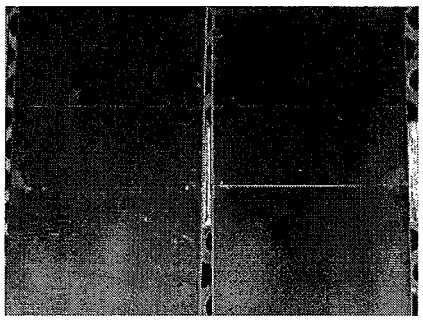
Figure 31A:
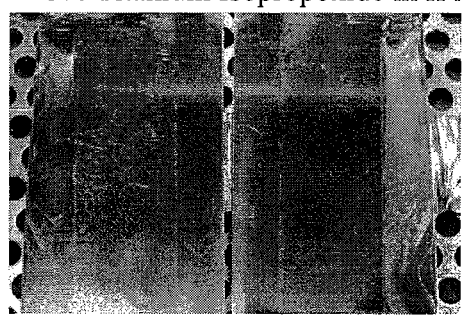
Figure 31A:
Figure 31A:
Figure 31B:
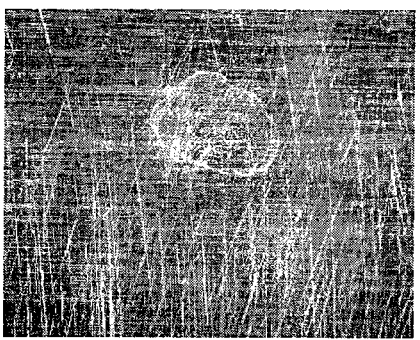
Figure 31B:
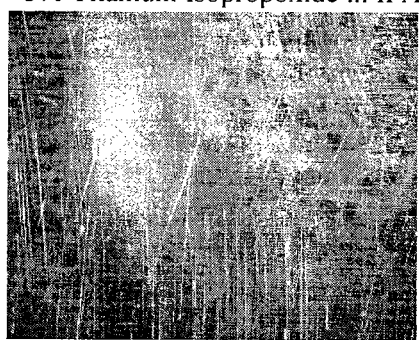
Figure 31B:
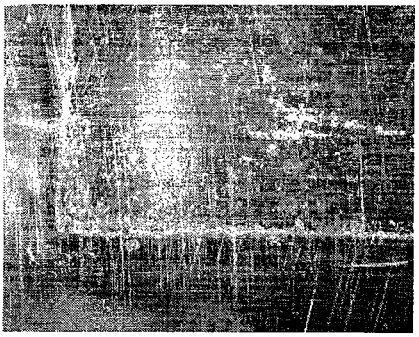
Figure 31B:
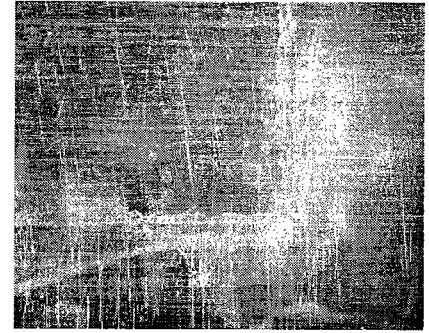
Figure 32:
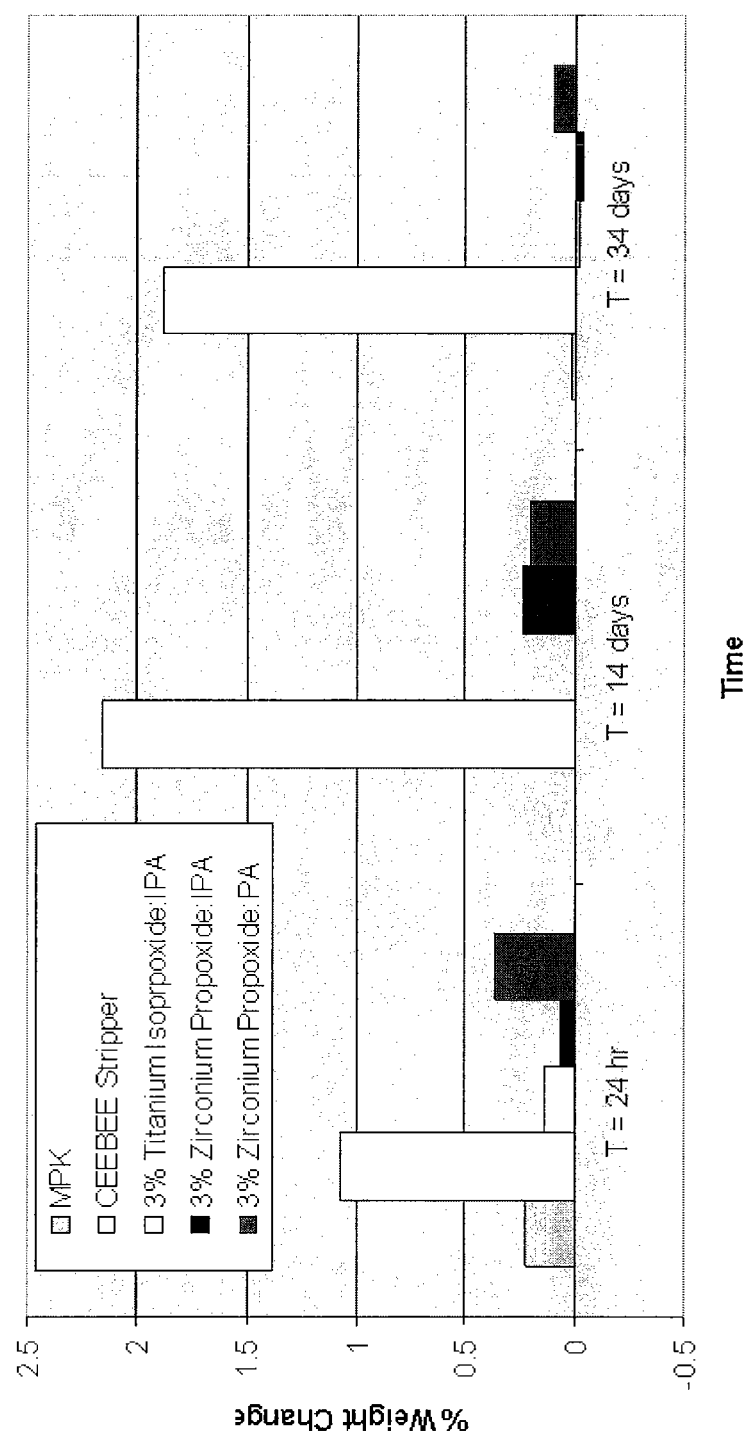
Figure 33:
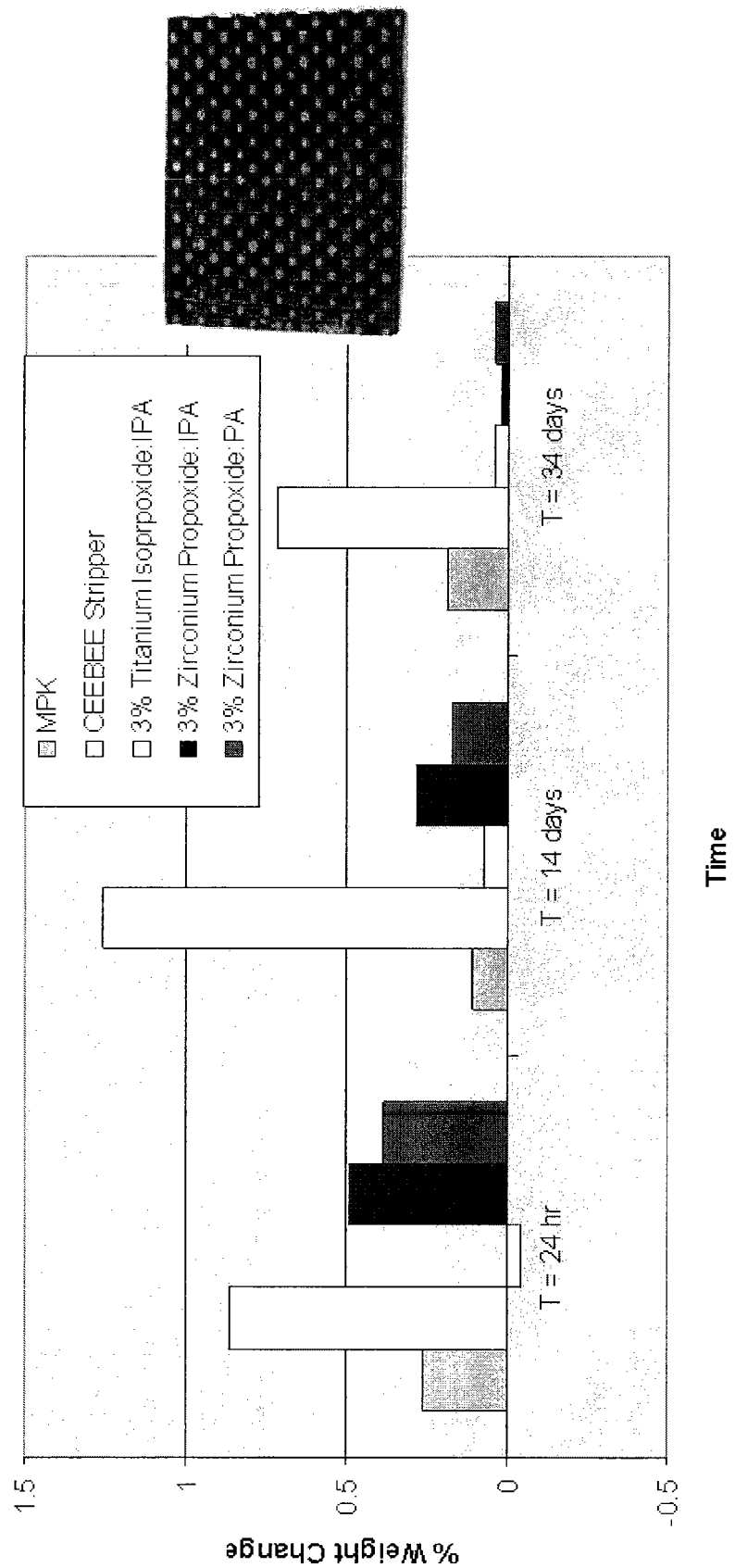
Figure 34:
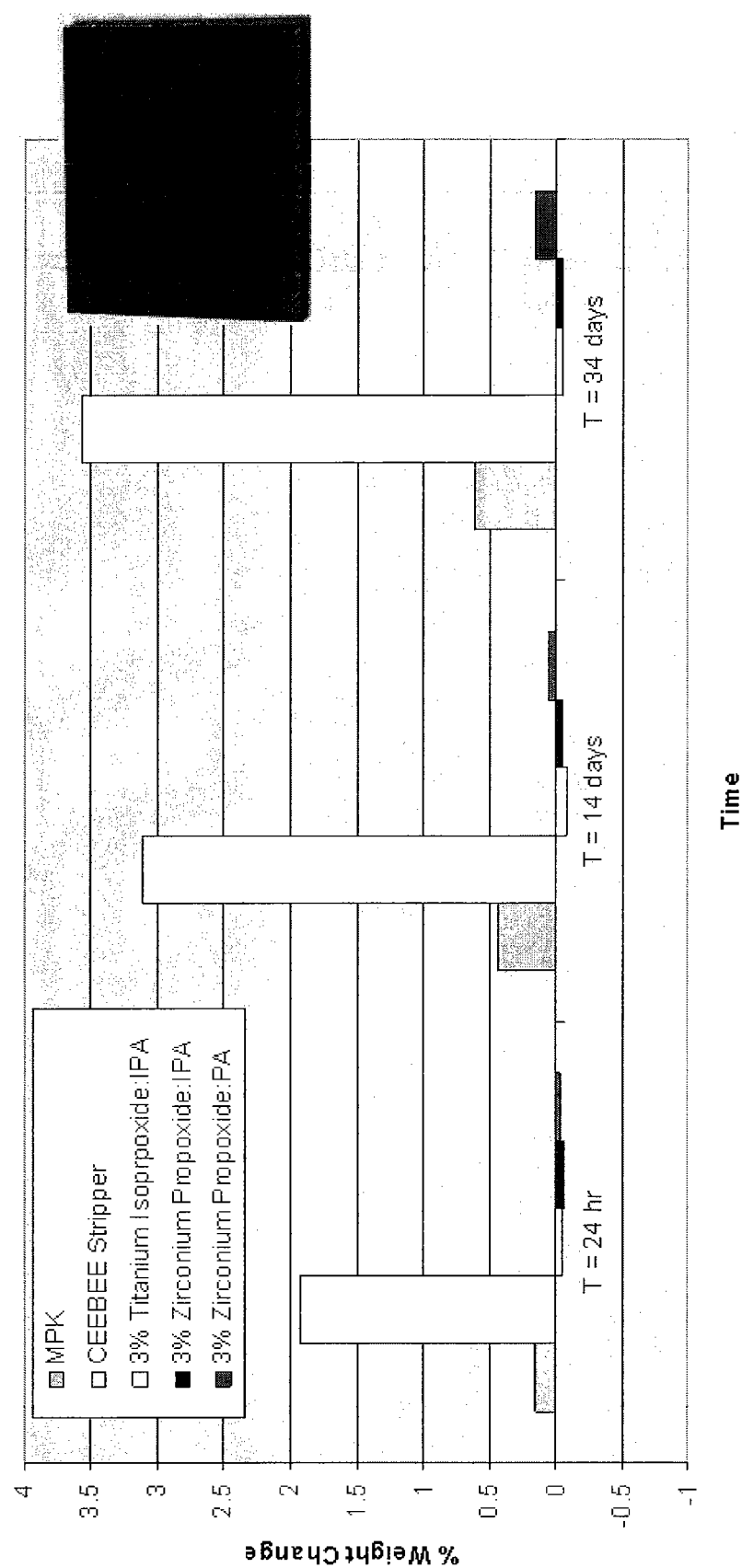
Figure 35:
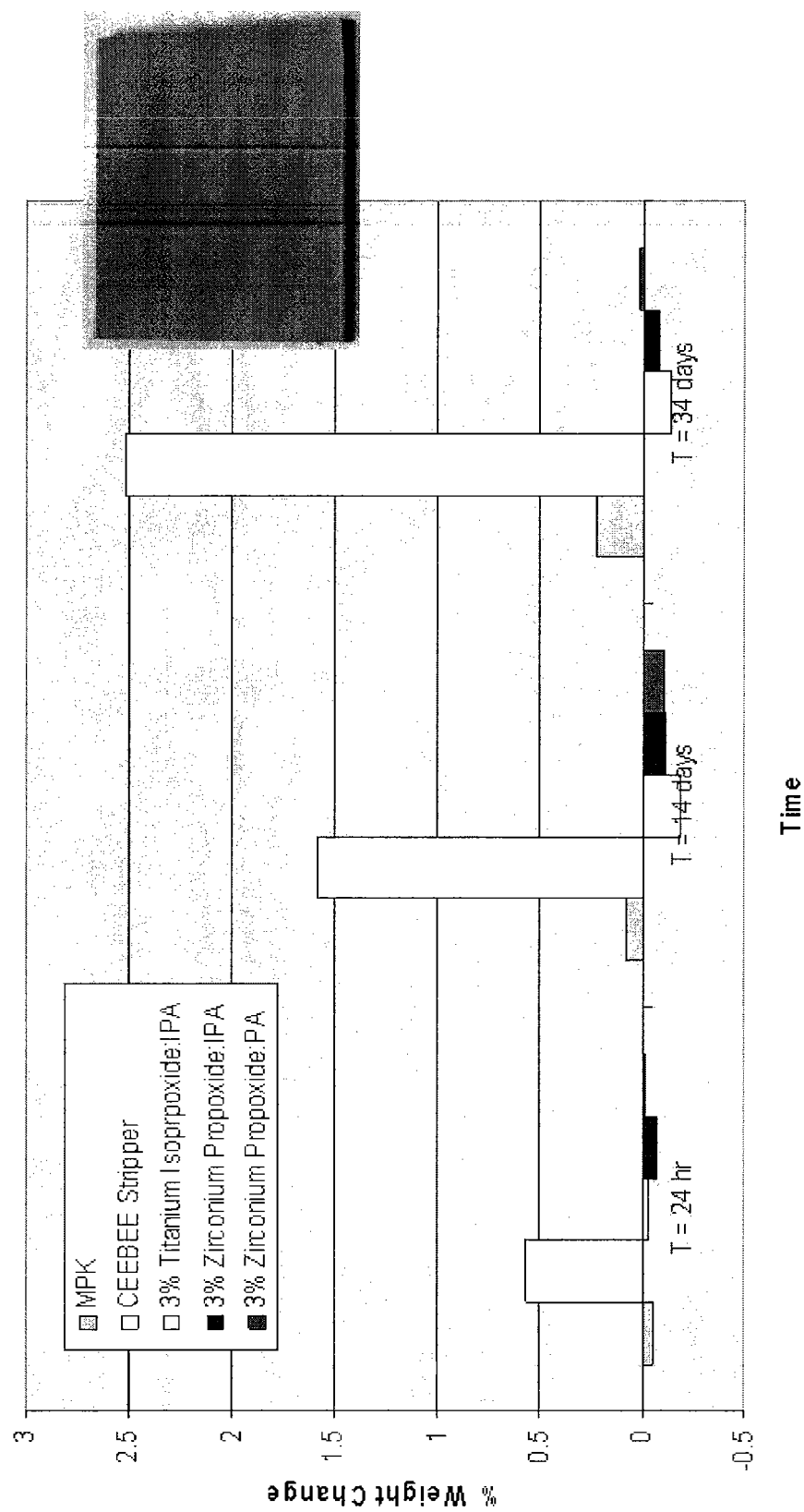
Figure 36:
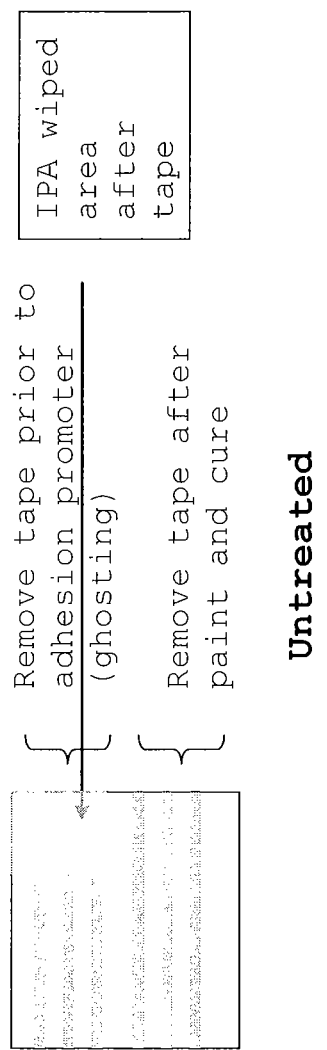
Figure 36:
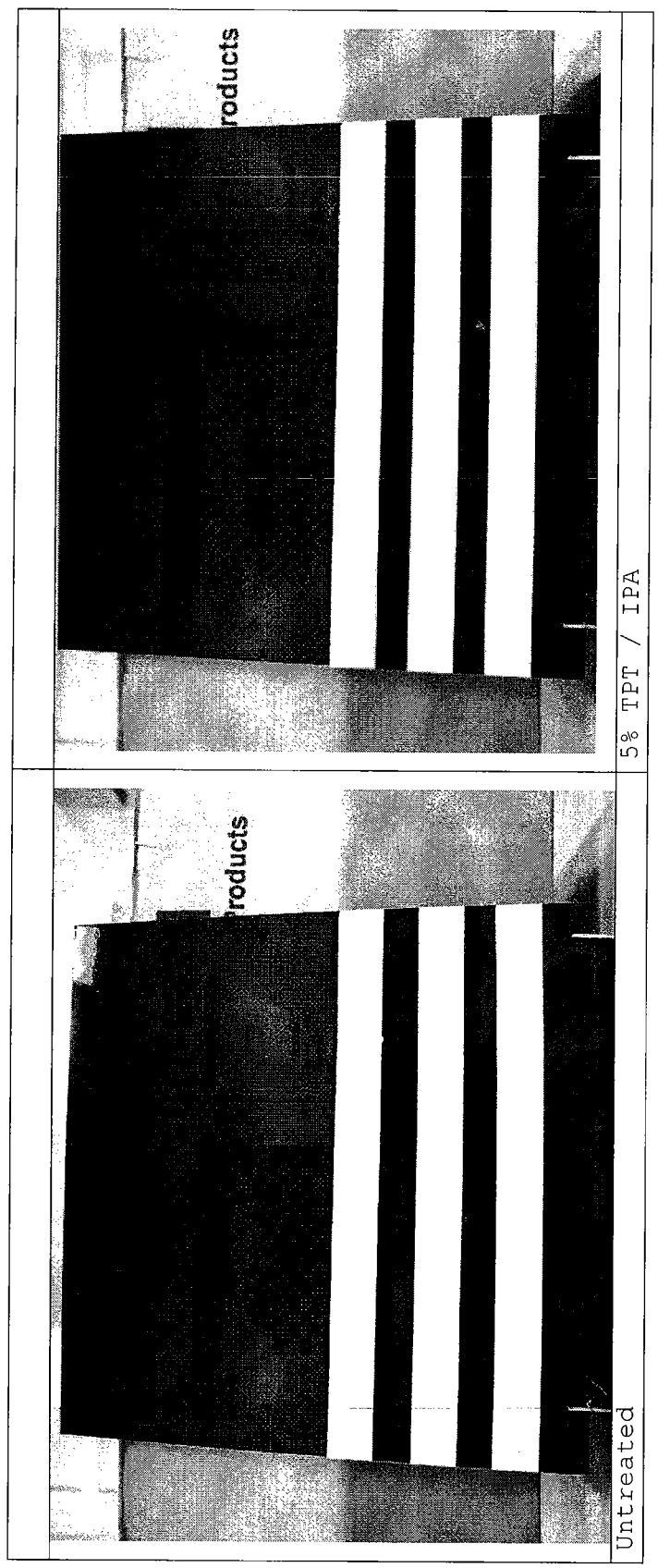
Figure 36:
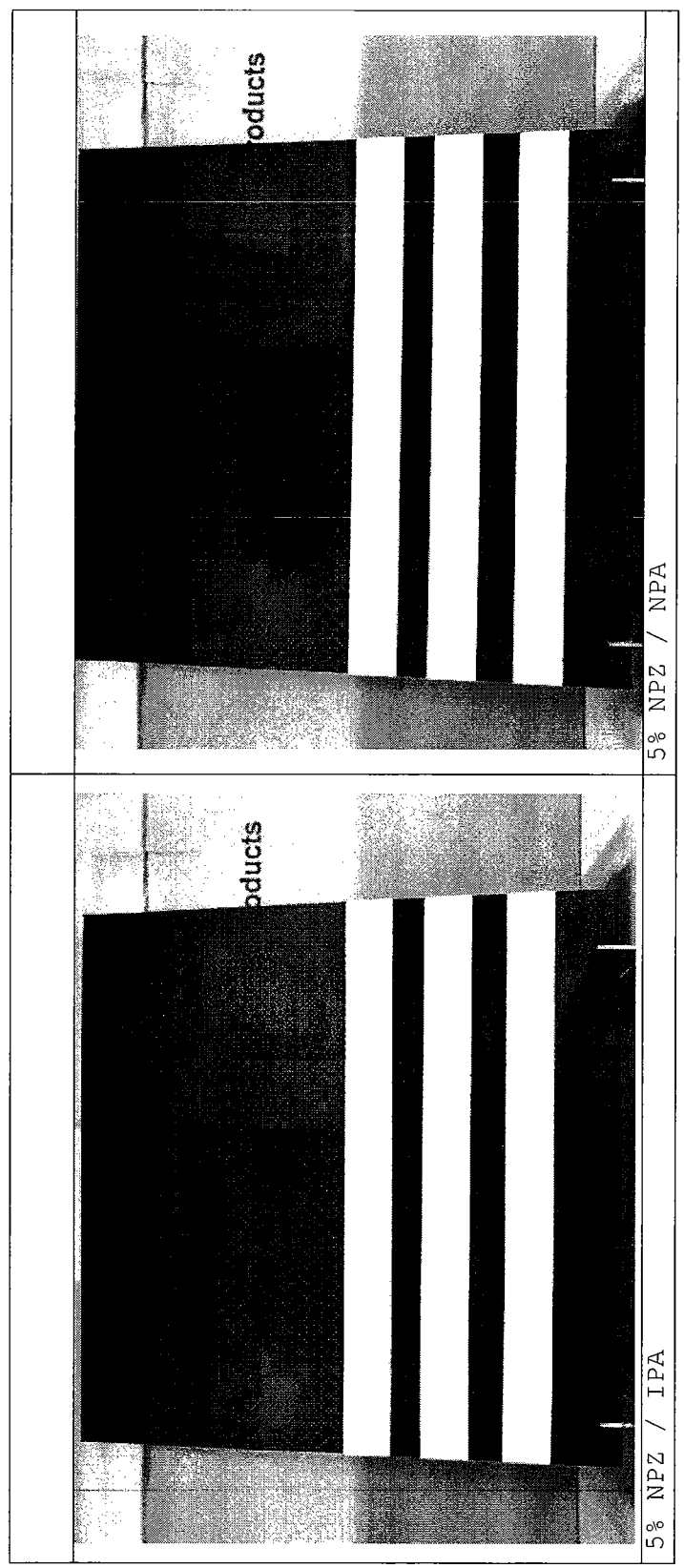

FIG. 21 is graphs showing soak and recovery experiments using BMS5-142 (polysulfide) sealant: a) Weight change, b) Volume change and c) Hardness change;

FIG. 22 is graphs showing soak and recovery experiments using BMS1-71, CL1 (EPR) elastomer: a) Weight change, b) Volume change, and c) Hardness change;

FIG. 23 is graphs showing soak and recovery experiments using BMS1-71, CL2 (Silicone) elastomer: a) Weight change, b) Volume change, and c) Hardness change;

FIG. 24 is graphs showing soak and recovery experiments using BMS1-57 (Silicone) elastomer: a) Weight change, b) Volume change and c) Hardness change;

FIG. 25 is photographs showing images of elastomers and sealants on recovery;

FIG. 26 is a graph and photographs showing immersion results for titanium;

FIG. 27 is a graph and photographs showing immersion results for 2024T3 bare aluminium;

FIG. 28 is a graph and photographs showing immersion results for 2024T3 clad aluminium;

FIG. 29 is a graph and photographs showing immersion results for high strength steel;

FIG. 30 is a graph and photographs showing immersion results for stainless steel;

FIG. 31 is photographs showing sandwich corrosion results a) 1× magnification and b) 10× magnification;

FIG. 32 is a graph and photograph showing immersion results for BMS8-79 composite material;

FIG. 33 is a graph and photograph showing immersion results for BMS8-256 composite material;

FIG. 34 is a graph and photograph showing immersion results for BMS8-256 with Metlbond;

FIG. 35 is a graph and photograph showing immersion results for BMS8-276 with SM905 composite material;

FIG. 36 is a drawing and photographs showing tapeline experiments: Untreated and treated with various modification agent formulations.

Figure 37:
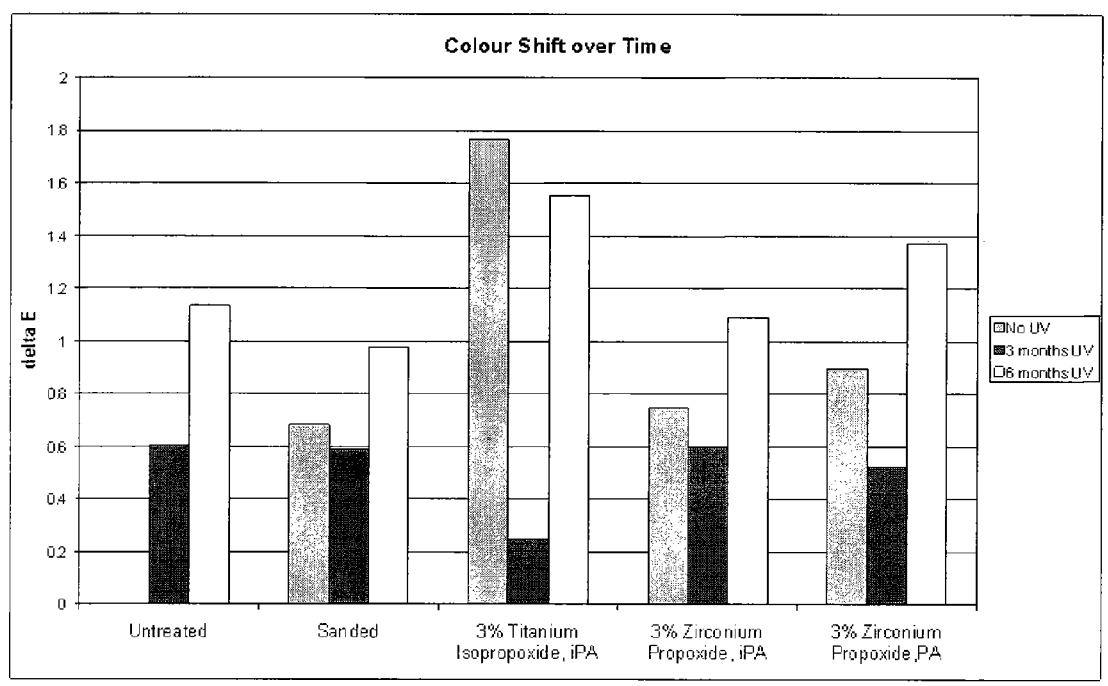
Figure 38:
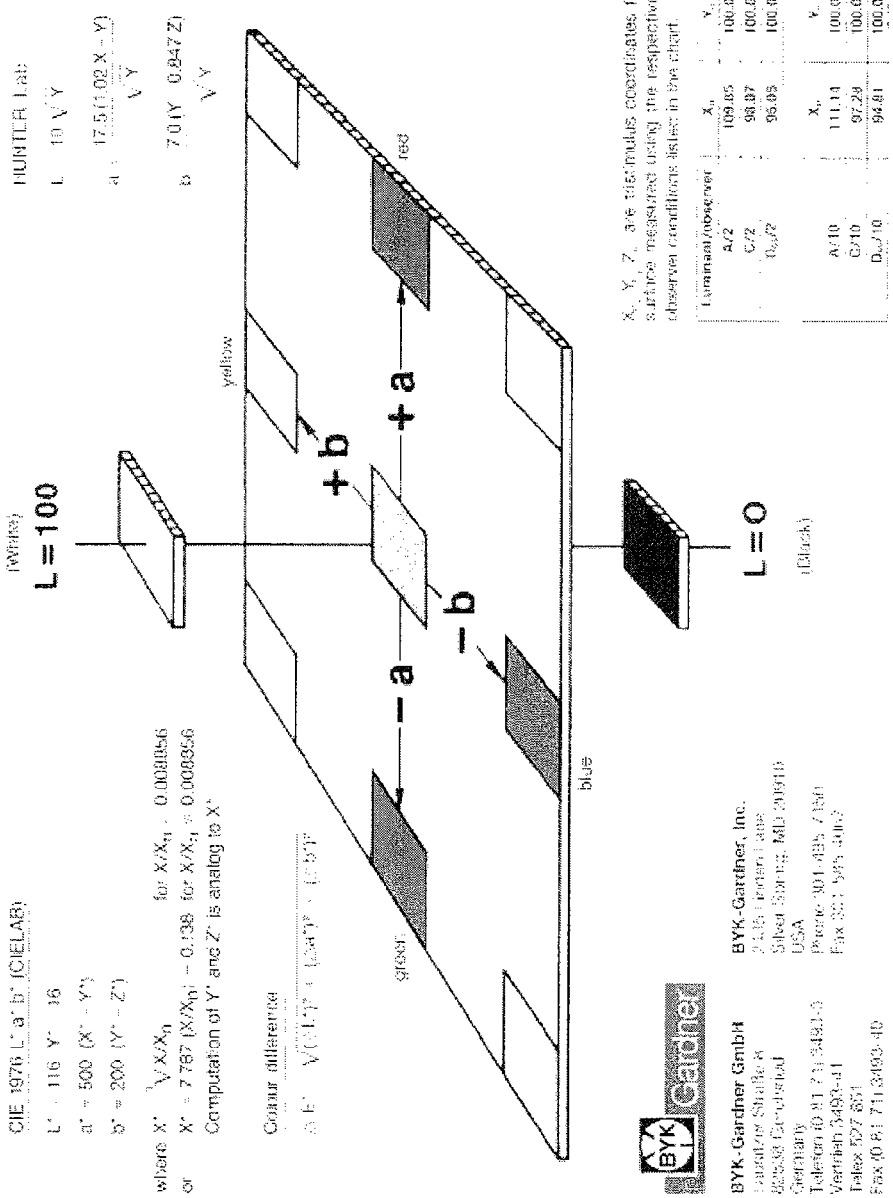

FIG. 37 is a graph showing impact on colour shift for DHS BAC70846 treated with various modification agents & not over-coated following accelerated exposure according to SAE J1960 relative to specimens left untreated and FIG. 38 is a diagram of the Lab-SYSTEM.

Figure 39:
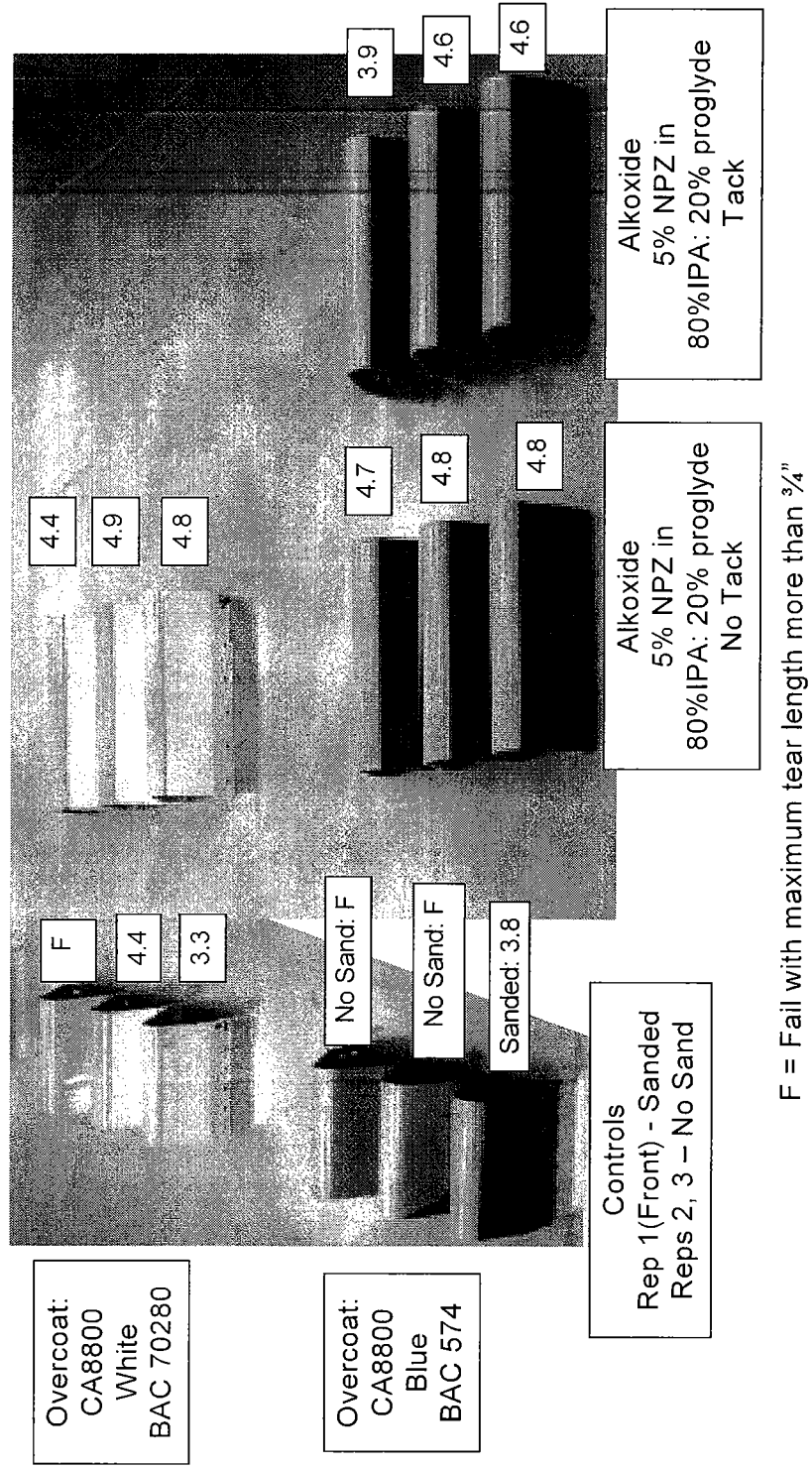

FIG. 39 is photographs showing WARE data.
Basecoat—DHS CA8800 BAC900 clear with F thinner, Cure Conditions: 3 heat cycles (4 h, 120 F, 18% RH and 8 h, 75 F, 70% RH).
Modification agent—5% NPZ, 80:20 NPA: Proglyde
Post treatment of Modification agent—none or tack rag
Overcoat—DHS CA8800, white or blue cured for 2 weeks at ambient ~72 F, 35% RH.

FIG. 40 is pencil hardness data for specimens left untreated prior to overcoat or treated with the modification agent prior to over-coating both prior to and following 30 day immersion into hydraulic fluid.

FIG. 41 is Gardner Impact adhesion test results employing no modification agent or 5 WT % NPZ alkoxide in isopropanol. (Base coat: DHS CA8800 BAC3613 Yellow, CTR thinner. Base cure condition: 3 Cycles of 4 hr, 120 F, 12% RH & 8 hr, 75 F 36% RH. Over-coat: DHS CA8800 various colors, CTR thinner. Overcoat Cure condition: 2 weeks ambient).

EXAMPLES

The invention will now be described with reference to the following non-limiting examples. Although the examples concentrate on coatings derived from polyurethane chemistries it will be understood that the same activation methodology could be applied to coatings such as but not limited to those based on epoxy, acrylic, polycarbonate, or polyester coatings through the appropriate choice of solvent(s), agent(s) and optional additives under appropriate activation conditions.

The specific "substrate" the polyurethane topcoat is applied to is not relevant. Hence the substrate can be metal (eg. aluminium), plastic (eg. polyimide), composite (eg. carbon fibre reinforced epoxy or glass reinforced epoxy) or an elastomer (eg. polysulfide elastomer). The substrate may be finished with surfacing materials, films, elastomers or coatings.

The polyurethane topcoat layer which requires reactivation may have topcoat, intermediate or priming layers beneath it and again these layers are not relevant. Typical examples of build-ups employed in the aerospace industry include:

Aluminium substrate: cleaned, surface prepared with anodize or conversion coat, epoxy based primer(s), optionally selectively strippable intermediate coating layer, and polyurethane topcoat layers.

Epoxy based composite: surface prepared/cleaned, epoxy based primer(s), optionally selectively strippable intermediate coating layer, and polyurethane top-coating layers.

The reactivation treatment solution is designed in such a way that it can be applied under industrial conditions and the integrity of the "substrate" or coating layers beneath the polyurethane coating which is undergoing reactivation are not adversely effected to a point where they are unsuitable for their intended purpose by interaction of treatment solution which may inadvertently come in contact with it for short periods.

Example 1: Hydrolysis Surface Activation Method

The example demonstrates that improved SIJA inter-coat adhesion relative to untreated specimens results from activation of the coating prior to over-coating. Inter-coat adhesion provided in this case is similar to specimens reactivated by sanding.

Example 2: Oxidation Surface Activation Method

The example demonstrates that improved SIJA inter-coat adhesion relative to untreated specimens results from activation of the coating prior to over-coating. Inter-coat adhesion provided in this case is similar to specimens reactivated by sanding.

Example 3: Reduction Surface Activation Method

The example demonstrates that improved SIJA inter-coat adhesion relative to untreated specimens results from activation of the coating prior to over-coating. Inter-coat adhesion provided in this case is similar to specimens reactivated by sanding.

Example 4: Light Induced Photo-Grafting Surface Activation Method

The example demonstrates that improved SIJA inter-coat adhesion relative to untreated specimens results from activation of the coating prior to over-coating. Inter-coat adhesion provided in this case is similar to specimens reactivated by sanding.

Example 5: Reduction Surface Activation Method

The example demonstrates that improved Scribe green adhesion (predictor of possible problems during masking tape removal) relative to untreated specimens results from activation of the coating prior to over-coating. Inter-coat adhesion provided in this case is similar to specimens reactivated by sanding.

Example 6: Reduction Surface Activation Method

Stripping study indicated that coatings reactivated by surface reduction methods strip quicker than specimens sanded prior to over-coating but slower than coatings over-coated without treatment.

Example 7 and 8: Evidence of Surface Chemistry Change

Results indicate that a higher Specific contribution to surface energy results ($\gamma_s^P$), particularly to surfaces activated with the reduction strategy.

Examples 9 to 33: Reduction Surface Activation Method

Examples 34 and 5: Surface Activation Method with Exchange Agents

It is envisaged that suitable combinations of components of the activation treatment will differ depending on the type of coating to be activated. The appropriate choice of solvent(s), agent(s), optional additives and inerts, and activation conditions will differ depending on the type of coating to be activated.

General Experimental Detail

Painting Conditions and Protocol

Spray painting of many flat panels was carried out employing a Yamaha robotic painting arm incorporating a gravity fed Binks Mach 1A automatic spray gun configured with a 94 nozzle. Spray painting was conducted using an inlet pressure of 40 PSI, a scan rate of 100 mm/s and a specimen to gun distance of 300 mm. The coating thickness was controlled by the gun's fluid needle control position and scan rates. These parameters were adjusted in line with paint thickness measurements and assessed using a Fischer Isoscope (MPOD) on aluminium substrates. When coating was completed on composite substrates, the coating layer thickness was estimated by calibration with the isoscope readings from aluminium panels. An analogous strategy was employed for the application of the primers, optional intermediary and topcoat layers. For the majority of the examples, the painted films were over-coated following taping through the middle of the coupon with 3M vinyl tape (#471) to form a paint edge on its removal. This edge was the impact target for SIJA (Single Impact Jet Apparatus) analysis.

Spray painting of curved or larger surfaces (eg: rain erosion foils) and some of the smaller flat panels was typically conducted using a Binks M1-H HVLP gun configured with a 94 nozzle. Occasionally, a similar gravity fed HVLP gun or a pressure pot fed HVLP gun was used. In these cases the aluminium or composite was prepared in the same manner as the flat plates prior to the first top-coat being applied. Following cure of the first coating layer the front of the foils were masked (Intertape Polymer Group, PG-777 tape) prior to over-coating to form a leading edge once the over-coating was applied and tape removed.

Cure protocols were undertaken in a computer controlled temperature humidity chamber, such as a Thermoline Environmental chamber and/or a conventional curing oven.

Table 1: Paint Material Information

For the majority of the examples, the coatings used are listed in Table 1. In the examples, paint companies are generally abbreviated:

PRC-DeSoto International: PRC-DeSoto
Akzo-Nobel Aerospace Coatings: Akzo-Nobel

TABLE 1

|  | Primer | Intermediate Coat | Topcoat |
|---|---|---|---|
| Coating | Epoxy based primers suitable for composite or aluminium based aerospace componenets | Intermediate coat that is selectively strippable | PRC-DeSoto International: Desothane HS, Akzo-Nobel Aerospace Coatings: Eclipse, Deft Chemical Coating |
| Components |  |  | Base: CA8000/BxxxxxX such as CA8000/B70846X Activator: CA8000B Thinner 1: CA8000C Thinner 3: CA8000C2 Or Base: CA8800/Byyyy Activator: CA8800Z Thinner 1: CA8800CTR Thinner 2: CA8800CT Thinner 3: CA8800CT2, Base: ECL-G-xxxx such as ECL-G-14 (BAC70846) Curing Sol: PC-233 Thinner TR-109 Thinner TR-112; Sky-Hullo FLV-II Base: 900YYxxx such as 900BL004 (Blue) Curing Sol: 900X001 CAT Thinner: IS-900, TyIII |

Note: the thinner designation C and C2 are used to indicate the relative rate at which the paint cures. C thinners—standard cure rate with C2 producing a correspondingly faster cure rate (from incorporation of high catalyst levels into the thinner). For Desothane CA8800 CTR is reduced rate, CT is standard rate and CT2 is fast rate cure thinner. For Akzo-Nobel—fast cure thinner is designated TR-112 and standard thinner TR-109.

Painting Conditions and Protocol

Substrates were cleaned prior to priming and optionally where appropriate treated with an alodine type conversion coating or anodized.

Polyurethane topcoats, intermediate and primer layers were mixed and applied according to the paint manufacture instructions.

Primer:
Typical Conditions:
For Composite or aluminium: application of common aerospace epoxy based primer optionally incorporating additives to aide corrosion resistance at 0.5 mil (12.5 micron) dry film thickness (dft) per manufacturer instructions.

Intermediate Coat:
Optionally application of intermediate coat (IC) that is selectively strippable at 0.35 mils (10 microns) according to manufacturer instructions Polyurethane Topcoat:
Application of polyurethane topcoat (eg: Desothane HS topcoat containing CA8000/B70846X base (white color of this topcoat also designated as BAC70846. In examples it is typically designated as Desothane HS 70846X or DHS BAC70846) at 1.0 to 4.0 mil (typically 1.0 mil (25 micron)). Painted panels flash off for 1 hour prior to cure and accelerated aging.

Standard cure/accelerated aging conditions employed for topcoats were: (i) Cure painted panels in oven at 120° F., 5-10% RH (Relative Humidity) for 40 hours, followed by (ii) post cure in a humidity chamber at 120° F. (49° C.) and 50% RH for 48 hours, and then (iii) oven cure at 160° F. for 24 hours. Total cure time was 112 hours. Alternatively other "accelerated" aging protocols were employed as specified in the examples to render the polyurethane topcoat unreceptive to additional coating layers as indicated by poor adhesion under standard adhesion tests eg: 120° F. and 2-3% RH for 5 days or 120° F. and 5% RH for 16 hours or as specified in the examples.

Surface Modification
The solvents and agents used for surface modification were purchased from the MERK and Sigma-Aldrich or Dow Chemical Companies. Purity was of an Analytical or Laboratory Reagent grade purity. Isopropanol and n-propanol were generally of an anhydrous grade. However, alternative suppliers and grades of the reagents are known to be available.

TABLE 2

| General Activation Protocol | |
|---|---|
| Task | Strategy |
| Treatment | Spray application of the reactivation treatment solution employed a Binks M1-H HVLP gun with a 92 or 94 nozzle and 20 psi inlet pressure or, on occasion, a similar HVLP gravity or pressure fed gun or by a flood application where indicated. The active agent (eg: reducing agent such as $LiBH_4$) was dissolved, dispersed or suspended in the solvent/s at a percentage based on weight and the hence prepared "reactivation treatment" applied to the substrate for a given period |
| Post-Treatment | Spray on leave on application (SOLO) Optionally the polyurethane surface may be "post" treated Washed with water (or solvent) a period following treatment - spray on-hose off (SOHO) or Wiped with an isopropanol, ketone (eg: methyl-propyl ketone) or water soaked cloth - spray on wipe off (SOWO) |
| Re-coating | Samples were over-coated with polyurethane topcoat either: Same day (5 mins to 4 hours after treatment) Some period following reactivation. Unless otherwise specified for SIJA or rain erosion adhesion testing, overcoat thickness was 100 micron employing Eclipse or Desothane |

TABLE 2-continued

General Activation Protocol

| Task | Strategy |
|---|---|
| | HS coatings cured with standard thinners. Cure conditions were 120 F. under 8-20% RH for at least 48 hours unless specified. Scribe test overcoat paint thickness was typically 25 to 50 microns |

Analysis

Table 3 provides the equipment and conditions used for testing for analytical purposes.

TABLE 3

Testing Equipment & Conditions

| Equipment | Conditions |
|---|---|
| SIJA | Adhesion testing was completed using a Single Impact Jet Apparatus (SIJA, Cambridge). The initial equipment was typically configured using a 0.8 mm nozzle typically and employed 0.22 calibre 5.5 mm Crosman Accupell Pointed Pellets (#11246). Testing was completed following immersion in water for 16 to 18 hours, employing a line laser to locate the impact position, and using a 45° specimen to impact droplet geometry. A single water jet was employed at each site to test adhesion with the pressure employed for the "shot" indicated below its impact. The velocity of each individual shot was recorded for future reference, but generally the pressure to velocity conversion is specified below (±25 m/s). |
| | Pressure (PSI)    Velocity (m/s) |
| | L    350 |
| | 50    610 |
| | 100    725 |
| | 200    895 |
| | Alternatively the impact was dictated by a "dot" or via the velocity employed - eg. 600 m/s. In some cases the amount of overcoat removed, and hence the inter-coat adhesion was assessed employing image analysis techniques to quantify the area of paint removed. However regardless of the impact velocity relative to the unmodified reference more overcoat removed corresponded with inferior inter-coat adhesion. |
| Scribe Adhesion | Scribe adhesion was assessed according to (BOEING Specification Standard) BSS7225, Class 5. This adhesion test is a five line cross-hatch tape (3M tape, No. 250) pull test. Briefly: Heat aged polyurethane coatings were reactivated and then over-coated (25-80 micron thickness) curing the over-coat for 16 hours at room temperature and 50% RH. The coatings were then scribed according to BSS7225 (C15 scribe cross-hatch) and the adhesion test performed. The paint adhesion of specimens are rated on a scale of 10 to 1 with "10" being no paint removed and "1" being all paint removed. |
| Whirling Arm Rain Erosion Testing | Rain erosion testing was completed on a whirling arm rain erosion apparatus employing a 52 inch zero lift helicopter like propeller run at 3600 rpm. Reference and activated polyurethane topcoat foils were over-coated (85 to 120 micron paint thickness) following masking to produce a leading edge. The foils were attached to the propeller at a distance along the propeller correlating to a velocity of 380 mile per hour at the mid point of the foil. The effective rain field density of 2 mm droplets used during the experiment was 1 inch per hour. After 30 min the impact of rain erosion on the inter-coat adhesion of the foils was evaluated according to a 0.5 to 5 rating correlating with the amount of paint removed or tear length. The impact of water droplets on the leading edge of the over-coat formed on removal of the tape during the experiment erodes the over-coating layer relative to the strength of the inter-coat adhesion. (F or Fail or red markings indicate less then acceptable adhesion) |
| Paint Stripping | Procedure for the complete strip test is described in SAE MA4872, Annex A, pages 51 to 53. In this Stage an abbreviated version was completed using benzyl alcohol based paint strippers without thermal cycling to compare how the activated and over-coated specimens to untreated and reference specimens. Aged specimens (Aluminium or composite substrate) were untreated, sanded, or activated, were over-coated (60-75 micron), and cured for 40 hours at 120° F. The edges were taped with Aluminium tape (such as 3M Scotch Brand No, 425) prior to commencing the test. Stripper was applied every 2 hours until the coating was removed. Lifting paint was removed just prior to reapplication of the stripper using a plastic squeegee. |
| Contact Angle | Contact angle analysis was completed using "FIRST TEN ANGSTROMS" semi-automated video equipped contact angle analyser. $CH_2I_2$ and $H_2O$ were employed as the reference solvents to calculate the dispersive ($\square_s^d$) and polar ($\square_s^p$) contributions to surface energy ($\square_s$) through the Young-Dupre relationship and Fowkes equation. |
| FTIR | FTIR analysis was carried out on a BRUKER FTIR/NIR spectrometer or Nicolet Instruments, employing NaCl plates or an ATR KRS-5 TiBr/TiI mixed crystal associated with the microscope. Extent of surface contamination was assessed by swabbing the surface with a "Q-tip" soaked with hexane. Following evaporation of the hexane solution onto NaCl, powder NaCl plates suitable for FTIR analysis were prepared by compression moulding. |
| SEM | SEM analysis of the polyurethane cross-sections were collected on a Oxford Pentafet detector controlled by an Oxford ISIS system. Cross-sections of the samples, prepared with a cut off saw appropriate for non-ferrous materials, were mounted in epoxy resin, ground and polished to a 1 micron finish and gold coated. Imaging and x-ray analysis was conducted using a 15 KV accelerating voltage and a 17 mm working distance. EDX analysis was specifically refined for carbon, nitrogen, oxygen, and chlorine. |
| Hydrogen Evolution | Activity of reducing agent was determined by employing Hydrogen Evolution techniques. The activity of the reducing agent solution (eg. $LiBH_4$ in Proglyde DMM) was determined by measuring the quantity of hydrogen evolved following interaction with dilute aqueous acid. |

TABLE 3-continued

Testing Equipment & Conditions

| Equipment | Conditions |
| --- | --- |
| Accelerated UV exposure | Equipment: Atlas (Xenon Arc) Weatherometer<br>Outer filter = borosilicate<br>Inner filter = quartz<br>Light intensity: 0.55 W/m$^2$/nm<br>@340 nm<br>Operation Cycle (~SAE J1960):<br>Panels: Desothane HS 70846 White<br>Test for:<br>Colour shift of previously reactivated<br>(but not over-coated)<br>panels<br>Reactivation potential of samples conditioned<br>through aging protocol then a UV cycle. |
| Hydraulic fluid exposure | Specimens were tested for coating pencil hardness prior to immersion into the fluid and rated in hardness according to the following protocol (soft to hard). After 30 days immersion the specimens were re-tested. Values reported are the softest pencil that would cut into the paint surface.<br>Hardness<br>HB<br>F<br>H<br>2H<br>3H<br>4H<br>5H<br>6H<br>7H<br>8H<br>9H |
| Gardner Impact Adhesion | Both sides of the test specimen were subject to varying impact forces in 10 inch pound increments using a Gardner 160 inch pound capacity impact testing machine with a 0.625 inch diameter hemispherical indenter. Values reported are the highest force recorded that produced no cracking of paint in either the forward or reverse impact. Maximum impact tested was 80 inch pounds. |

Example 1: Hydrolysis Method

SIJA inter-coat adhesion of Desothane HS 70846X white (30±5 µm, CA8000C thinner) cured 40 hour at 120° F. (~9% RH) followed by 48 hour at 120° F. (50% RH) followed by 24 hour at 160° F., activated and over-coated with Desothane HS S601X blue (104±10 µm).

Example 2: Oxidation Method

SIJA inter-coat adhesion of Desothane HS 70846X white (30±5 µm, CA8000C2 thinner) cured 40 hour at 120° F. (~9% RH), followed by 48 hour at 120° F. (50% RH) and 24 hour at 160° F., activated and over-coated with Desothane HS S601X blue (104±10 µm).

Example 3: Reduction Method

SIJA inter-coat adhesion of Desothane HS 70846X white (30±5 µm CA8000C2 thinner) cured 40 hour at 120° F. (5% RH) followed by 48 hour at 120° F. (50% RH) and 24 hour at 160° F., activated and over-coated with Desothane HS S601X blue (104±10 µm).

Example 4: Light Grafting Method

SIJA inter-coat adhesion of Desothane HS 70846X white (30±5 µm, CA8000C-thinner) cured 40 hour at 120° F., (~9% RH), followed by 48 hour at 120° F., 50% RH and 24 hour at 160° F., activated 120 min, wiped (IPA) and over-coated with Desothane HS S601X blue (104±10 µm).

Initiator System: Camphorquinone (1% w/w based on acrylate), Dimethyltoluidine (120% w/w based on camphorquinone) system placed under an 2×18W fluorescent desk lamp.

Example 5: Reduction Surface Activation Method—Green Scribe Adhesion

Green (scribe) inter-coat adhesion of Desothane HS 70846X white (30±5 µm CA8000C2 thinner) cured 40 hour at 120° F. (~9% RH), followed by 48 hour at 120° F. (50% RH) and 24 hour at 160° F., activated and over-coated with Desothane HS S601X blue (68±10 µm, 16 h ambient cure). Green adhesion rating as per BSS7225.

Example 6: Reduction Activation Method—Stripping Rate Test

Example 7: Evidence of Surface Energy Change

Surface energy results for activated surfaces employing a thermally aged Desothane HS 70846X substrate (CA8000C thinner)

| Treatment | | Contact Angle (°) | | Surface Energy (mJ/m2) | |
| --- | --- | --- | --- | --- | --- |
| C Thinner | Conditions | Water | CH$_2$I$_2$ | Specific $\gamma_s^p$ | Dispersive $\gamma_s^d$ |
| Fresh | | 76.5 | 39.0 | 4.2 | 42.0 |
| Aged Untreated | | 76.2 | 40.3 | 4.5 | 41.3 |
| Aged IPA Wipe | | 75.8 | 35.0 | 4.0 | 44.0 |
| Aged - 2% Sodium Borohydride | EtOH/EtOH wash | 37.0 | 36.6 | 23.7 | 43.2 |
| Aged - 1% Acetic Acid | EtOAc/IPA wipe | 69.7 | 29.4 | 5.8 | 46.6 |
| Aged - Camphorquinone (1% w/w based on acrylate), Dimethyltoluidine (120% w/w based on Camphorquinone) methylamylketone | 2 × 18 W fluorescent desk lamp, MAK wipe | 65.2 | 43.5 | 8.5 | 43.5 |

Fresh - 4 hour at 120° F. (~9% RH)
Aged - 40 hour at 120° F. (~9% RH), 48 hour at 120° F. (50% RH) and 24 hour at 160° F.

Example 8: Evidence of Surface Energy Change

Surface energy results for activated surfaces employing a thermally aged Desothane HS 70846 substrate (C2 thinner)

| Treatment | | Contact Angle (°) | | Surface Energy (mJ/m2) | |
|---|---|---|---|---|---|
| C2 Thinner | Conditions | Water | $CH_2I_2$ | Specific $\gamma_s^p$ | Dispersive $\gamma_s^d$ |
| Fresh | | 71.4 | 27.6 | 5.0 | 47.3 |
| Aged Untreated | | 74.6 | 45.5 | 5.7 | 38.5 |
| Aged IPA Wipe | | 73.9 | 36.3 | 4.9 | 43.4 |
| Aged - 2% Sodium Borohydride | EtOH/EtOH wash | 42.6 | 32.2 | 19.7 | 45.3 |
| Aged - 1% Acetic Acid | EtOAc/IPA wipe | 67.9 | 28.7 | 6.5 | 46.9 |
| Aged - Camphorquinone (1% w/w based on acrylate), Dimethyltoluidine (120% w/w based on Camphorquinone) methylamylketone | 2 × 18 W fluorescent desk lamp, MAK wipe | 68.6 | 27.3 | 6.0 | 47.4 |

Fresh - 4 hour at 120° F. (~9% RH)
Aged - 40 hour at 120° F. (~9% RH), 48 hour at 120° F. (50% RH) and 24 hour at 160° F.

Example 9

SIJA inter-coat adhesion of aged Desothane HS 70846X white (C2) reactivated under the conditions specified for 30 min (SOHO) and over-coated with Desothane S400X red 3 hours following hose-off with water.

Treatment solutions prepared in progylde (dipropylene glycol dimethyl ether).

Results indicated that improved inter-coat adhesion is possible employing "mild" reducing agents such as $NaBH_4$ and $LiBH_4$.

Example 10

SIJA inter-coat adhesion of aged Desothane HS 70846X white (C2) reactivated under the conditions specified for 30 min (SOHO) and over-coated with Desothane HS S601X blue 3 hours following hose-off with water.

Results indicate that reducing agents with different strengths may be employed for the purpose of reactivation.

Example 11

SIJA inter-coat adhesion of aged Desothane HS 70846X white (C2) reactivated under the conditions specified for 30 min (SOHO) and over-coated with Desothane S400X red 3 hours following hose-off with water.

Treatment solutions prepared in dipropylene glycol dimethyl ether.

Example illustrates that a variety of different concentrations may be employed to "activate" the surface of polyurethane based coatings towards over-coating to provide improved adhesion.

Example 12

(i) SIJA inter-coat adhesion of aged Desothane HS 70846X white (C2) reactivated under the conditions specified (SOLO) for 3 h and over-coated with Desothane HS 5070X blue.

Treatment solutions prepared in dipropylene glycol dimethyl ether.

Example illustrates that very low concentrations of the reducing agent may be employed to "activate" the surface of polyurethane based coatings towards over-coating using a spray on—leave on approach.

(ii) Scribe adhesion of aged Desothane HS 70846X white reactivated under the conditions specified and over-coated with Desothane HS 5070X blue. The overcoat was allowed to cure under ambient conditions for 16 h prior to conducting the test.

The example illustrates that excellent scribe adhesion results are possible employing low concentrations of reducing reagent under various application conditions.

Example 13

(i) SIJA inter-coat adhesion of aged Eclipse BAC70846 white reactivated under the conditions specified (SOLO) for 3 h and over-coated with Desothane HS 5070X blue.

Treatment solutions prepared in Progylde (dipropylene glycol dimethyl ether) using $LiBH_4$ as the reducing agent.

Example illustrates that a variety of different reducing agent concentrations may be employed to "activate" the surface of polyurethane based coatings towards over-coating from different manufacturers and polyurethane chemistries.

(ii) Scribe adhesion of aged Eclipse BAC70846 white reactivated under the conditions specified and over-coated with Desothane HS 5070X blue. The overcoat was allowed to cure under ambient conditions for 16 h prior to conducting the test.

The example illustrates that improved scribe adhesion results were possible employing low concentrations of reducing reagent to reactivate different types of polyurethane topcoats under various application conditions.

Example 14

SIJA inter-coat adhesion of aged Desothane HS70846X white reactivated with $LiBH_4$ (0.2 wt %) in the solvent/s specified (SOLO) for 3 h and over-coated with various coloured Desothane HS polyurethane topcoats.

Results indicate that different solvents may be employed for reactivation using reducing agents under appropriate conditions.

Example 15

(i) SIJA inter-coat adhesion of aged Desothane HS 70846X white reactivated with $LiBH_4$ (0.2 wt %) in Progylde DMM and co-solvent specified (SOLO) for 3 hours and over-coated with various coloured Desothane HS polyurethane topcoats.

(ii) Example incorporating different alcohols (40%) and alcohol combinations (20:20%).

Results indicate that under appropriate conditions a variety of solvent combinations may be employed for the purpose of reactivation with appropriate reducing agents.

Example 16

SIJA inter-coat adhesion of aged Desothane HS 70846X white (C2) reactivated under the conditions specified for 30 min (SOHO) and over-coated with Desothane S400X red 3 hours following hose-off with water.

1.0% $Li(OCH_3)_xBH_{4-x}$ in Proglyde prepared by addition of 0 (x=0), 1 (x=1, major component)), 2 (x=2, major component), and 3 (x=3, major component)equivalents (Eq) respectively of methanol "in-situ".

Example illustrates that the active agent may be prepared "in situ" and that reactivation can be conducted in the presence of more than one different type of reducing reagent.

Example 17

SIJA inter-coat adhesion of aged Desothane HS 70846X white (C2) reactivated under the conditions specified for 30 min (SOHO) and over-coated with Desothane S400X red 3 hours following hose off with water.

Example illustrates that different treatment solution preparation methods can be employed to manufacture the reduction based reactivations formulation taking into consideration the different ways in which reducing agents are packaged and sold commercially. In certain circumstances the reactive agent may be generated "in situ" if required.

Example 18

Rain erosion adhesion results for Desothane HS 70846X white (C2) aged as specified. Reactivated using the formulations and treatment time specified before over-coated with Desothane HS 50103X blue.

(i) Ageing protocol: 4 h (120 F, 2-3% RH). SOLO based reactivation method (ii) Ageing protocol: 5 Days (120 F, 2-3% RH) SOLO based reactivation treatment (iii) Ageing protocol: 4 h (120 F, 2-3% RH) SOHO based reactivation method (iv) Ageing protocol: 5 days (120 F, 2-3% RH) SOHO based reactivation method Results illustrate that improved inter-coat adhesion is possible using reducing agents mixed into various reactivation treatment formulations and applied under various treatment times and protocols for substrates aged under various protocols.

Example 19

Rain erosion adhesion results for aged Desothane HS 70846X white (C-thinner) applied onto epoxy-carbon fibre composite incorporating primer, intermediate and topcoat layers reactivated under the conditions specified before being over-coated with Desothane HS S601X blue.

Example illustrates that reactivation of aged polyurethane topcoats can be completed using the reducing methodology on "composite substrates" incorporating paint lay-ups including selectively strippable intermediate coating layers beneath the polyurethane topcoat.

Example 20

SIJA inter-coat adhesion of aged Desothane HS 70846X white (C2) reactivated with $LiBH_4$ (0.2 wt % in Proglyde DMM) for 2 h under the post treatment conditions specified before being over-coated with Desothane HS S601X blue.

Example illustrates that various "post treatment" protocols may be employed depending on the application/process requirements without negatively impacting adhesion.

Example 21

SIJA inter-coat adhesion of aged Desothane HS 70846X white (C2) reactivated with $LiBH_4$ (0.1 wt % in Proglyde DMM) multiple times 30 min apart under the conditions specified before being over-coated with Desothane HS S601X blue.

Example illustrates that multiple applications of the reactivation treatment solution does not diminish adhesion performance.

Example 22

SIJA inter-coat adhesion of aged Desothane HS 70846X white (C2) reactivated with $LiBH_4$ (0.1 wt % in Proglyde DMM) for (i) one hour before being subjected to the conditions specified and then washed (water) allowed to dry or (ii) for the treatment time specified before being over-coated with Desothane HS S601X blue or S400X red.

The example demonstrates that reactivation can be conducted for a short (5 min) or extended period (8 days) and that the reactivated surface retains its reactivity towards subsequent paint layers under a variety of conditions.

Example 23

SIJA inter-coat adhesion of aged Desothane HS 7084X6 white (C2) reactivated with $LiBH_4$ solutions themselves previously aged under ambient conditions for the period specified before being over-coated with Desothane HS S601X blue.

(i) Treatment solutions: 0.2% $LiBH_4$ in Progylde DMM+ the percentage IPA indicated stored for 50 days before being used to reactivate the aged polyurethane topcoat.

(ii) Treatment solutions: Various $LiBH_4$ concentrations stored in Proglyde DMM/2% tBAC for 90 days prior to application (iii) Treatment solution: $LiBH_4$ prepared as a stock 0.5 wt % concentration in Proglyde DMM and stored for 6 months. Dilutions to the indicated concentrations and formulations were made just prior to application of the treatment solution for the purpose of reactivation in a SOLO format.

(iv) Rain erosion adhesion data from Desothane HS 70846X white (C) cured at 120 F (10% RH) 4 days prior to reactivation and over-coating with Desothane HS S601X blue. NOTE: Reactivated samples in triplicate, benchmark untreated and sanded in duplicate.

Treatment solutions (a) Aged for 25 days (b) Aged for 25 days (c) Stock solution in Proglyde DMM aged for 25 days and IPA added just prior to application to provide the given concentration (d) prepared fresh (e) prepared fresh.

Examples illustrate that reactivation treatment solutions stored under ambient conditions retain their activity thus providing shelf life and pot-life robustness.

Example 24

Example demonstrates that application of the treatment solution can assist in the mitigation of common surface contaminants (residues), produced by the manufacturing assembly which can reduce both the visual appearance and inter-coat adhesion particularly when the reactivation treatment solution is applied as a SOHO or SOWO application technique.

(i) Illustration of application of common surface contaminates to the surface of an aged Desothane HS 70846X white topcoat prior to reactivation and over-coating with Desothane HS 5070X blue.

(ii) SIJA inter-coat adhesion of aged Desothane HS white 70846X topcoat contaminated with (a) petroleum jelly or (b) Aeroshell 33 prior to reactivation employing 0.1% LiBH$_4$ in Proglyde DMM/2% tBAC. Activation treatment left on for (30 minutes) prior to application of the designated post treatment conditions specified. Subsequently over-coated with Desothane HS S601X blue.

The above example clearly demonstrates that improved inter-coat adhesion and paint appearance may be obtained when the Desothane HS coatings contaminated with common aerospace residues from manufacturing processes are reactivated prior to over-coating.

(iii) Supporting FTIR evidence for selected contaminants: Samples were swabbed with a hexane soaked "Q-tip" and the hexane containing sample absorbed onto NaCl. Following compression molding of the NaCl into Plaques, FTIR spectra was obtained.

NOTE: typical absorptions around 3000 cm$^{-1}$ for the contaminant was removed or reduced following reactivation under the conditions listed.

NOTE: typical absorptions around 3000 cm$^{-1}$ for ntaminant was removed or reduced following reactivation under the conditions listed.

Examples illustrate that the level of contaminate is clearly reduced or removed following the reactivation treatment.

(iv) Supporting surface energy results for selected contaminants following no treatment, solvent wipe only and reactivation treatments of the contaminated aged Desothane HS 70846X white topcoat under the conditions specified.

conditions specified—one (thinapplication) or two (thicker application) applications followed by water hose-off after the 30 minute treatment time (SOHO) and over-coated with Desothane S400X. Following cure of the over-coating the samples were immersed in Skydrol aviation fluid for a period of 30 days under ambient conditions prior to adhesion testing.

The example illustrates that the inter-coat adhesion between topcoat layers is resistant to hydraulic fluids.

(ii) SIJA inter-coat adhesion of aged Desothane HS 70846X white reactivated under the conditions specified (SOLO, 180 min) and over-coated with Desothane HS S601X blue. Following cure of the over-coating the samples were immersed in water under ambient conditions or placed in a condensing humidity chamber at 120 F/98% RH for a period of 30 days prior to adhesion testing and visual appearance assessment.

Results indicate that excellent inter-coat adhesion was obtained after 30 days water soak under ambient conditions or 30 days conditioning at 120 F and 95% RH. Paint appearance is also acceptable and further improved by either using sediment (precipitate free) treatment solutions obtained from filtering, or post treatment protocols such as a tack rag wipe, wash (SOHO) or wipe (SOWO) processes.

Example 26

(i) The following example illustrates effects of spray application of 0.1% LiBH$_4$-Proglyde DMM reactivation solution onto bare polysulfide based sealant (PRC-Desoto PR 1772) that has been applied over primed carbon fiber reinforced epoxy.

(ii) The following example illustrates scribe adhesion results from polysulfide sealant (PRC-Desoto PR 1772)

| | Surface Energy (mJ/m$^2$) | | | | | |
|---|---|---|---|---|---|---|
| | No Treatment | | MEK/MPK Wipe Only | | 0.1% LiBH$_4$ (Proglyde, 2% tBAc) MEK/MPK Wipe | |
| Contamination | Dispersive | Specific | Dispersive | Specific | Dispersive | Specific |
| None | 45 | 4.2 | 43 | 3.9 | 45 | 8.6 |
| Microcut | 48 | 3.2 | 45 | 4.2 | 45 | 6.9 |
| Catoil | 47 | 2.0 | 44 | 2.9 | 45 | 6.0 |
| Boelube | 37 | 6.0 | 46 | 3.5 | 46 | 5.9 |
| Aeroshell33 | 43 | 2.2 | 44 | 2.8 | 46 | 8.0 |
| Petroleum Jelly | 49 | 3.0 | 41 | 3.9 | 43 | 6.5 |

The specific surface energy component of total surface energy is significantly reduced after contaminants are applied to the surface of the aged Desothane HS 70846X substrate.

Wiping the surface with just solvent only marginally improved the specific contribution to surface energy (not back to untreated, non-contaminated) whilst specimens reactivated with LiBH$_4$ under the conditions listed provided a significant improvement in the specific contribution to surface energy above that for non-contaminated substrates indicating simultaneous cleaning and reactivation has occurred.

Example 25

(i) Example 25. (i) SIJA inter-coat adhesion of aged Desothane HS 70846X white (C2) reactivated under the cured for 4 h before treatment with a reactivation treatment solution comprised of 0.1% LiBH$_4$ in proglyde for the time specified before overcoating with Desothane HS S601X Blue and curing for 16 h under ambient conditions.

The example illustrates that no deleterious effects occur following application of the treatment solution onto the sealant prior to over-coating even when the treatment solution is applied onto only moderately cured (young) sealants.

Examples illustrate that the over-coat does not wet the aged Desothane coating when untreated providing de-bonded regions. The de-bonded regions are not present in the sanded and chemically reactivated samples, providing evidence for improved interfacial interaction between the two polyurethane topcoat coating layers.

Example 30

Example illustrates the impact of accelerated UV exposure on aged Desothane HS 70846X polyurethane coating relative to untreated reference for different lengths of exposure time.

The example illustrates that the colour shift is similar for samples untreated, sanded, reactivated with 0.1% LiBH$_4$ in proglyde that is either removed after 30 min (SOHO) or not removed (SOLO) if left not over-coated prior to various lengths of accelerated UV exposure time.

(ii) SIJA inter-coat adhesion results for Desothane HS 70846X white (C2) aged under the standard protocol and then accelerated UV conditions for 630 h before reactivation and over-coating with Desothane S601X.

The example illustrates that the reactivation protocol provides improved inter-coat adhesion for samples exposed to accelerated aging and UV exposure with similar result provided to those samples not exposed to UV.

This example is relevant to polyurethane coating that has undergone UV exposure for extended periods before requiring reactivation and over-coating, for example, in-service airplanes.

Example 31

Example shows a comparative paint stripping experiment between composite panels incorporating a primer, intermediate and polyurethane topcoat layers. In the example the stripping behaviour of aged Desothane HS 70846X white (C2) reactivated with the reduction method under the conditions listed prior to over-coating with Desothane HS S601X relative to untreated and sanded references.

The example illustrates that the chemically reactivated samples strip in a similar time frame to the sanded and untreated references.

Example 32

The following example shows the impact on paint adhesion and appearance of Desothane HS S601X applied over untreated and reactivated aged Desothane HS 70846X coatings (themselves applied over primed aluminum) under cycling temperature and humidity for 500 cycles. The examples illustrate that no apparent reduction in adhesion or over-coat appearance occurs following cycling of temperature and humidity.

Example 33

Example demonstrates the paint adhesion and overcoat paint quality of rain erosion foils following simulation of typical paint masking hangar operations and heat cure. The examples show rain erosion foils, (incorporating primer, intermediate coating, and) topcoated with Desothane HS CA8000/B70846X base with C thinner cured/aged for 5 days at 3% RH and 120° F.' which were reactivated for 1.5 hours using SOHO (prior to wash off) or the SOLO process indicated.

Following reactivation the samples either underwent a 6 hour 120 F thermal cycle directly (then left under ambient conditions overnight) or alternatively prior to the thermal treatment were wrapped with Kraft paper or had 4 bands of masking tape perpendicularly wrapped around the samples. After removal of the paper and tape (wiping the tape lines with IPA) the samples were painted with Desothane HS CA8000/B50103 base with C thinner and following cure tested for adhesion and paint appearance relative to unreactivated and sanded controls.

Results Indicate:
All the foils except for a random SOLO foil passed with good marks
Excellent paint appearance was noted: No ghosting seen from the tape being on the foil that was cured for 6 hours and then being solvent wiped with IPA and no deleterious effects from application of Kraft paper were noted
No significant difference from a 1 application situation and a 3 application situation

Example 34

The following example illustrates the inter-coat adhesion of aged Desothane 70846X and S400X red untreated and reactivated with tetraisopropyl titanate or sanded reference prior to over-coating with S601X blue and 5070X light blue. The example illustrates that treatment of the aged surface with tetraisopropyl titanate provides improved adhesion with different coloured aged polyurethane substrates and over-coatings.

(ii) The following example demonstrate the reactivation solution based on tetraisopropyl titanate may be used in conjunction with materials such as stencils and design masks and tapes for the production of decorative painted finishes.

The example illustrates that the use of the treatment solution based on tetraisopropyl titanate applied as a treatment solution for aged Desothane HS 70846X prior to over-coating with Desothane HS 5070X improved adhesion compared with the untreated reference and also provided minimal letter swelling or figure distortion, when it is applied SOLO directly over the design stencil prior to over-coating with polyurethane.

Example 35

Figure 1:
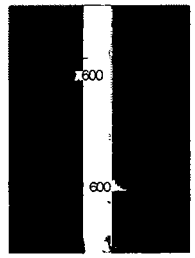
Figure 1:
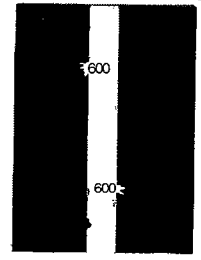
Figure 1:
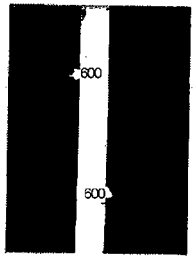
Figure 1:
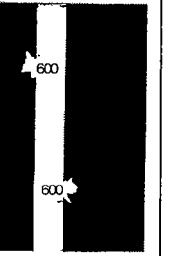
Figure 1:
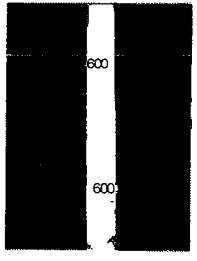
Figure 1:
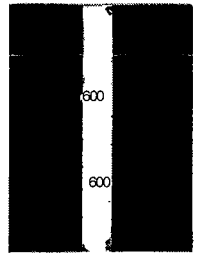
Figure 1:
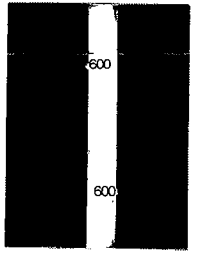
Figure 1:
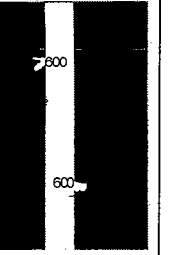
Figure 1:
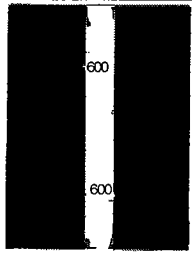
Figure 1:
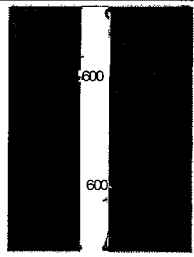
Figure 1:
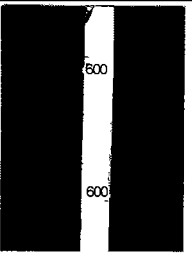
Figure 1:
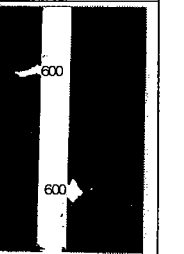
Figure 1:
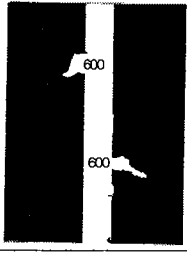
Figure 1:
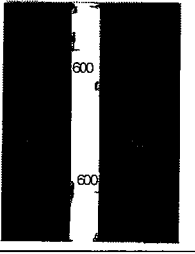

Screening experiments assessed a variety of metal alkoxide modifying agents with different relative reactivities (moisture stabilities) as described in Table 4. Initial experiments employed SIJA methods to probe the change in inter-coat adhesion with (i) the type of metal alkoxide used in the activation treatment system and (ii) its concentration. Under all conditions a SOLO approach was employed. FIG. 1 provides the SIJA data employing 0.5, 3 and 5 wt % concentrations of modifying agent. It should be pointed out that (i) there was no true concentration parity in the experiment although given the large concentration range investigated trends in performance could be assessed and (ii) all solutions were prepared in the one solvent system (IPA) to simplify the experiment even though it is known that alcoholysis is possible to provide mixed alkoxides. However, to counter this effect to some degree each solution was prepared freshly and applied directly. Considering that NPZ has a high molecular weight and was supplied as a 70% NPA solution the actual concentration was much lower than for similar titanium based reagents.

Metal alkoxides with small alkoxy groups (eg: TPT, NBT, NPZ—see Table 4) appeared to provide limited benefit at concentrations of 0.5 wt % but under the reactivation conditions employed showed improved inter-coat adhesion at concentrations above 3 wt %. A lower reactivity for TEAZ was observed probably due to its greater moisture stability (Table 4). Closer investigation of concentration (FIG. 2) indicated that around 6-7 mmol of modifying agents per 100 g was required to see paint removal comparable to sanded specimens with less paint removed as the concentration was increased.

Figure 3:
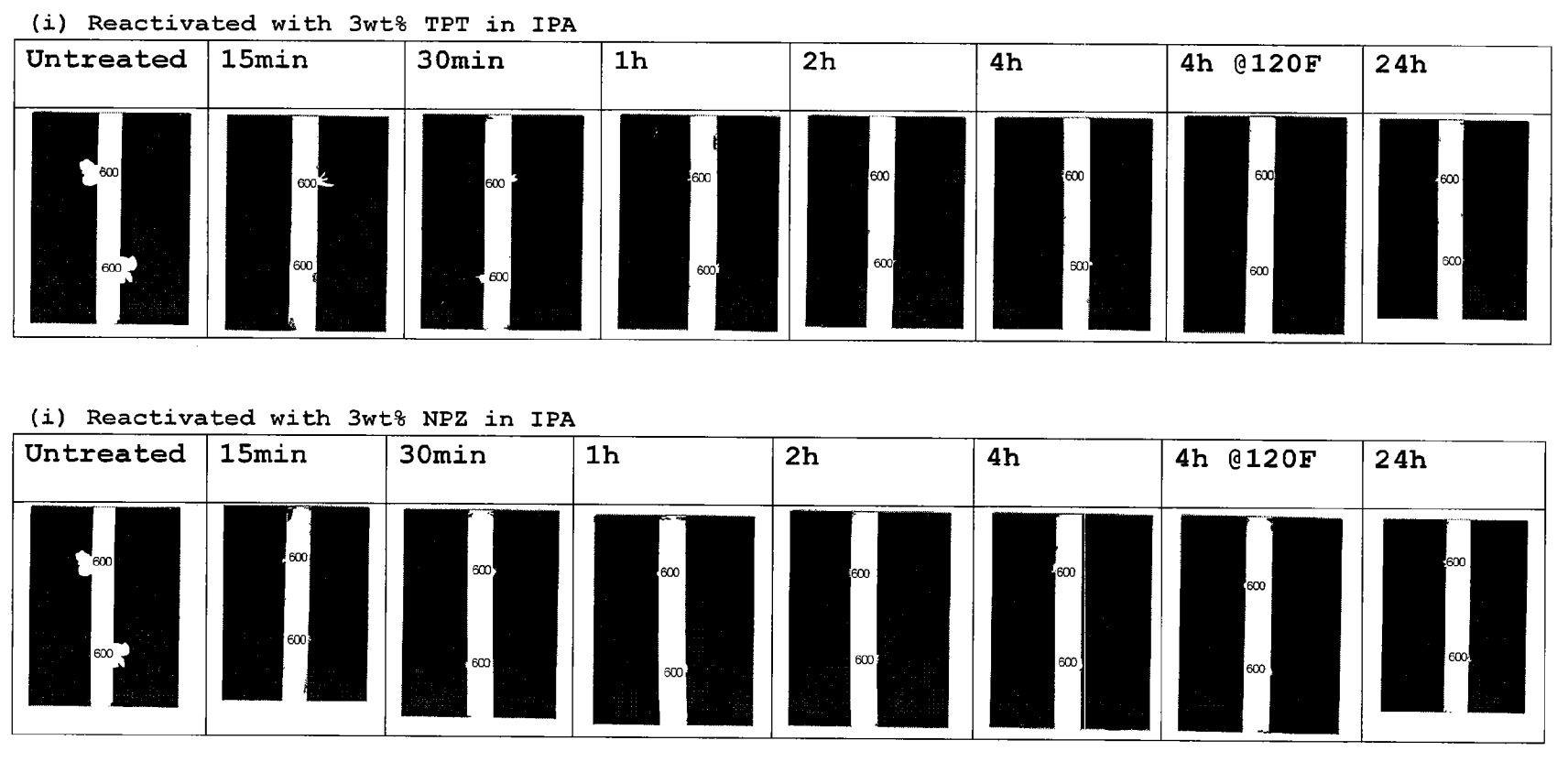

A preliminary investigation was also undertaken to assess the activity of the substrate over time considering that along with a standard reactivation time (eg 30 to 60 minutes) there may also be a requirement in the paint hangar for the activated surface to remain active after a heat cycle or for shorter or longer periods. Preliminary assessment results are provided in FIG. 3. The salient points from this study were that (i) NPZ treatment solutions appear to build up adhesive forces faster than TPT, (ii) both versions provided about the same level of inter-coat adhesion after 1 h even though the respective molar concentration of NPZ was less, (iii) paint surfaces remain active after 24 h at ambient conditions, and (iv) the surfaces remained active after a heat cycle. Point (i) may be explained by the relative reactivity of the materials as provided by their difference in hydrolysis rate (Table 4). This type of activation window was considered commercially attractive and appeared to provide some flexibility for paint hangar scheduling.

TABLE 4

Properties Of Various Metal Alkoxides

| Promoter/ Property | Tetra-i-propyl titanate | Tetra-n-propyl titanate | Tetra-n-butyl titanate |
|---|---|---|---|
| Formula | Ti(O—i—$C_3H_7$)$_4$ | Ti(O—n—$C_3H_7$)$_4$ | Ti(O—n—$C_4H_9$)$_4$ |
| MW | 284 | 284 | 340 |
| Abbreviation | TPT | NPT | NBT |
| Supply | 100% | 100% | 100% |
| Density (g/mL, 20° C.) | 0.965 | 1.05 | 1.0 |
| Pour Point (° C.) | +17 (Melt Point) | −50 | <−70 |
| Flash point (° C.) | 23-60 | 38 | 50 |
| Relative hydrolysis rate (mL water added) | 0.5-2.0 | 0.5-2.0 | 1.0-2.5 |
| Relative moles at 1 wt % in 100 g (mmol) | 3.5 | 3.5 | 2.9 |

| Promoter/ Property | Tetra-n-propyl zirconate | Triethanolamine zirconate | Tetra-n-propyl zirconate |
|---|---|---|---|
| Formula | Zr(O—n—$C_3H_7$)$_4$ | Zr($C_6H_{14}NO_3$)$_4$ | Zr(O—n—$C_3H_7$)$_4$ |
| MW | 327 | 683 | 327 |
| Abbreviation | NPZ | TEAZ | NPZ |
| Supply | 70% (NPA) | 100% | 70% (NPA) |
| Density (g/mL, 20° C.) | 1.07 | 1.34 | 1.07 |
| Pour Point (° C.) | −70 | | −70 |
| Flash point (° C.) | 21-25 | >100 | 21-25 |
| Relative hydrolysis rate (mL water added) | 0.02 | >500 | 0.02 |
| Relative moles at 1 wt % in 100 g (mmol) | 3.5 | 3.5 | 2.9 |

TABLE 5

Physical Properties of Various Solvents

| Solvent/Material | Boiling point* (° C.) | Vapor pressure (mmHg @ 20° C.) | Flash Point (° C.) |
|---|---|---|---|
| Isopropanol (IPA) | 82 | 33 | 12 |
| n-Propanol (NPA) | 97 | 14.9 | 22 |
| n-Butanol (NBA) | 116 | 4.5 | 35 |
| Hexanol | 156 | ~0.5 | 59 |
| Ethylhexanol | 184 | 0.36 | 73 |
| Dipropylene glycol dimethylether (Proglyde DMM) | 175 | 0.6 | 65 |
| Methyl ethylketone (MEK) | 80 | 71 | −1 |
| Methyl propylketone (MPK) | 101 | 27 | 7 |

*start of boiling point range provided

Figure 4:
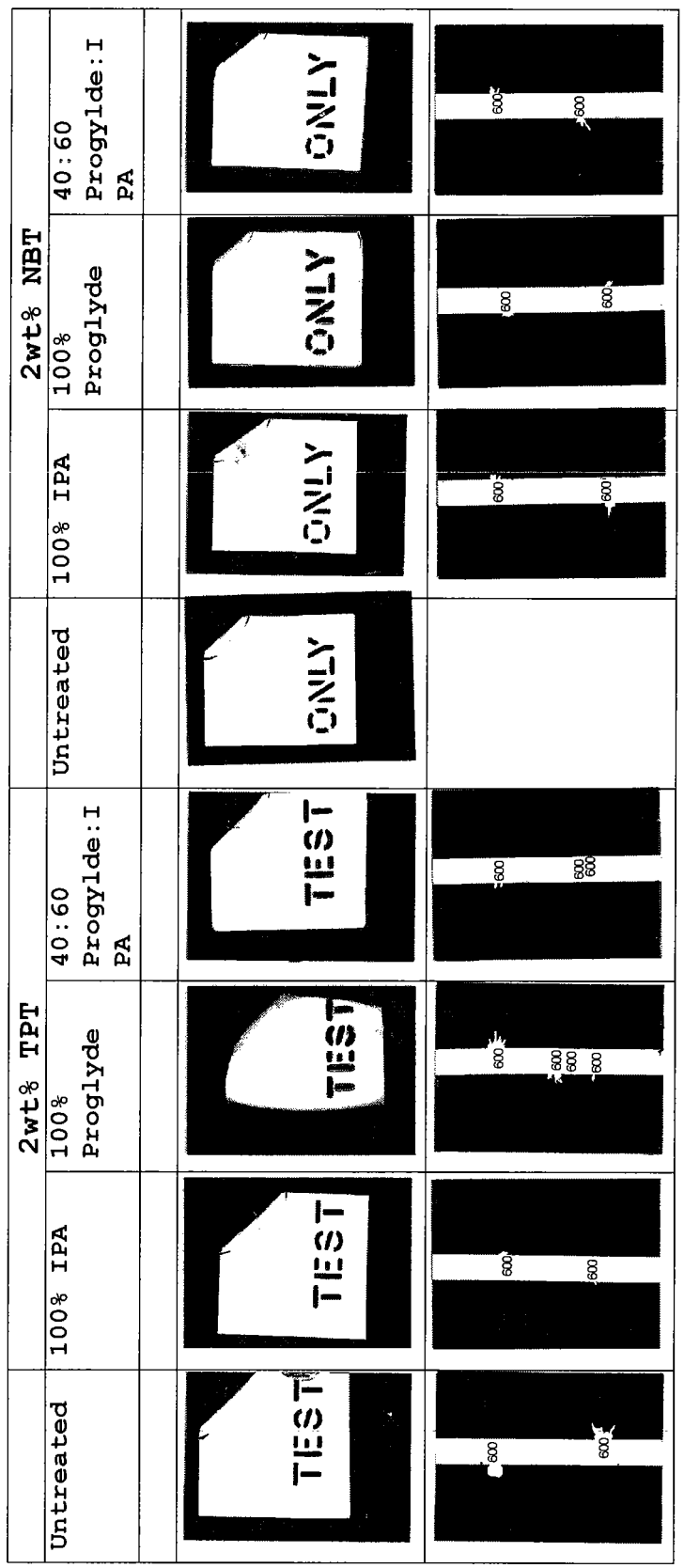

Based on the results provided for $LiBH_4$ based modifying agents stencil and pre-mask swelling appeared to be more related to the physical properties of the solvent system employed rather than the low concentrations of the active agent. To confirm this with metal alkoxide modifying agents a brief study was undertaken with the results provided in FIGS. 4 and 5. As was shown for $LiBH_4$ treatments in 100% Proglyde DMM extensively swelled the vinyl mask whilst 100% IPA provided no swelling. Since slight swelling began at a ratio of approximately 60:40 IPA: proglyde this ratio was considered a reasonable upper limit for the amount of glycol ether in formulations to be used with stencils. The effect of modifying agent concentration for NPZ in NPA or TPT in IPA was also undertaken (FIG. 5) with the results confirming that in 100% alcohol at least the concentration range (0.5 to 5.0 wt %) did not appear to negatively impact letter quality.

Figure 6:
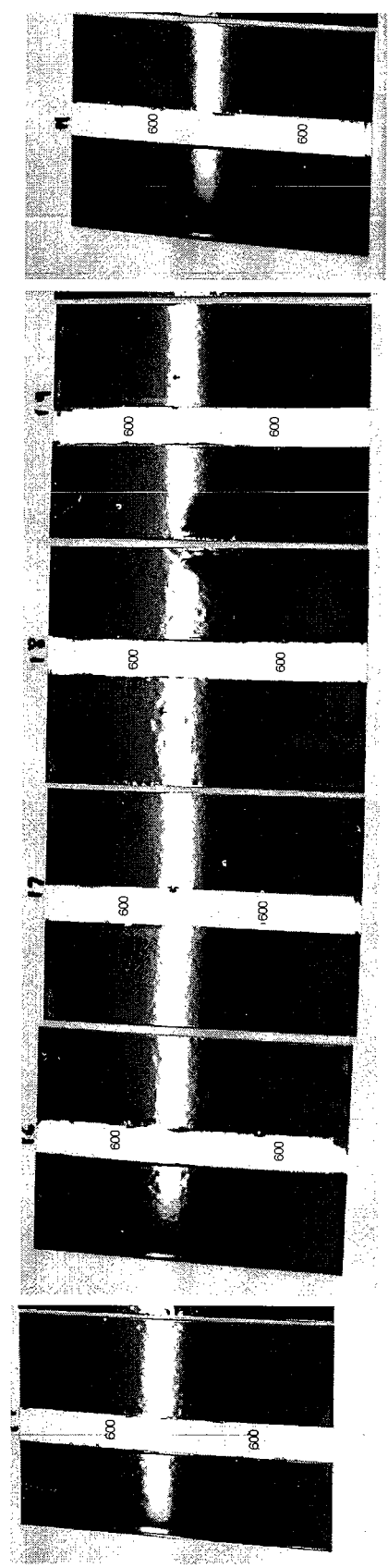

Preliminary 30 day water soak experiments were also undertaken with specimens reactivated and then overcoated. One to three applications of the modifying agent were investigated to simulate both thin and thick applications, over spray, multiple passes etc. Generally good overcoat appearance was observed even with high concentrations of TPT or NPZ (5 wt %) at 1 to 3 applications (FIG. 6).

Pre-Mask and Stencil Vinyl Swelling

Figure 7A:
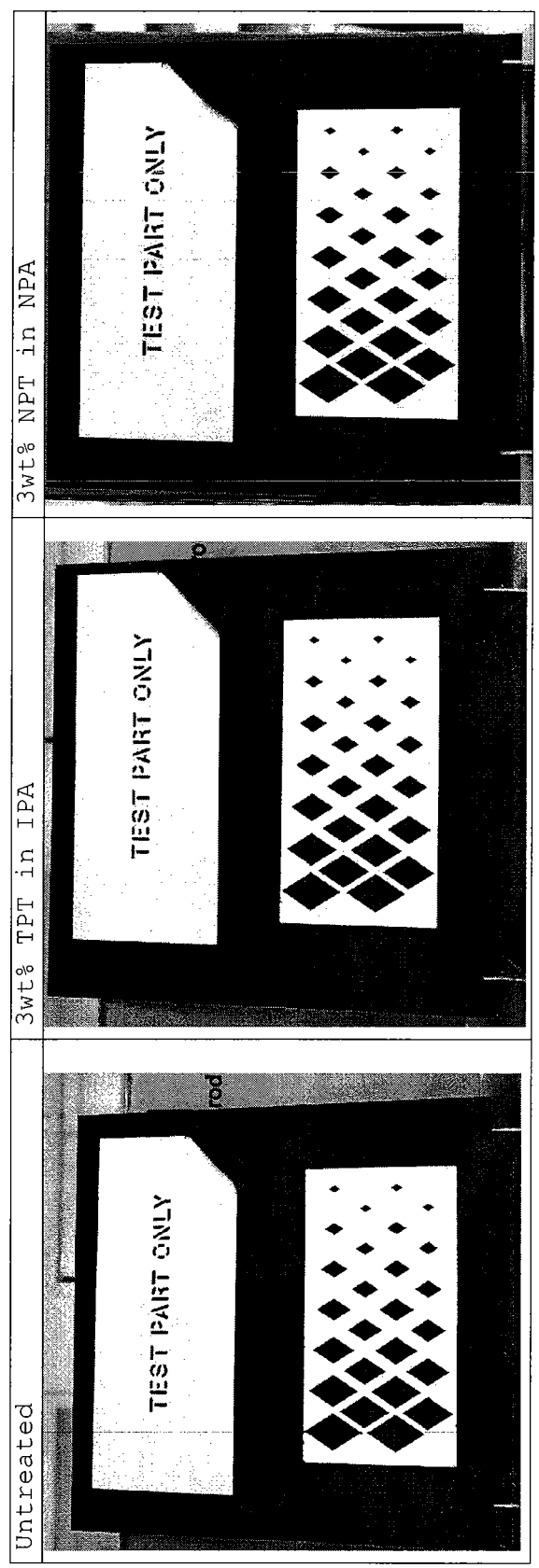
Figure 7A:
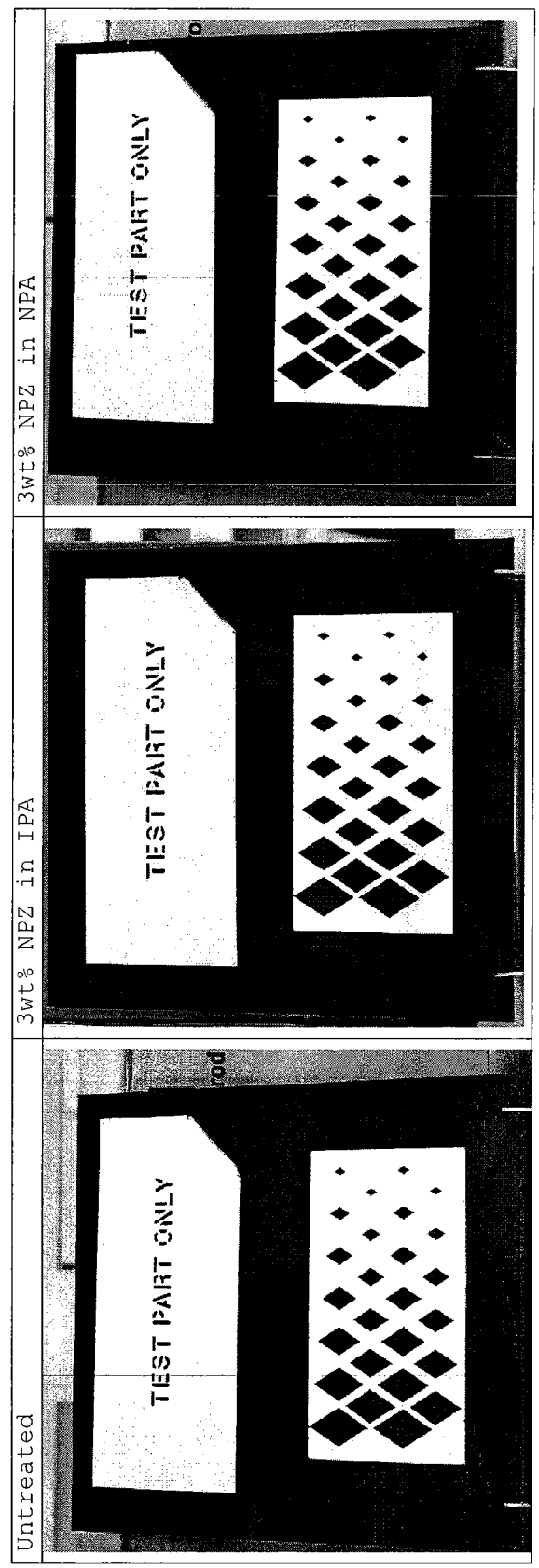
Figure 7B:
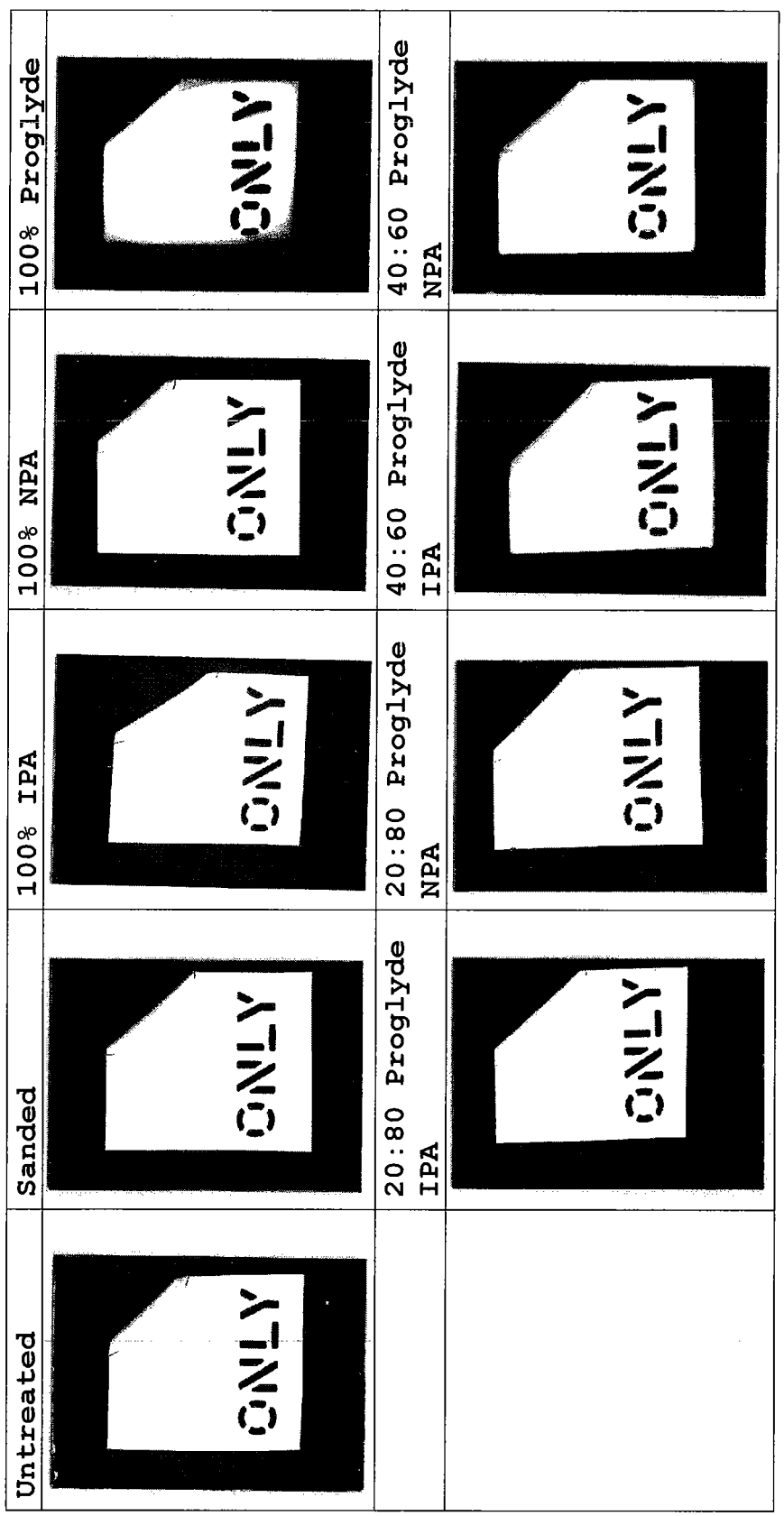

Based on the preliminary results for stencil swelling, full stencil and premask diamond studies were undertaken. Using 100% IPA or NPA in the solvent system did not appear to provide appreciable stencil or pre-mask swelling and as such letter clarity was crisp even when the reactivation solution was applied over vinyl mask materials SOLO (FIG. 7a). Following encouraging whirling arm rain erosion results (see later) additional stencil swelling experiments were undertaken employing 5 wt % NPZ in a range of solvents and combinations (FIG. 7b). No negative impact was demonstrated by using a 20:80 ratio of proglyde DMM to IPA or NPA, although at a 40:60 ratio some slight wicking away from the edges of the stencil was noted. Considering the benefits provided by using a slightly higher proglyde concentration in terms of adhesion on thicker paint layers, this degree of stencil swelling may be acceptable and probably not observed on pre-mask vinyl considering its lower susceptibility to swelling or when applied for short dwell times (15 min). Alternatively, different solvent formulations can be employed depending on whether the application is for stencils which typically uses paint layer thickness on the order of one mil or premask or large body area applications where the paint layer thickness is typically two to five mils.

Figure 7C:

Tests using a 5 wt % NPZ are provided in FIG. 7C. It should be pointed out that using difficult to remove Chinese characters letter quality was significantly improved compared to untreated specimens and there was no appearance of stencil swelling when a 5% NPZ 20:80 proglyde:IPA solvent system was employed for reactivation.

Adhesion

Figure 2:
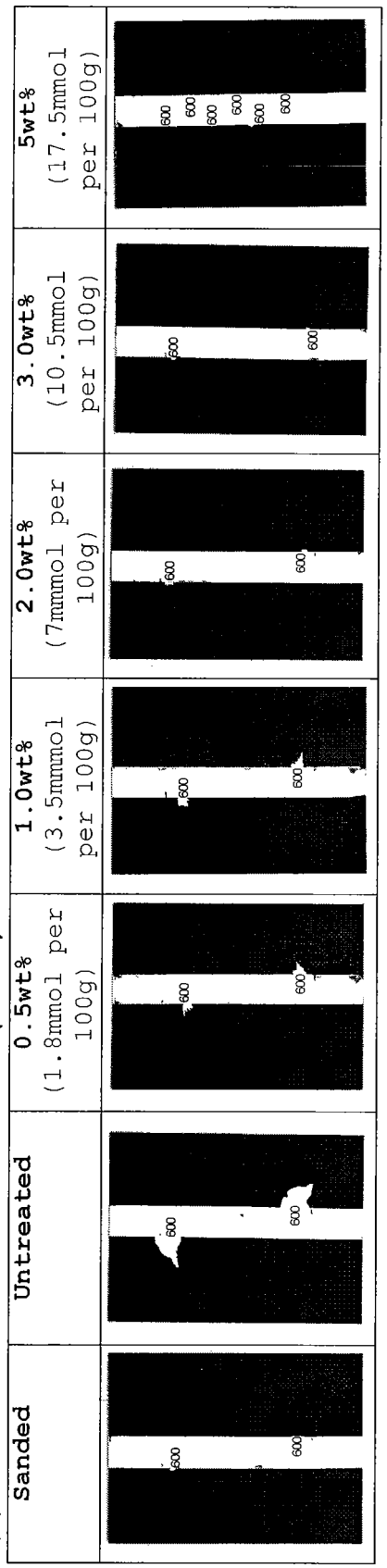
Figure 2:
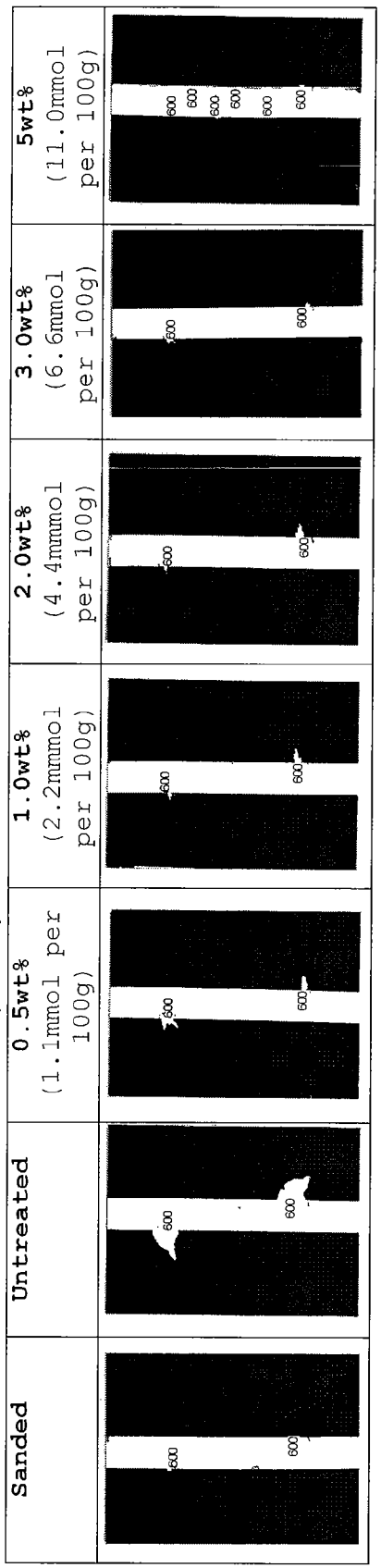

Leveraging the preliminary results provided in the initial screening experiments above, the majority of subsequent experiments were completed employing a 3 wt % concentration of modifying agent in alcohol based solvents. Later, higher concentrations of modifying agent and the addition of proglyde to the solvent system was found necessary to provide acceptable whirling arm rain erosion results on thick layers of paint in certain circumstances. It should also be emphasised that as indicated in FIG. 2, concentration parity was not maintained between TPT and NPZ with a 3 wt % solution actually corresponding to a 10.5 and a 6.6 mmol/100 g concentration respectively.

Scribe Adhesion

Figure 8:
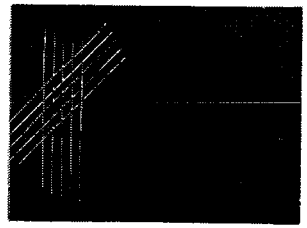

Various scribe adhesion test results are provided in FIG. 8. Although the 3.5 h, 120 F cure stencil results did not provide a reference material that failed BSS7225 (and as such it was not possible to discriminate between the reactivation treatments) the 12 h ambient cure overcoats did with the reactivated samples providing a "10" rating similar to sanded for in contract to untreated with a "0" rating.

Figure 9:
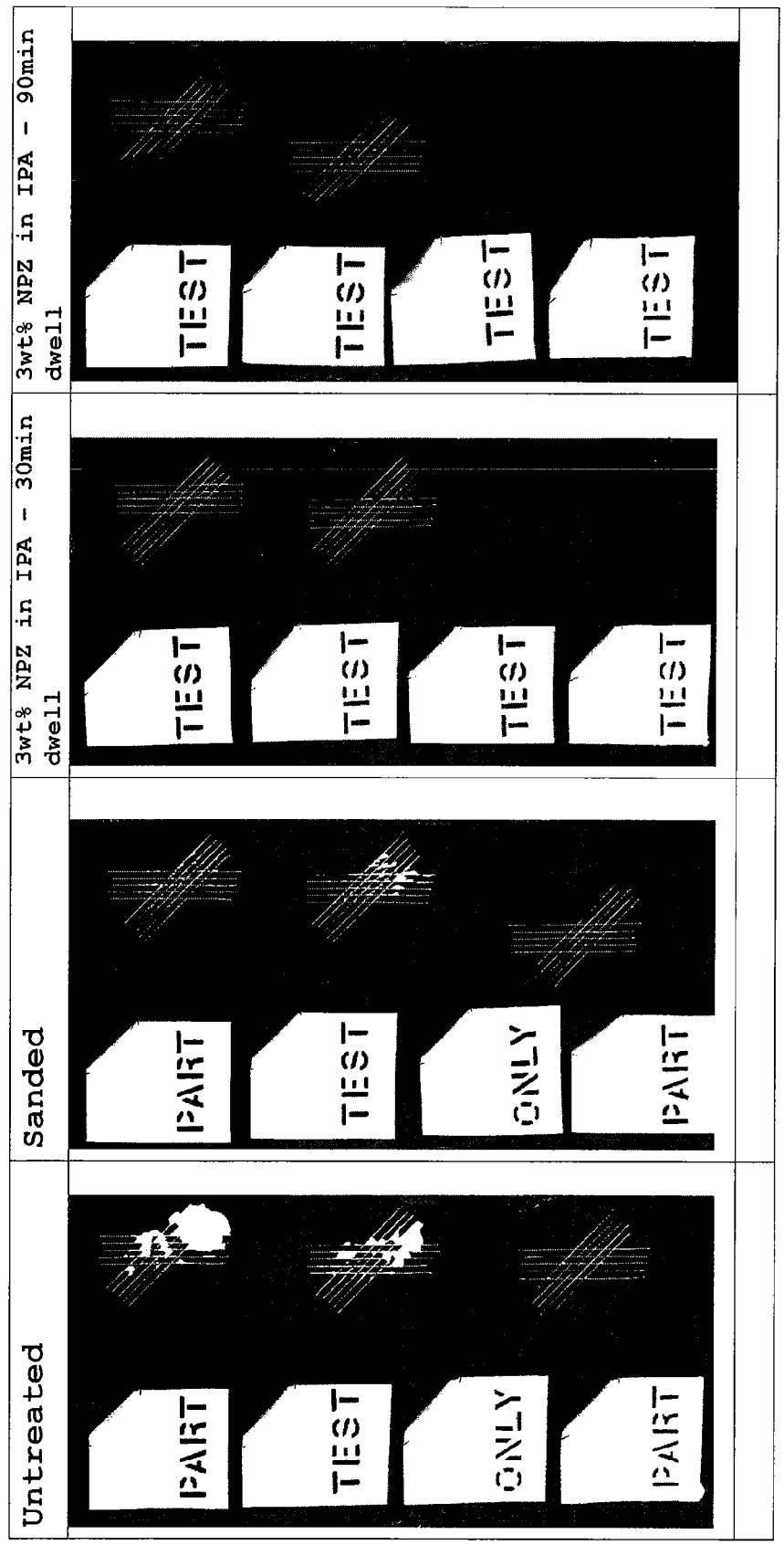
Figure 9:
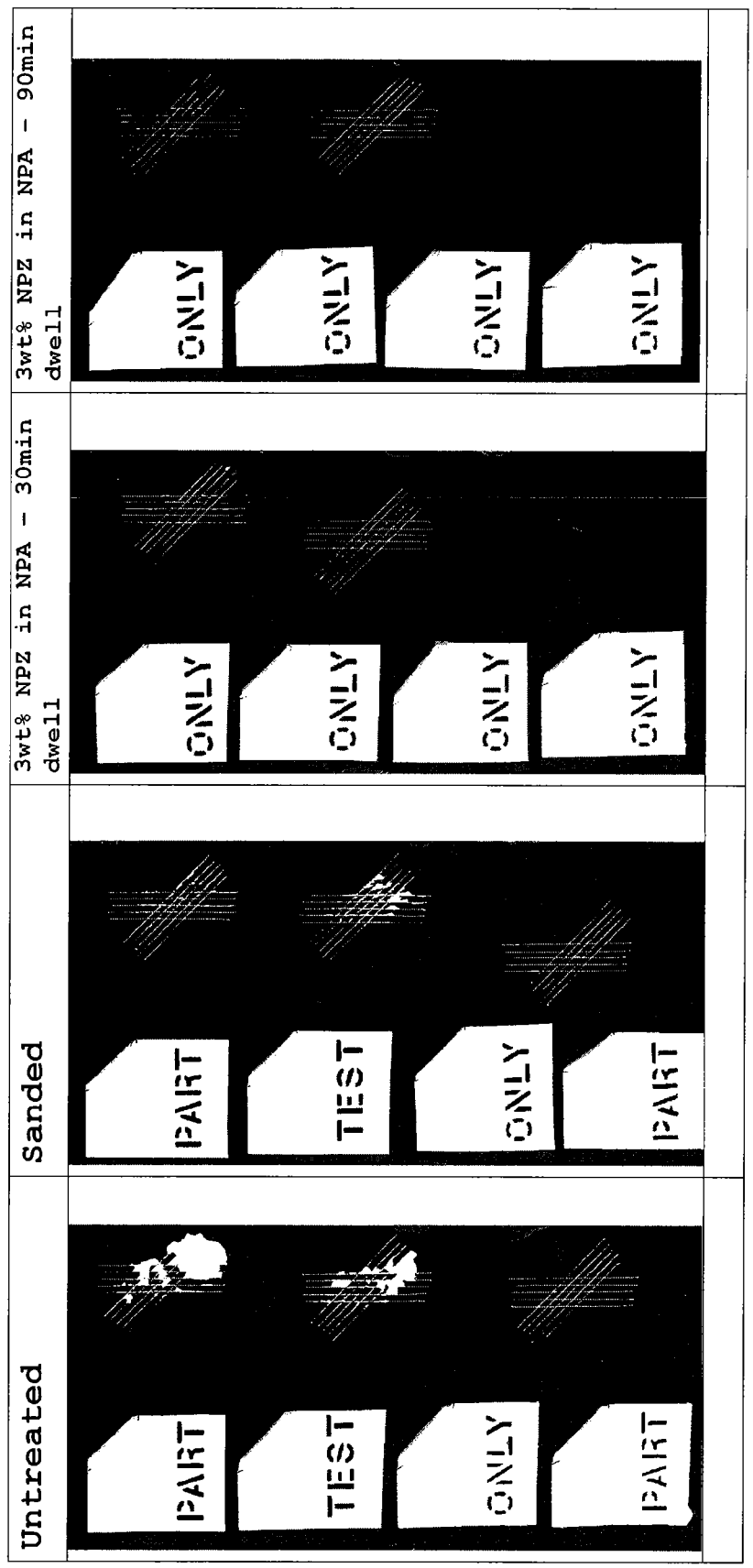

Stencil pull and scribe adhesion were also undertaken (FIG. 9) and mirror that completed for LiBH$_4$. Regardless of the treatment dwell (30 or 90 min), the treatments provided excellent scribe results (10 in BSS 7225) after 60 min under ambient conditions superior to that of both sanded (8) and untreated (3). In terms of stencil pull:—pull times of 90 min (more severe) did provide a "thinner" letter for all the reactivations treatments. Results for TPT were somewhat superior to NPZ regardless of whether IPA or NPA was employed which might be attributed to the difference in effective concentration. However, stencil pull results were on the whole far better than untreated with effectively a full letter present at a stencil pull time of 60 min (similar to sanded specimens) whereas untreated specimens only provided a full letter at a pull time of 30 min.

SIJA and Rain Erosion Adhesion

Based on those strategies WARE foils were prepared with the main aim of (i) obtaining concentration parity between TPT and NPZ, (ii) employing Desothane CA8000 base coat cured with standard "C" thinner, (iii) exploring the potential for using proglyde as a co-solvent, and (iv) probing the effect of multiple applications. In all the experiments a relatively long application time was employed (4 h) to provide a sufficient time frame for the metal alkoxide to firstly react and then condense with the aged paint surface. Subsequent tests demonstrated that much shorter dwell (application) times, e. g. 30 minutes, were feasible.

Figure 10:
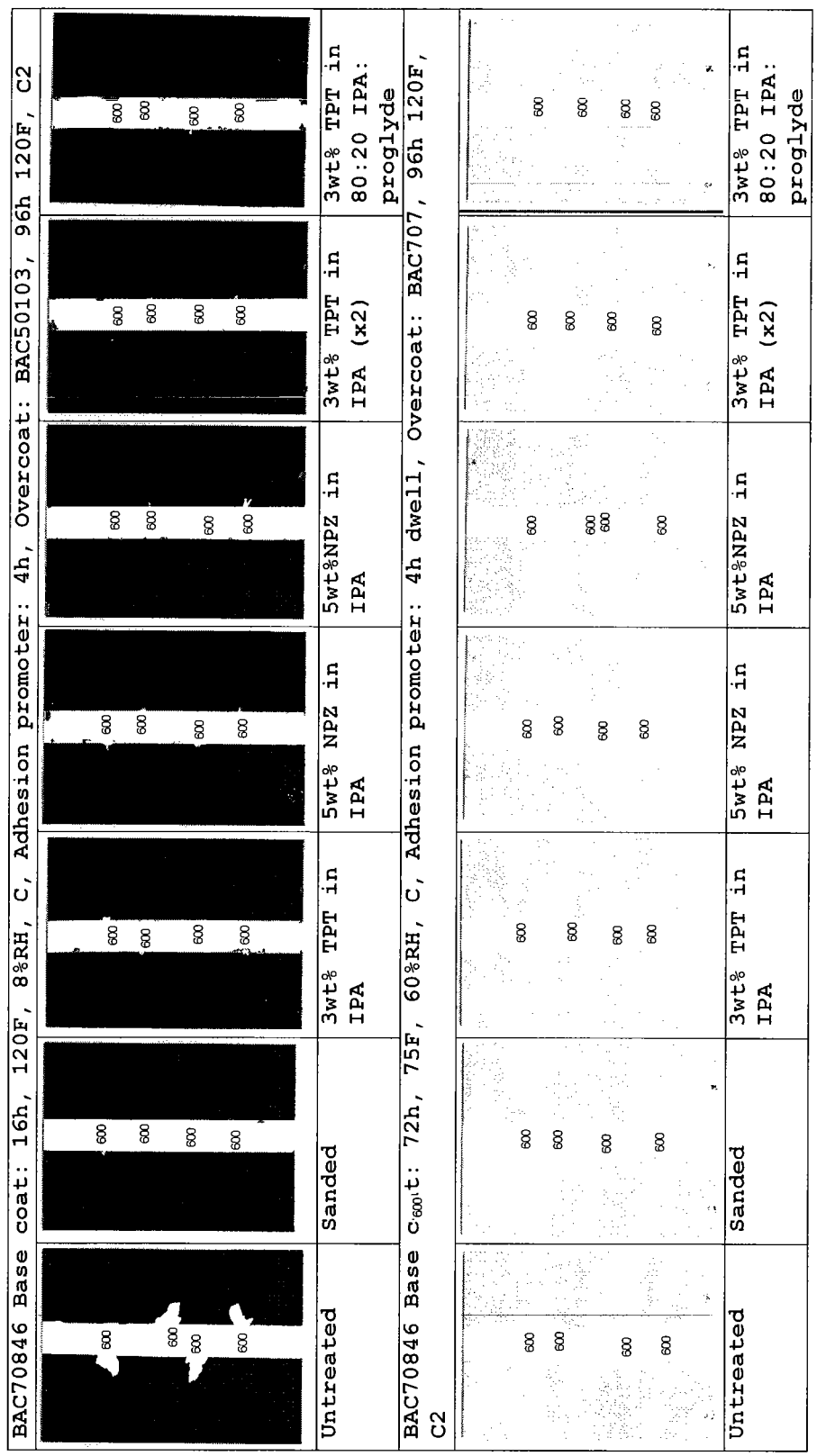
FIG. 10 is photographs showing SIJA inter-coat adhesion (DHS CA8000 paint); cure conditions as indicated.
Figure 11:
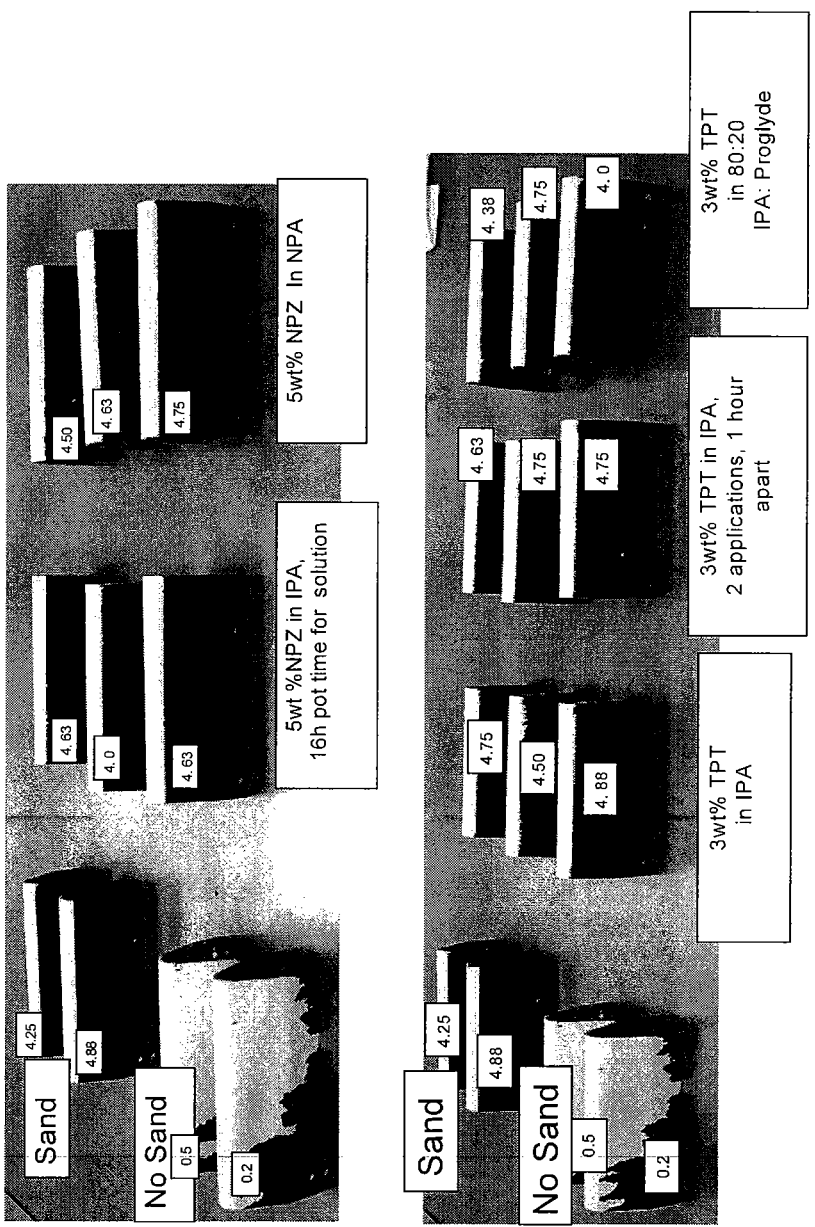
FIG. 11 is photographs showing corresponding WARE results to FIG. 12; cure conditions as indicated.
Figure 11:
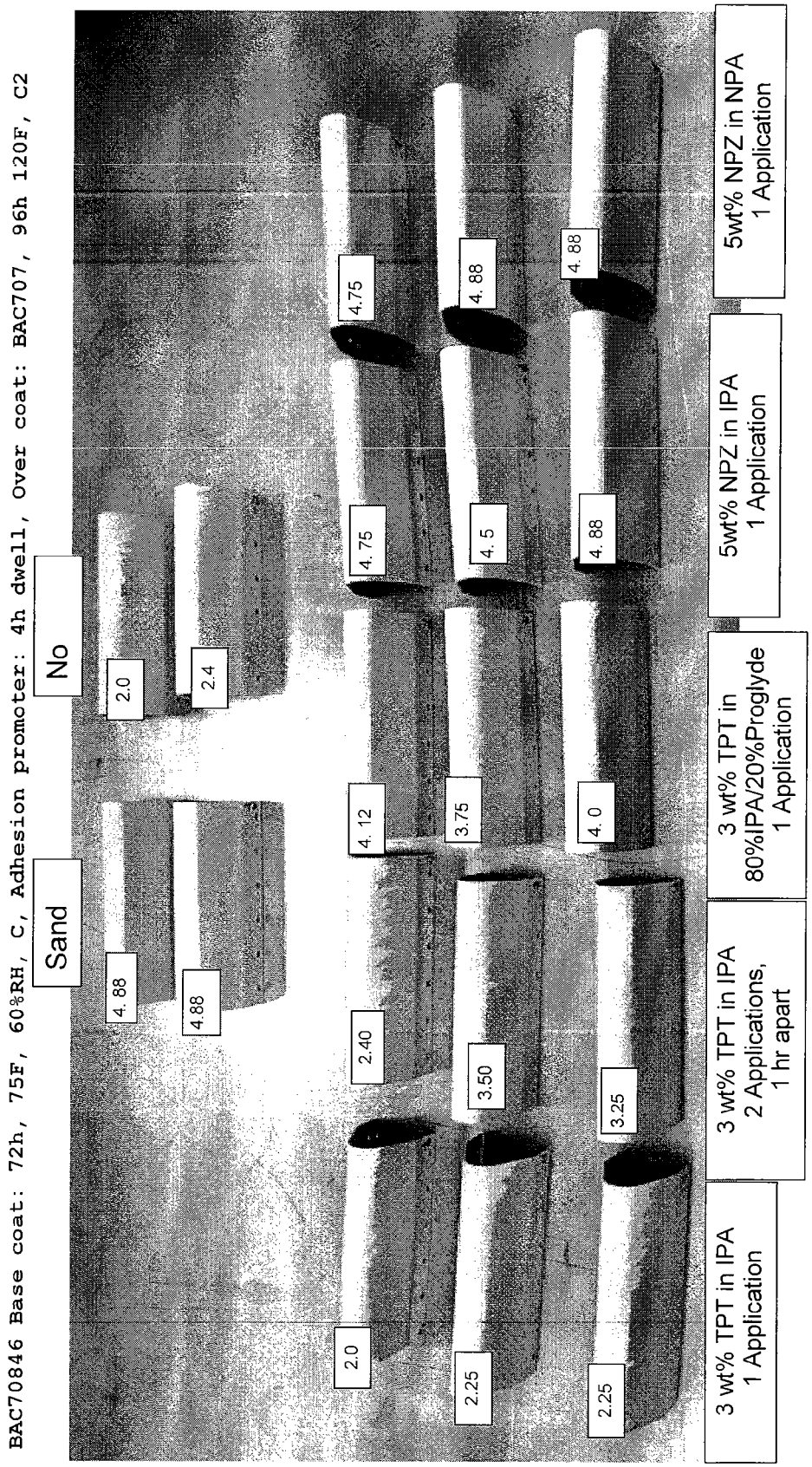

The results from SIJA panels are provided in FIG. 10 and the WARE results obtained from foils provided in FIG. 11. Although reasonable paint removal was obtained for the untreated reference from the 16 h, 120 F heat cycle cure (at 8% RH or 0.59 wt % air moisture), the 72 hr basecoat ambient cure (at 60% RH or 1.12 wt % air moisture) provided an untreated reference with only marginal paint loss. As such it was again difficult to compare the relative performance of the reactivation treatments.

Table 6 provides tabular data for the WARE results given in FIG. 11. All foils produced "passes" with the "C" cured base coating under the 16 h, 120 F, 8% RH cure. For the ambient cured foils, all the NPZ foils had superior WARE compared to the TPT foils. Fot the TPT foils, multiple applications appeared to help, although incorporation of 20% proglyde provided the greatest advantage with 2/3 foils passing the test (eg a marginal pass). The reason for this is complex: (i) the addition of proglyde assists in spraying a more uniform treatment film, (ii) proglyde has a much lower vapour pressure than IPA or NPA and as such the surface remained "wet" somewhat longer which presumably also assisted in promoting surface chemical reactions, (iii) proglyde is known to soften the paint and as such probably promoted metal alkoxide penetration into the coating surface and hence chemical reactions with embedded chemical groups, and (iv) through that process favors the formation of a surface/subsurface interpenetrating network during condensation of the alkoxide prior to or during cure of the over-coat.

TABLE 6

WARE results for FIG. 11

| Untreated | Sanded | 3% TPT in IPA | 3% TPT in IPA ×2 | 3% TPT in PG:IPA, 1:4 | 5% NPZ in IPA | 5% NPZ in NPA |
|---|---|---|---|---|---|---|
| DHS BAC70846 Base coat: 16 h, 120 F., 8% RH, C2, Adhesion promoter 2 h dwell, Overcoat BAC50103, 96 h 120 F., C2 ||||||||
| 0.5 | 4.3 | 4.8 | 4.6 | 4.4 | 4.6 | 4.5 |
| 0.2 | 4.9 | 4.5 | 4.8 | 4.8 | 4.0 | 4.6 |
|  |  | 4.9 | 4.8 | 4.0 | 4.6 | 4.7 |
| 0.4 | 4.6 | 4.7 | 4.7 | 4.4 | 4.4 | 4.6 |
| DHS BAC70846 Base coat: 72 h, 75 F., 60% RH, C2, Adhesion promoter 2 h dwell, Overcoat BAC707, 96 h 120 F., C2 ||||||||
| 2.0 | 4.9 | 2.0 | 2.4 | 4.1 | 4.8 | 4.8 |
| 2.4 | 4.9 | 2.3 | 3.5 | 3.7 | 4.5 | 4.9 |
|  |  | 2.3 | 3.3 | 4.0 | 4.9 | 4.9 |
| 2.2 | 4.9 | 2.2 | 3.1 | 3.9 | 4.7 | 4.9 |

The findings from the trials with Desothane CA8000 on metal alkoxides may be summarised generally as follows:

(i) NPZ is preferred over TPT (ii) NPA is preferred over IPA (iii) Small amounts of proglyde co-solvent appear to be helpful (iv) For maximum benefit, metal alkoxide concentrations should be >10 mmol/100 g (v) Multiple application provide a more limited benefit
(vi) Reactivation of high humidity cured specimens appeared to be more complex compared with low humidity cure (surface chem. related/moisture present in coating etc)

Figure 12:
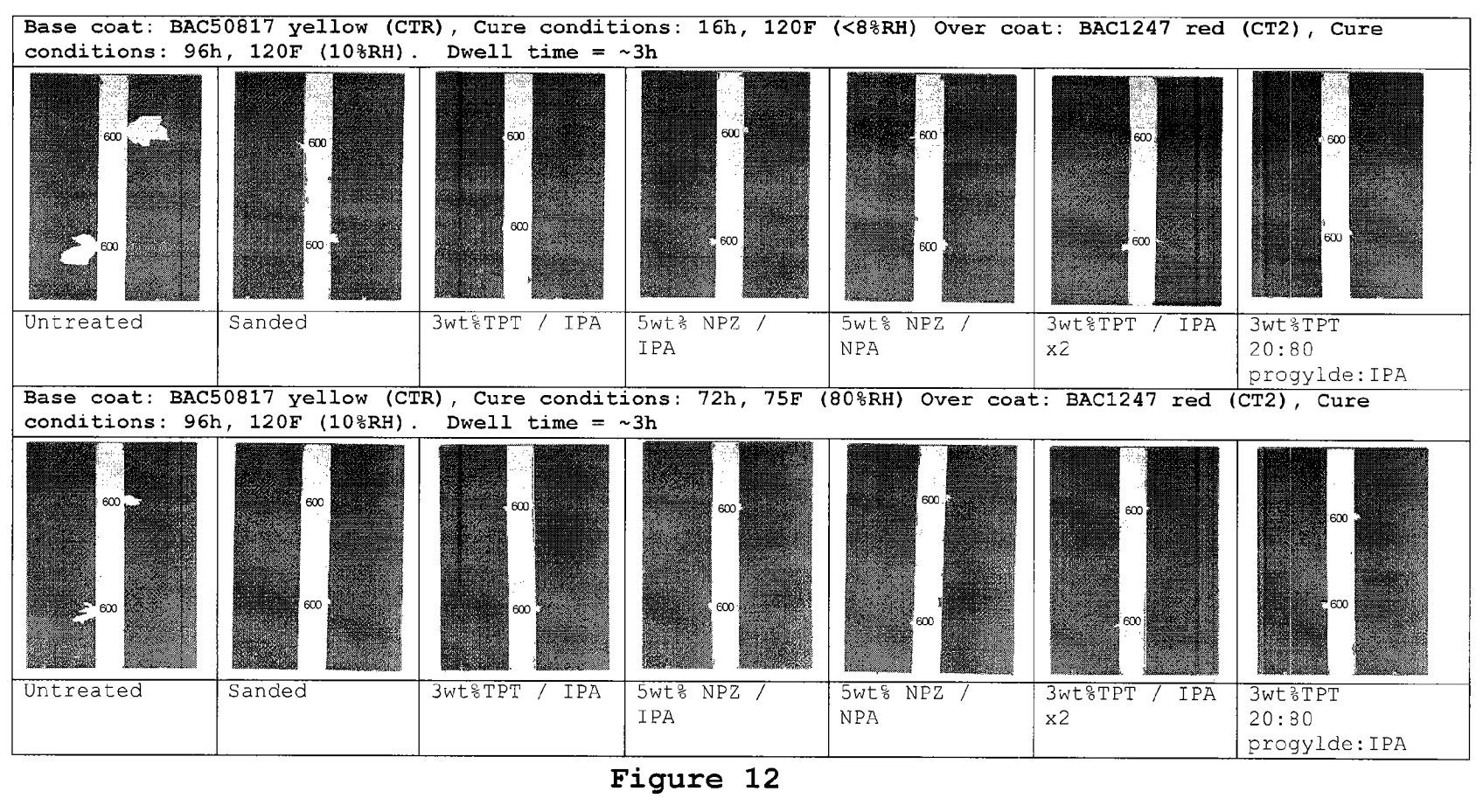
Figure 13:
FIG. 13 is photographs showing SIJA inter-coat adhesion (Eclipse paint); cure conditions as indicated.
Figure 16A:
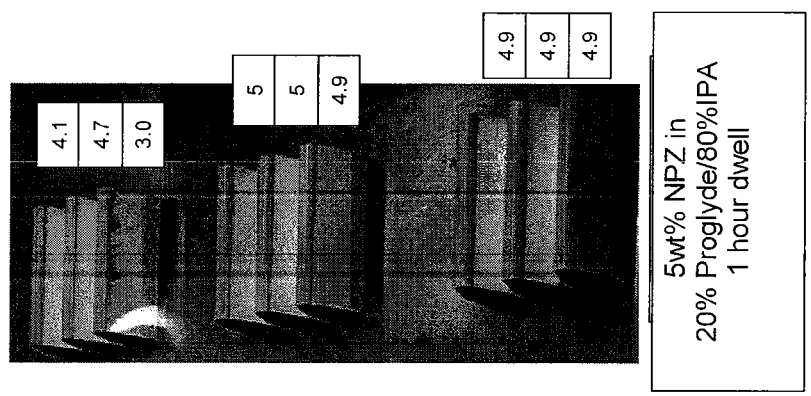
Figure 16A:
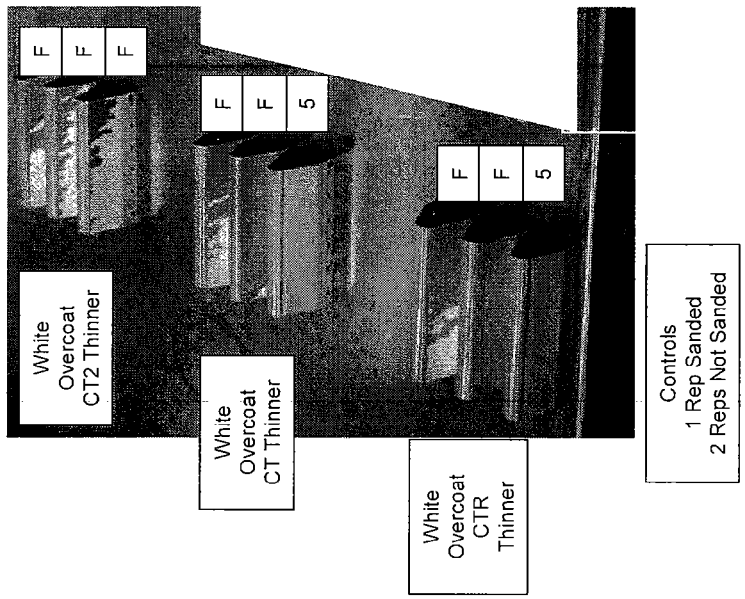
Figure 16B:
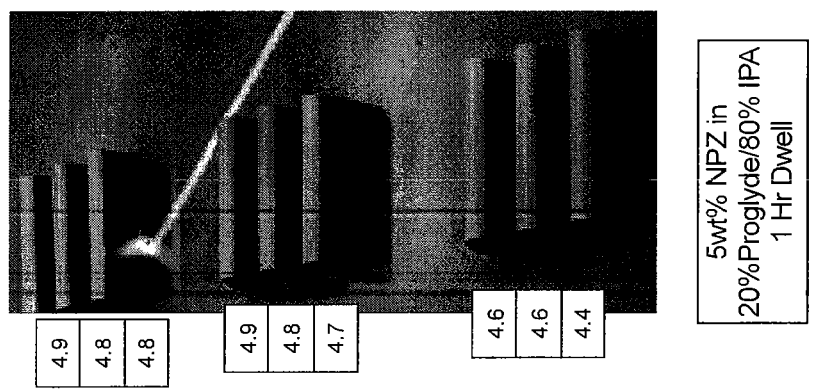
Figure 16B:
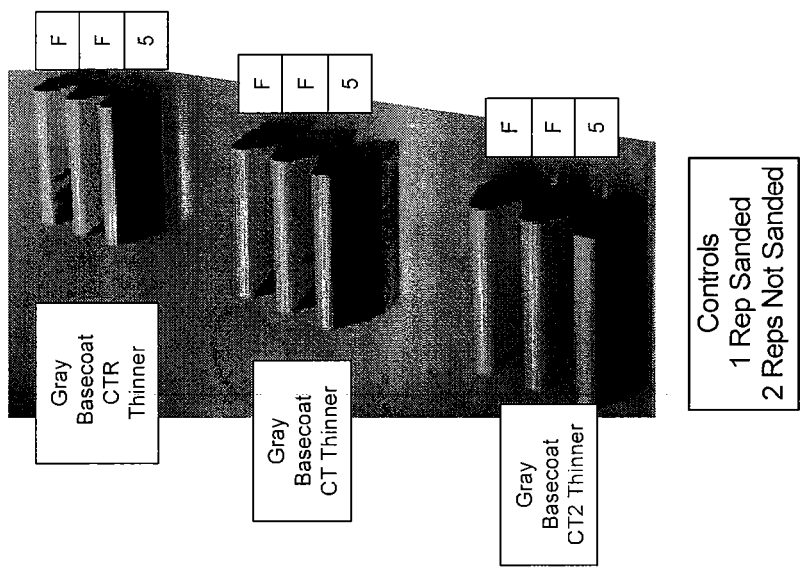

Based on those findings a SIJA screening experiment was completed with Desothane CA8800 and Eclipse coatings employing the same two cure scenarios albeit that the ambient cure relative humidity was increased to 80% RH (1.56 wt %% air moisture). The results are provided in FIGS. 12 and 13. Reactivation employing either TPT or NPZ using a variety of solvent systems provided improved levels of inter-coat adhesion under both cure conditions. The extent of improvement was such that further discrimination between the alkoxides and solvent systems employed was difficult to assess, although introduction of proglyde into the formulation as an 80:20 blend did appear to further enhance the performance. Further SIJA screening was also completed on Desothane CA8000 using 5 wt % NPZ and several proglyde to n-propanol and isopropanol solvent ratios as shown in FIG. 14. Results using 5 wt % NPZ in a solvent solution of proglyde and either IPA or NPA with 30 to 60 minute dwell time of the modifying agent prior to overcoat paint are provided in FIGS. 15 to 18. FIG. 15 shows the rain erosion results employing a 20:80 proglyde:IPA solution for different dwell times and for "high" humidity (1.31 wt % air moisture) and "low" humidity (0.22 wt % air moisture) cure scenarios. In all cases the modifying agent treatment provided excellent inter-coat adhesion to both Desothane CA8000 and CA8800 coatings with just the high humidity cure Eclipse providing failures. FIG. 16a explores the effect of Desothane CA8800 cure rates using reduced rate (CTR), standard rate (CT), and fast rate (CT2) cured overcoats and a CTR cured base coat employing the same reactivation treatment. For BAC70846 white over BAC707 gray good passes were obtained for the CTR and CT thinners. The faster CT2 cured over-coat did not provide so good a performance (2/3 foils rated above 4) although it should also be noted that sanded also failed under similar conditions. When BAC51265 Blue was used as the overcoat (CTR) and the BAC 707 gray base coat cured with the different thinners (FIG. 16b), high passes were obtained for each of the cure rates. This suggests that reactivation of the basecoat is relatively insensitive to the cure rate (thinner) employed in the basecoat.

FIGS. 17a and b documents the effect of higher proglyde concentrations (40%) and the impact of NPA or IPA as the alcohol in the 5 wt % NPZ formulation using difficult to over-coat systems including Desothane CA8800 gray on white cured under high humidity and CA8000 cured under low humidity conditions. In both cases excellent passes were obtained with little differentiation between the two types of alcohols employed.

Figure 18A:
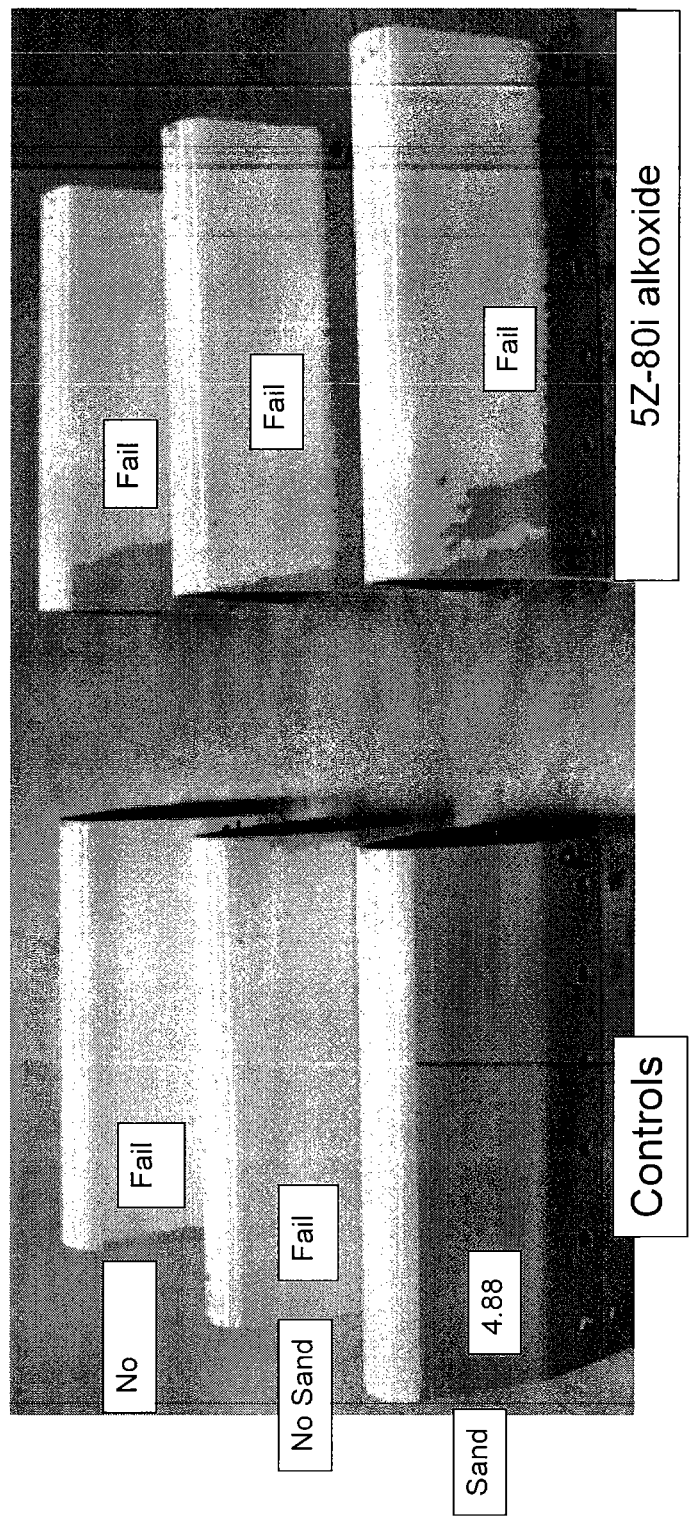
Figure 18B:
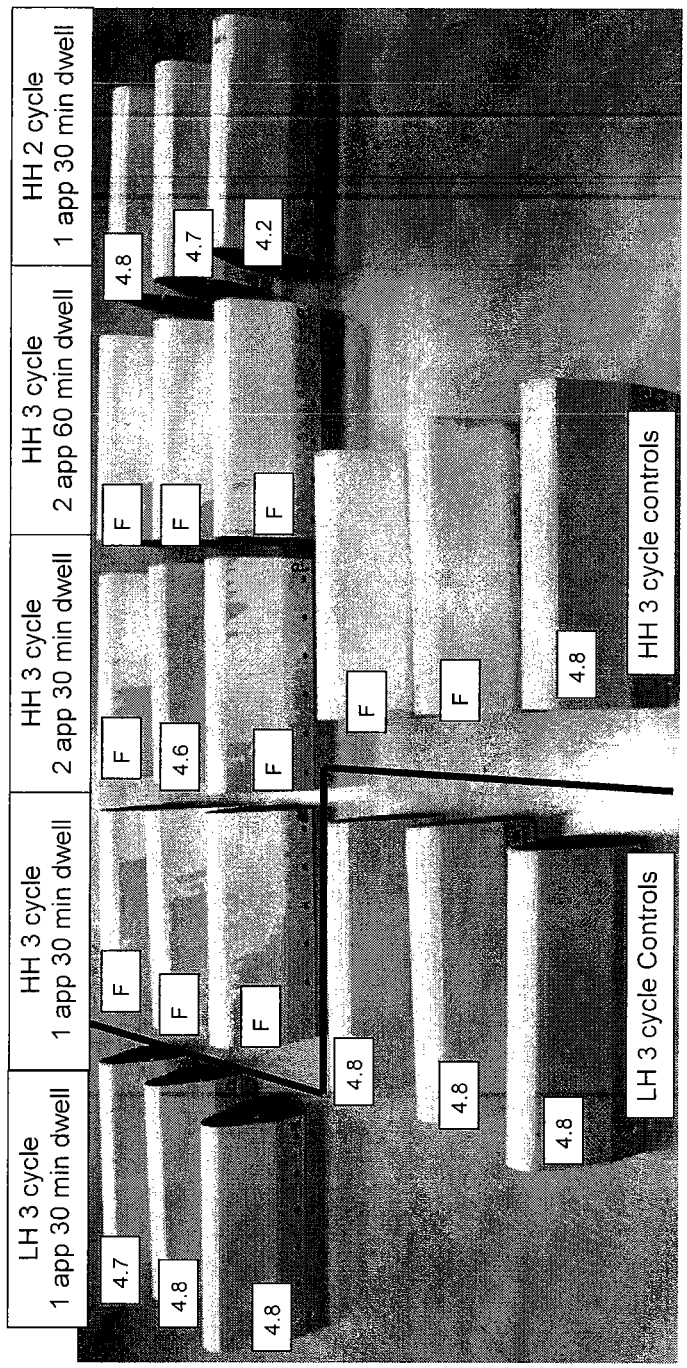
Figure 18C:
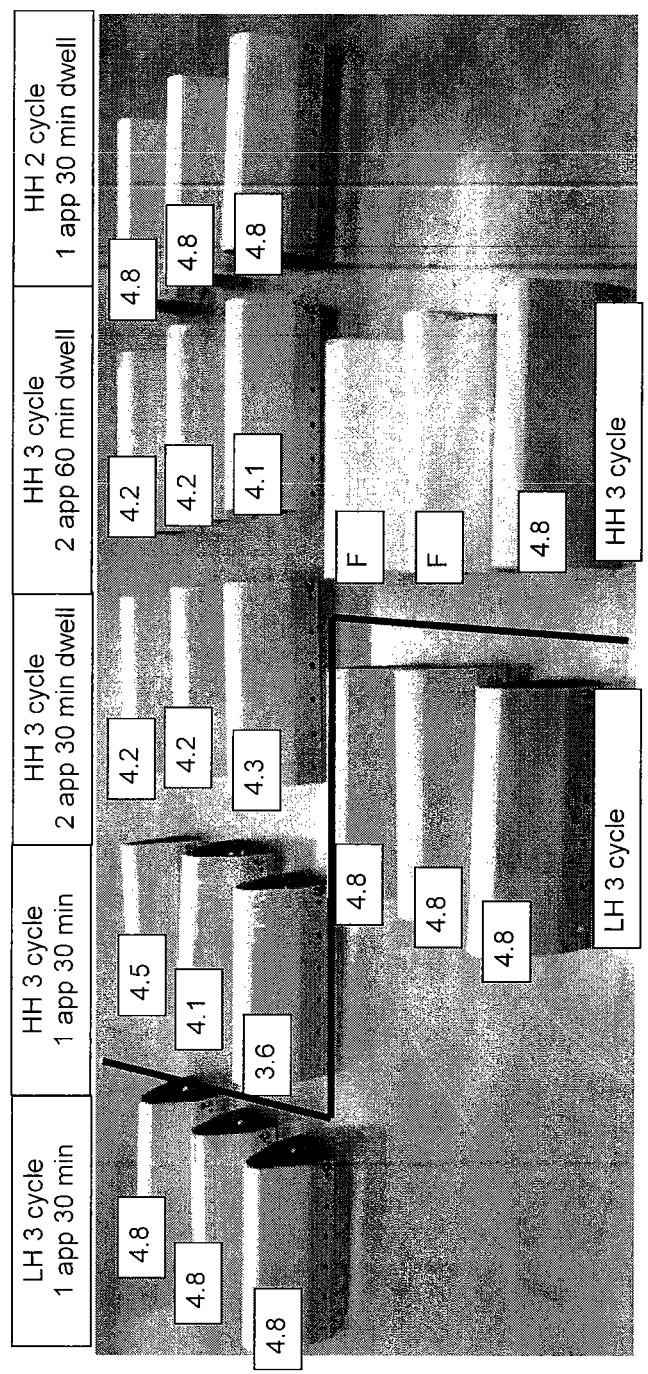

Given those results the treatments were applied to high humidity cured Eclipse base coats which had been previously shown to fail when exposed to 5 wt % NPZ in 80:20 IPA:proglyde (FIG. 18a). In the case of formulations employing 60% IPA no passes were obtained when three cycles of the humidity protocol were used even when two application and longer adhesion promoter dwell times were employed although specimens cured at low humidity were successfully reactivated (FIG. 18b). Two cycles of the high humidity protocol, however, did provide good passes. In contrast the 60% NPA formulation provided passes with three cycles of the humidity cure protocol with 2/3 foils passing after only 1×30 min application and with 2×30 or 60 min treatment solution applications 3/3 foils passed the adhesion test (FIG. 18c). From these results, NPA performed slightly better than IPA for intercoat adhesion. This difference in NPZ formulations could be due to (i) longer dwell time re: vapour pressure or (ii) mixed alkoxides from the interaction of IPA in the solvent system not favouring reactivation of such materials. Intuitively one might predict that steric hindrance would be greater in the mixed alkoxide system which could reduce the reaction rate with the substrate surface or ability for it to interpenetrate into the coating.

To determine if higher concentrations of modifying agent would show even further improvements in WARE, NPZ formulations up to 9 wt % (19.8 mmol/100 g) with a solvent of 60 wt % NPA/40 wt % proglyde were tested using CA8000 basecoat cured at 120 F under low (3% RH, 0.22 wt % air moisture) and moderately high humidity (13% RH, 0.95 wt % air moisture) conditions for eight days. Various paint lines—CA8000 (FIG. 19A), Eclipse (FIG. 19B), and Sky-Hullo (FIG. 19C)—were used as overcoats. All foils (18/18) passed using 5 wt % NPZ, 13/18 foils passed using 7 wt %, and only 10/18 passed using 9 wt %. The Sky-Hullo overcoat was particularly discriminating with 6/6 foils passing using 5 wt %, 4/6 using 7 wt %, and 1/6 using 9 wt %. Overall, the results in FIGS. 19A to 19C suggested that the optimum NPZ concentration is near 5 wt % and the optimum alkoxide concentration is near 0.11 mmol per gram.

Preliminary shelf life SIJA data is provided in FIG. 20 and suggested that the modifying agent was not negatively affected by storage under ambient conditions. After three months all of the solutions (stored in glass) were precipitate free indicating a low level of hydrolysis and hence polymerisation. Although the solutions were prepared in either NPA or IPA it was not anticipated that the addition of 20 to 40% proglyde would negatively impact storage stability, particularly since proglyde can be obtained essentially moisture free. Other storage containers such as high density polyethylene could be used. The modifying solution could also be stored as a two part kit, similar to how many aerospace paints are packaged, where one part would contain the NPZ either at 70 wt % or at diluted concentration and the second part would contain a proglyde/alcohol solvent solution.

Sealant & Elastomer Interaction

Sealant and elastomer immersion results are provided in FIGS. 21 to 24. In those tests BMS5-142 sealant was immersed in modifying agent solutions with IPA or NPA as the solvent for a period of 24 h, whilst elastomers were immersed for 7 days and the change in weight, volume and hardness monitored both during the immersion as well as on recovery relative to MPK and water reference solutions. FIG. 25 provides images of the sample following recovery and illustrates that the samples were not obviously eroded or negatively impacted visually. Considering that MPK has solubility parameters of [dispersion, polar, and H-bonding] [16.0, 9.0 and 4.7 J/cm$^3$], NPA [16.0, 6.8 and 17.4 J/cm$^3$] and employing the rule of mixtures a 40:60 blend of Proglyde/NPA [15.6, 5.0 and 12.0 J/cm$^3$], the proglyde/NPA solvent blend should not provide a substantial interaction with these types of materials.

In the case of BMS5-142 (polysulfide non-chromate sealant) weight gain reported in FIG. 21A was more significant for MPK relative to the reactivation treatment solutions and correspondingly the volume change in FIG. 21B was also greater. This result indicated a relatively low interaction between the treatments and the polysulfide sealant. After 7 days recovery all modifying agent treatment solution immersed samples were within 5% of their initial pretreatment hardness, whilst both the water and MPK immersed samples were less than 10% softer.

BMS1-71, CL1 (EPR) elastomers provided the greatest weight gain in MPK and material appeared to be extracted by the reference solutions. Weight loss on recovery in MPK was about 12% after 7 days compared to less than 4% for samples immersed in the treatments. Correspondingly shrinkage on recovery was greater for the MPK reference, whilst the 7 day recovery Shore A. hardness at ~17% increase was slightly higher than the 9 to 12% increase for samples immersed in TPT or NPZ. Similar results in FIG. 23 were provided by BMS1-71, CL2 (Silicone). During immersion, that material also showed a great uptake of MPK after 7 days (70% weight increase) compared to the treatment and water solutions (~15%), but weight and volume (<5%) and hardness changes (<10%) were all similar during recovery.

BMS1-57 (Silicone) was also less susceptible to treatment solution uptake than MPK (~20% weight gain re: ~90%). Weight and volume loss during recovery were less than 10% (typically <5%) for all immersions, and presumably was caused by material extraction during immersion. Hardness increase for the treatment solutions upon recovery was about 20%, whilst for MPK it was 10%. The larger hardness increase could indicate a larger sensitivity of this elastomer to the treatment solutions than to MPK, a commonly used cleaning component. However, the treatment solutions are typically sprayed on as thin films rather than flooded or wiped on as is typical for cleaning solutions so the 7 day soak of the treatment solutions is an extreme condition.

Metal Interaction

Commonly used aerospace metals were also investigated for weight change and visual appearance following 30 day immersion in the metal alkoxide solutions compared with water (FIGS. 26 to 30). As a general point weight loss or gain was very low (not much more than the resolution of the 4 decimal place balance) and generally much less than water which appeared for most substrates to be the most aggressive. Weight gain for titanium was less than ~0.07% for the treatment solutions re: 0.14% for water although samples in the reactivation solution did appear to be more "tarnished". This colour shift was reversed for 2024-T3 aluminium with water providing significant discolouration and weight change of ~1.2% compared with less then 0.1% for the treatments. 2024-T3 clad samples accumulated a dull finish following immersion in water and less weight gain compared with the bare Al at just 0.8% increase. However treatment solution samples produced less than a 0.05 wt % increase. Weight gains for high strength and stainless steel immersed in treatment solutions were all less than 0.02 wt % and similar to or less than for water. Interestingly NPZ in IPA did not appear to tarnish high strength steel the way the other systems (inc. water) did although this observation did not translate into a significant difference in weight gain. Sandwich corrosion was tested according to ASTM F1110 with the results provided in FIG. 31. Without magnification both the reference water and treatment solutions appear to provide surface discolouration without pitting to most of the surface.

Composite Interaction

Immersion results for several composite systems are provided in FIGS. 32 to 35 relative to MPK and CEEBEE paint stripper. Samples were cut and immersed without any edge taping and as such, considering the small sample size, represented a most severe immersion test since the cut edges are regions for easy treatment penetration for example through pores/fibre-matrix de-bonding from the cutting process and more generally from the effective "cut" surface to volume ratio. As general comments (i) the CEEBEE paint stripper appeared to be the most aggressive towards all systems resulting in weight gains in the 1.5 to 4% range after a month immersion (ii) generally immersion in the treatment solution also led to weight gain rather than loss (apart from BMS8-276 with SM905), although in such cases the weight change was generally very low (less than 0.5% for all composites and about 0.1% for BMS8-276 with SM905. In several instances initial weight gain was larger (eg 24 h/7 days) with this reducing after longer periods of immersion which may be possible if some material was extracted from the system over time or broke off.

Interaction with Tapes

Preliminary tape interaction studies are provided in FIG. 36 and were considered of critical importance to application of the modifying agent technology for decorative painting of aircraft. In this experiment the effect of tape line, tape ghosting, and IPA wipe to remove residue were evaluated. In general no more paint wicking was observed for samples reactivated prior to/following taping with generally crisp lines present regardless of the modifying agent formulation applied. With TPT a larger amount of modifying agent residue was expected considering its effective concentration at 5 wt % was larger than the NPZ examples (17.5 mmol/100 g re: 11 mmol/100 g). However no appreciable ghosting effects were obvious meaning that even a ~1 mil overcoat thickness was sufficient to hide the tape lines.

Interaction with Coatings

During production there remains the potential for paints to be reactivated (eg through over-spray) but not over-coated. Considering that the process of reactivation modifies the surface of the paint, there remains the potential for some accelerated aging brought about via environmental factors such as heat, water and UV irradiation. To assess this, coupons painted with a white basecoat were subjected to accelerated aging according to SAEJ1960 protocols employing a weatherometer. FIG. 37 provides the change in colour (delta E) over time for coupons treated with modifying agent, sanded, or untreated relative to an untreated, painted coupon stored in the dark and measured at each time increment. Both untreated and sanded, UV exposed samples showed colour shift values in the range of one delta E unit during the experiment. As expected treated coupons at zero time show some colour shift compared the untreated coupon at zero time. Samples reactivated with titanium were slightly lighter and had a yellow/green colour shift prior to exposure. On exposure residue treatment not well bonded to the surface would be anticipated to be removed (washed away) due to the SAE J1960 protocol. This can account for the rapid change in delta E after the equivalent of three months exposure. However, in both 3/6 month cases the samples were shifted darker and after an initial drop in the yellow shift became more yellow at 6 months. Generally speaking colour shifts for Zr based modifying agents were less than the Ti based one. With increasing exposure leading naturally to a slight darkening and yellowing of the coating not dissimilar in magnitude to untreated samples.

Further Performance

Further application of the modification agent is provided in FIGS. 39 to 41. FIG. 39 provides WARE results for clear coated samples (eg paints without pigment) either treated or non-treated prior to over-coating as well as the implication of the effects of any post-treatment process such as wiping with a tack rag prior to over-coating. In all cases the specimens treated with the modification agent provided superior inter-coat adhesion and on some occasions superior to sanded.

FIG. 40 provides hardness measurements prior to and following immersion in hydraulic fluid. The results indicated that the adhesion promoting mechanism is compatible with hydraulic fluid with pencil hardness values either approximately the same as or harder than specimens left untreated prior to over-coating thus providing another benefit.

FIG. 41 provides Gardner impact test results for treated and untreated specimens of various paint thickness. The test is used for predicting the ability of organic coatings to resist cracking or peeling caused by impacts producing rapid deformation of the underlying (metal) substrate). The results show that the modifying agent does not increase the brittleness of the paint and could possibly reinforce the some paint combinations at lower thickness.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method of activating an organic paint coating previously applied to and present on a substrate to increase adhesion of the organic paint coating to a further coating and/or to other entities selected from adhesives, sealants, pin hole fillers and pressure sensitive decals or logos, the method comprising:
 applying an activation treatment to the organic paint coating present on the substrate, the activation treatment consisting of a solvent and a surface chemistry and/or surface topography modifying agent which facilitates surface exchange or transesterification, and optionally an additive, wherein the activation treatment activates the organic paint coating to increase adhesion of a further coating and/or other entities selected from adhesives, sealants, pin hole fillers and pressure sensitive decals or logos to the organic paint coating present on the substrate, and wherein the agent which facilitates surface exchange or transesterification is an alkyltitanate, alkyltitanate chelate, alkylzirconate, alkylzirconate chelate, or combinations thereof,
 wherein, the optional additives when present are provided in an amount of less than about 10% based on the total weight of the combination of solvent, agent and additive, and
 the additive is selected from at least one of stabilizers, pigments and dyes.

2. A method according to claim 1, in which the agent which facilitates surface exchange or transesterification is selected from tetra-ethyltitanate tetraisopropyltitanate, tetra-n-propyltitanate, tetra-n-butyltitanate, tetra-2-ethylhexyltitanate, tetraethyltitanate, triethanolamine titanate chelate, tetra-n-propylzirconate, tetra-i-propylzirconate tetra-n-butylzirconate tetra-t-butylzirconate, tetra-t-pentylzirconate and triethanolamine zirconate chelate.

3. A method according to claim 1, in which the modifying agent is present in an amount more than about 0.001% based on the total weight of the combination of solvent and agent.

4. A method according to claim 1, in which the modifying agent is prepared in-situ from its constituent components.

5. A method according to claim 1, in which the solvent is present in an amount less than about 99.999% based on the total weight of the combination of solvent and agent.

6. A method according to claim 1, in which an additive is applied to the organic coating.

7. A method according to claim 6, in which the additive is selected from stabilizers.

8. A method according to claim 6, in which the organic coating is a polyurethane, epoxy, polyester, polycarbonate and/or acrylic coating.

9. The method of claim 6, wherein the additive is selected from pigment.

10. The method of claim 6, wherein the additive is selected from dyes.

11. A method according to claim 1, in which the solvent, agent and additive when present are applied either simultaneously, sequentially or separately.

12. A method according to claim 1, in which the solvent, agent and additive when present are applied simultaneously in the form of an activation treatment.

13. A method according to claim 1, in which the solvent, agent and additive when present are applied via a spray, brush, dip, knife, blade, hose, roller, wipe, curtain, flood, flow, mist, pipette or combinations thereof.

14. A method according to claim 1, in which the organic coating is a polyurethane, epoxy, polyester, polycarbonate and/or acrylic coating.

15. A method according to claim 1, in which excess solvent and/or agent are removed by solvent or water rinsing; dry, water or solvent wiping; air or gas knife; vacuum application; squeegee; and/or natural or forced convection evaporation.

16. A method according to claim 1, in which the agent which facilitates surface exchange or transesterification is an alkyltitanate, alkylzirconate or combinations thereof.

17. A method according to claim 1, in which the agent which facilitates surface exchange or transesterification is a tetra-$C_{1-8}$ alkyltitanate or a tetra-$C_{1-8}$ alkylzirconate.

18. A method according to claim 17, in which the tetra-$C_{1-8}$ alkyl titanate or tetra-$C_{1-8}$ alkyl zirconate is tetra-propylzirconate or tetra-propyltitanate.

19. A method according to claim 18, in which the tetrapropyltitanate or tetra-propylzirconate is tetra-n-propyltitanate or tetra-n-propylzirconate.

20. A method according to claim 1, in which the solvent is an alcohol or ether or combination thereof.

21. A method according to claim 20, in which the alcohol is selected from an alcohol having a molecular weight of less than about 150 and the ether is selected from an ether having a molecular weight of less than about 300.

22. A method according to claim 20, in which the alcohol is selected from isopropanol or n-propanol and the ether is dipropylene glycol dimethyl ether.

23. A method according to claim 22, in which the solvent is a combination of isopropanol or n-propanol and dipropylene glycol dimethyl ether.

24. A method according to claim 23, in which the dipropylene glycol dimethyl ether is present in an amount of less than 50% or 20 to 40% based on the total weight of the combination of isopropanol or n-propanol and dipropylene glycol dimethyl ether.

25. A method according to claim 20, in which excess solvent and/or agent are removed by solvent or water rinsing; dry, water or solvent wiping; air or gas knife; vacuum application; squeegee; and/or natural or forced convection evaporation.

26. A method for the preparation of the activation treatment according to claim 25 comprising the step of mixing the solvent with the surface chemistry and/or surface topography modifying agent which facilitates surface exchange or transesterification.

27. A method according to claim 20, wherein the ether is selected from a glycol diether and a cyclic ether.

28. A method according to claim 20, wherein the ether is a glycol diether selected from a $C_{1-6}$ alkyl ether or combinations thereof of ethylene glycols and propylene glycols.

29. A method according to claim 20, wherein the ether is a glycol diether selected from diethylene glycol dimethylether, dipropylene glycol dimethylether, and diethylene glycol methylbutylether.

30. A method according to claim 20, wherein the ether is dipropylene glycol dimethylether.

31. A method according to claim 1, wherein the solvent is a combination of two or more solvents selected from solvent combinations of glycol ether:acetate combinations; ether:alcohol combinations; glycols and monoether combinations; and ether combinations.

32. A method according to claim 31, wherein the glycol ether:acetate combination is dipropylene glycol dimethyl ether:tertiary butyl acetate.

33. A method according to claim 31, wherein the ether:alcohol combinations are selected from dipropylene glycol dimethyl ether and a solvent selected from isopropyl alcohol, methanol, isobutanol, secondary butanol, tertiary butanol, ethoxy ethanol and/or ethylhexanol; and ethylene glycol monomethyl ether and a solvent selected from ethanol, methanol, ethoxyethanol and/or isopropanol.

34. A method according to claim 31, in which the ether:alcohol combination is dipropyleneglycol dimethyl ether and isopropanol.

35. A method according to claim 31, in which the ether:alcohol combination is dipropyleneglycol dimethyl ether and n-propanol.

36. A method according to claim 31, wherein the glycols and monoether combinations are selected from dipropyleneglycol monomethylether, dipropyleneglycol monobutylether, and/or dipropyleneglycol.

37. A method according to claim 31, wherein the ether combinations are selected from tetrahydrofuran:triglyme, and tetrahydrofuran:dipropylene glycol dimethylether.

38. The method of claim 1, wherein the activation treatment consists of a solvent and a surface chemistry and/or surface topography modifying agent which facilitates surface exchange or transesterification.

39. A method according to claim 1, in which the modifying agent is present in an amount of about 0.01% to about 20% based on the total weight of the combination of solvent and agent.

40. A method according to claim 1, in which the solvent is present in an amount of about 80% to about 99.99% based on the total weight of the combination of solvent and agent.

41. A method according to claim 1, in which the agent which facilitates surface exchange or transesterification is present in an amount of less than 10% based on the total weight of the combination of solvent and metal alkoxide or chelate thereof.

42. A method according to claim 1, in which the agent which facilitates surface exchange or transesterification is present in an amount of 3 to 10% based on the total weight of the combination of solvent and metal alkoxide or chelate thereof.

43. The method of claim 1, wherein the activation treatment increases adhesion by chemically modifying the surface of the organic coating so that the organic coating is more receptive to forming adhesive interactions with the further coating and/or other entities selected from adhesives, sealants, pin hole fillers and pressure sensitive decals or logos.

44. The method of claim 1, wherein the further coating is a further organic coating.

45. The method of claim 1, wherein the organic coating present on the substrate has been aged.

46. The method of claim 1, wherein the substrate is a rigid material.

47. The method of claim 1, wherein the method of activation reactivates the organic coating on the substrate.

48. The method of claim 1, wherein the organic coating was previously dried or cured on the substrate.

49. The method of claim 1, wherein the organic coating is capable of being chemically stripped.

50. The method of claim 1, wherein the bulk integrity of the organic coating and the substrate structure are maintained after a further coating and/or other entities selected from adhesives, sealants, pin hole fillers and pressure sensitive decals or logos is applied.

* * * * *